(12) United States Patent
Mulliken et al.

(10) Patent No.: US 12,422,917 B2
(45) Date of Patent: Sep. 23, 2025

(54) OPERATING MODES FOR REDUCING DISTRACTION IN EXTENDED REALITY ENVIRONMENTS

(71) Applicant: Apple Inc., Cupertino, CA (US)

(72) Inventors: Grant H. Mulliken, Los Gatos, CA (US); Anura A. Patil, San Francisco, CA (US); Brian Pasley, Berkeley, CA (US); Christine Godwin, Santa Clara, CA (US); Eve Ekman, San Francisco, CA (US); Jonathan Hadida, Redwood City, CA (US); Lauren Cheung, Los Altos, CA (US); Mary A. Pyc, Campbell, CA (US); Patrick O. Eronini, Sunnyvale, CA (US); Raphael A. Bernier, Seattle, WA (US); Steven A. Marchette, San Jose, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/371,138

(22) Filed: Sep. 21, 2023

(65) Prior Publication Data
US 2024/0104792 A1   Mar. 28, 2024

Related U.S. Application Data

(60) Provisional application No. 63/409,181, filed on Sep. 22, 2022.

(51) Int. Cl.
*G06F 3/01* (2006.01)
*G06T 19/00* (2011.01)

(52) U.S. Cl.
CPC .............. *G06F 3/011* (2013.01); *G06F 3/013* (2013.01); *G06F 3/017* (2013.01); *G06T 19/006* (2013.01); *G06T 2200/24* (2013.01)

(58) Field of Classification Search
CPC .......... G06F 3/011; G06F 3/013; G06F 3/017; G06T 19/006; G06T 2200/24
See application file for complete search history.

(56) References Cited

U.S. PATENT DOCUMENTS

| | | | |
|---|---|---|---|
| 9,323,325 B2 | 4/2016 | Perez et al. | |
| 9,872,968 B2 | 1/2018 | de Zambotti et al. | |

(Continued)

OTHER PUBLICATIONS

Invitation to Pay Additional Fees dated Dec. 18, 2023, PCT/US2023/033365, 13 pages.

(Continued)

*Primary Examiner* — Gene W Lee
(74) *Attorney, Agent, or Firm* — Brownstein Hyatt Farber Schreck, LLP

(57) ABSTRACT

Embodiments are directed to aspects of the extended reality environments that are selected or otherwise modified to account for distracting stimuli. Similarly, one or more metrics that reflect, or are otherwise indicative of, a user's ability to focus on a current or upcoming activity may be used to adjust a user's interaction with the extended reality environment. The extended reality environment can generated by an extended reality system that includes a head-mounted display, a set of sensors and a processor configured to enter a focus mode that reduces distraction in an extended reality environment. While in the focus mode, the process or can receive imaging data of a physical environment around a user using the set of sensors and generate the extended reality environment that includes a reproduction of the first region of the physical environment where an identified object is replaced with the additional content.

19 Claims, 44 Drawing Sheets

(56) References Cited

U.S. PATENT DOCUMENTS

| | | |
|---|---|---|
| 10,007,406 B1 | 6/2018 | Libin |
| 10,105,601 B1 | 10/2018 | Hariton |
| 10,152,118 B2 | 12/2018 | Primus et al. |
| 10,171,858 B2 | 1/2019 | George et al. |
| 10,173,129 B2 | 1/2019 | Mikhailov et al. |
| 10,332,315 B2 | 6/2019 | Samec et al. |
| 10,838,210 B2 | 11/2020 | Robaina et al. |
| 11,101,031 B2 | 8/2021 | Hill et al. |
| 11,127,182 B2 * | 9/2021 | Mirhosseini ............ G06F 3/011 |
| 11,130,064 B2 | 9/2021 | Kahn, II et al. |
| 11,195,320 B2 | 12/2021 | Lin et al. |
| 11,361,513 B2 | 6/2022 | Lohr et al. |
| 11,960,640 B2 * | 4/2024 | Xu ....................... G06V 40/161 |
| 2002/0128540 A1 | 9/2002 | Kim et al. |
| 2007/0149282 A1 | 6/2007 | Lu et al. |
| 2014/0168056 A1 | 6/2014 | Swaminathan et al. |
| 2016/0362080 A1 | 12/2016 | Kim et al. |
| 2019/0011703 A1 * | 1/2019 | Robaina ................. B60K 35/10 |
| 2020/0045528 A1 * | 2/2020 | Yanamandra ........... H04M 1/00 |
| 2020/0066004 A1 | 2/2020 | Vines et al. |
| 2020/0404159 A1 | 12/2020 | Lei et al. |
| 2021/0192799 A1 | 6/2021 | Miura et al. |
| 2022/0101593 A1 * | 3/2022 | Rockel .................. A63F 13/655 |
| 2022/0210111 A1 | 6/2022 | Greenberg et al. |
| 2025/0010719 A1 | 1/2025 | Yahata et al. |

OTHER PUBLICATIONS

International Search Report and Written Opinion dated Feb. 8, 2024, PCT/US2023/033365, 20 pages.

* cited by examiner

OPERATING MODES FOR REDUCING DISTRACTION IN EXTENDED REALITY ENVIRONMENTS

CROSS-REFERENCE TO RELATED APPLICATION(S)

This application is a nonprovisional patent application of and claims the benefit under 35 U.S.C. § 119(e) of U.S. Provisional Patent Application No. 63/409,181, filed Sep. 22, 2022, and titled "Distraction Reduction in Extended Reality Environments," the contents of which are incorporated herein by reference in their entirety.

FIELD

The described embodiments relate generally to extended reality systems. More particularly, the present embodiments relate to reducing distractions and promoting user focus during interaction with an extended reality environment.

BACKGROUND

Extended reality systems can be used to generate partially or wholly simulated environments (e.g., virtual reality environments, mixed reality environments, or the like) in which virtual content can replace or augment the physical world. The simulated environments may provide engaging experiences for a user, and are used in gaming, personal communication, virtual travel, healthcare and many other contexts. When a given simulated environment includes a portion of a user's physical environment (such as mixed reality and augment reality environments), certain aspects of the physical environment may be distracting or otherwise interfere with a user's ability to focus on a particular task or experience. Accordingly, it may be desirable to for these systems to provide additional types of user experiences that help maintain a user's attention on a given activity.

SUMMARY

Embodiments are directed to a wearable system that includes a head-mounted display, a set of sensors and a processor configured to determine whether an activation criteria has been met. In response to the activation criteria being met, the system is configured to enter a focus mode that reduces distraction in an extended reality environment. While in the focus mode, the system can receive imaging data of a physical environment around a user using the set of sensors, identify, using the imaging data, an object that is positioned within a first region of the physical environment that meets a distraction criteria and select additional content based on the identified object. The system can generate an extended reality environment that includes a reproduction of the first region of the physical environment, where the reproduction includes a subregion in which imaging data associated with the identified object is replaced with the additional content. The system can display the extended reality environment using the head-mounted display.

Embodiments are also directed to a head-mounted device to be worn by a user and includes a display, a first set of sensors configured to detect a physical environment around the user, a second set of sensors configured to measure one or more physiological parameters of the user and a processor configured to generate an extended reality environment that includes a first reproduction of a first portion of the physical environment. The system can display the extended reality environment using the display, detect, using the second set of sensors, user engagement with a candidate object in the first reproduction and in response to the detected user engagement meeting a selection criteria, assign a distraction type to the candidate object. In response to an activation criteria being met, the system can enter a focus mode that reduces distraction in the extended reality environment. While in the focus mode, the system can receive imaging data of the physical environment around the user using the first set of sensors and identify, using the imaging data, a target object that is associated with the selected distraction type and is positioned within a second region of the physical environment. The system can generate the extended reality environment that includes a second reproduction of the second region of the physical environment with the target object replaced with additional content.

Embodiments are further directed to a method for operating a head-mounted device during a focus mode that reduces distraction in an extended reality environment. The method can include receiving imaging data of a physical environment around a user using a set of sensors, identifying, using the imaging data, a candidate object in a portion of the physical environment. The method can include selecting a first distraction criteria and determining that the candidate object does not meet the first distraction criteria. The method can include generating the extended reality environment that includes a first reproduction of the portion of the physical environment with the candidate object and displaying the extended reality environment using a display. The method can include selecting a second distraction criteria and determining that the candidate object meets the second distraction criteria. The method can include updating the extended reality environment to include a second reproduction of the portion of the physical environment that replaces the candidate object with additional content and displaying the updated extended reality environment with the display.

Embodiments are directed to a wearable system that includes a head-mounted display, a set of sensors and a processor configured to determine whether an activation criteria has been met. The system can determine a current activity of the user and in response to the activation criteria being met, enter a focus mode that reduces distraction in an extended reality environment. While in the focus mode the system can receive imaging data of a physical environment around the user using the set of sensors and select a primary region and a peripheral region of the extended reality environment. The primary region can correspond to a first region of the physical environment and the peripheral region corresponds to a second region of the physical environment. The system can generate the extended reality environment with the primary region and the peripheral region, where the primary region includes content associated with the current activity and the peripheral region includes a modified representation of the second region of the physical environment. The system can cause the head-mounted display to display an extending reality environment, where the modified representation is generated by applying a modification to imaging data associated with the second region of the physical environment.

Embodiments are also directed to a wearable system that includes a head-mounted display, a set of sensors and a processor configured to receive imaging data of a physical environment around a user using the set of sensors. The system can enter a focus mode that reduces distraction in an extended reality environment. While in the focus mode, the system can select a region of the physical environment and apply a modification to imaging data associated with the region to generate a modified representation of the region. The system can select a candidate object in the physical environment that meets a selection criteria and generate the extended reality environment that includes the modified representation of the region and a reproduction of the candidate object.

Embodiments are further directed to a wearable system that includes a head-mounted display, a set of sensors and a processor configured to receive imaging data of a physical environment around the user using the set of sensors. The system can enter a focus mode that reduces distraction in an extended reality environment and when in the focus mode determine a current activity of a user. While on the focus mode, the system can determine that a first region of the physical environment is associated with the current activity and determine that a second region of the physical environment is not associated with the current activity. The system can select a modification and generate a modified representation of the second region of the physical environment using the modification. The system can generate the extended reality environment that includes a reproduction of the first region of the physical environment and the modified representation of the second region of the physical environment and cause the head-mounted display to display the extending reality environment that.

Embodiments are directed to a wearable system that includes a head-mounted display, a set of sensors and a processor configured to, in response to determining that a first activation criteria has been met, enter a first focus mode that reduces distraction in an extended reality environment. While in the first focus mode, the system can receive imaging data of a physical environment around a user using the set of sensors and cause the head-mounted display to display the extended reality environment that includes a reproduction of a first portion of the physical environment in which a distracting object in the first portion of the physical environment is replaced with additional content. In response to determining that a second activation criteria has been met, the system can enter a second focus mode that reduces distraction in the extended reality environment. While in the second focus mode, the system can receive imaging data of the physical environment around the user using the set of sensors and cause the head-mounted display to display the extended reality environment that includes a modified representation of a second portion of the physical environment.

Embodiments are also directed to a wearable system that includes a head-mounted display, a set of sensors and a processor configured to receive imaging data of a physical environment around a user using the set of sensors. The system can identify that the user is initiating an activity and in response to identifying that the user is initiating the activity, cause the head-mounted display to display a plurality of selectable options, each of which is associated with a corresponding focus mode that reduces distraction in an extended reality environment. The system can detect an input selecting one of the plurality of selectable options that corresponds to a selected focus mode and enter the selected focus mode. While in the selected focus mode, the system can select a portion of the physical environment based on the selected focus mode and cause the head-mounted display to present the extended reality environment in which imaging data associated with the portion of the physical environment is replaced with additional content.

Embodiments are further directed to a wearable system that includes a head-mounted display, a set of sensors and a processor configured to receive imaging data of a physical environment around a user using the set of sensors. In response to determining that an activation criteria has been met, the system can determine a first attentive state of the user and select a first focus mode that reduces distraction in an extended reality environment. The first focus mode can be selected based on the first attentive state. The system can enter the first focus mode, in which the processor is configured to select a first portion of the physical environment based on a first criteria and cause the head-mounted display to present the extended reality environment in which imaging data of associated with the first portion of the physical environment is replaced with first additional content. The system can determine that the first attentive state has changed to a second attentive state and select a second focus mode that reduces distraction in the extended reality environment. The second focus mode can be selected based on the second attentive state. The system can change from the first focus mode to the second focus mode, in which the processor is configured to select a second portion of the physical environment based on a second criteria and cause the head-mounted display to present the extended reality environment in which imaging data of associated with the second portion of the physical environment is replaced with second additional content.

Embodiments are directed to a wearable system that includes a head-mounted display, a set of sensors and a processor configured to cause the wearable system to enter a focus mode that reduces distraction in an extended reality environment. In the focus mode, the system can receive imaging data of a physical environment around a user using the set of sensors and select a region of the physical environment that includes an object that meets a distraction criteria. The system can cause the head-mounted display to display the extended reality environment in which imaging data associated with the region of the physical environment is replaced with additional content. The system can detect user engagement corresponding to the additional content that meets an interaction criteria, and in response to detecting the user engagement corresponding to the additional content, update the extended reality environment to include a reproduction of a portion of the object.

Embodiments are also directed to a wearable system that includes a head-mounted display, a set of sensors and a processor configured to, in response to determining that a first activation criteria has been met, enter a focus mode that reduces distraction in an extended reality environment. While in the focus mode, the system can receive imaging data of a physical environment around a user using the set of sensors and cause the head-mounted display to display the extended reality environment that includes a reproduction of a portion of the physical environment in which an object in the portion of the physical environment is replaced with additional content. The system can detect a change in the object using the set of sensors and in response to the change in the object meeting an update criteria, update the reproduction of the portion of the physical environment to remove the additional content.

Embodiments are further directed to a wearable system that includes a head-mounted display, a set of sensors and a processor configured to operate in a plurality of focus modes that reduce distraction in an extended reality environment. In each focus mode of the plurality of focus modes, the system can receive imaging data of a physical environment around a user using the set of sensors, identify an object in the physical environment that meets a distraction criteria and cause the head-mounted display to display the extended reality environment comprising a first region that reproduces the physical environment and a second region that replaces the object in the physical environment with additional content. The system can determine user engagement corresponding to the second region in a first focus mode of the plurality of focus modes and in response to the determined user engagement meeting a first criteria, update the second region of the extended reality environment to reproduce the object. In a second focus mode of the plurality of focus modes and in response to the determined user engagement meeting a second criteria, different from the first criteria, the system can update the second region of the extended reality environment to reproduce the object.

Embodiments are directed to a wearable system that includes a head-mounted display, a set of sensors and a processor configured to determine that a user is initiating a first activity in an extended reality environment. In response to determining that the user is initiating the first activity, the system can select a focus criteria associated with the first activity, detect an attentive state of the user using the set of sensors and determine whether the detected attentive state meets the focus criteria. In response to detected attentive state failing to meet the focus criteria, the system can cause the head-mounted display to display a notification in the extended reality environment Embodiments are also directed to a wearable system that includes a head-mounted display, a set of sensors and a processor configured to receive imaging data of a physical environment around a user using the set of sensors. The system can determine an estimated future activity of the user and select, based on estimated future activity, a focus mode from a set of candidate focus modes that reduce distraction in an extended reality environment. The system can enter the selected focus mode, during which the processor causes the head-mounted display to display the extended reality environment including first region that includes a reproduction of a first portion of the physical environment and a second region that includes additional content.

Embodiments are further directed to a wearable system that includes a head-mounted display, a set of sensors and a processor configured to determine that a user is performing a first activity in an extended reality environment. While the user is performing the first activity, the system can detect an attentive state of the user using the set of sensors, determine whether the detected attentive state meets a focus criteria associated with the first activity, and in response to the detected attentive state failing to meet the focus criteria suspend the first activity and initiate a second activity in the extended reality environment.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
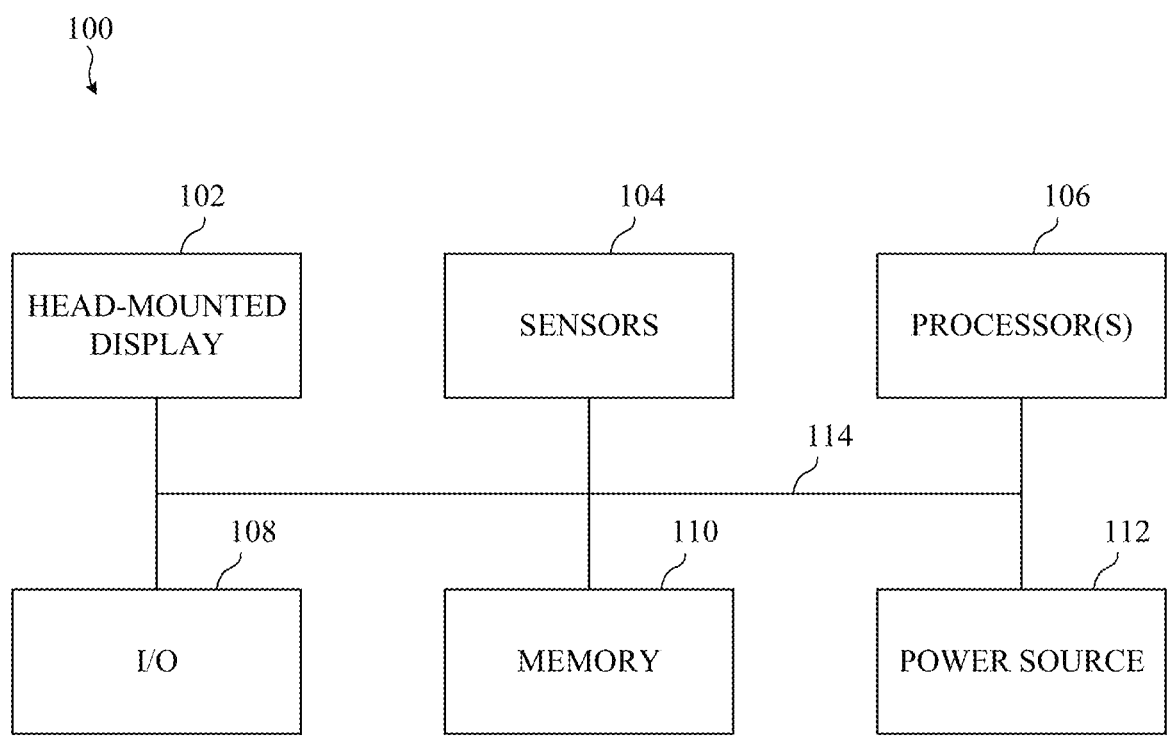
FIG. 1 shows an example block diagram of an extended reality system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein relate to promoting a user's attention on a particular task or activity while a user is engaging with an extended reality environment generated by an extended reality system. Certain stimuli (people, objects, sounds, etc.) in a user's physical environment, if included the extended reality environment, may distract a user while they are engaging in a desired activity. Accordingly, in some of the embodiments described here, aspects of the extended reality environments are selected or otherwise modified to account for distracting stimuli. Similarly, one or more metrics that reflect, or are otherwise indicative of, a user's ability to focus on a current or upcoming activity may be used to adjust a user's interaction with the extended reality environment.

For example, many of the embodiments described here include generating an extended reality environment as part of a dedicated focus mode. During a focus mode, the extended reality system generates an extended reality environment that is configured to reduce distractions for the user while a user performs a specific activity within the extended reality environment. This may make it easier for the user to attend to a desired activity, which may be any activity for which a user may want improved focus (e.g., reading, studying, drawing, engaging in cognitive training, meditating, cooking, or the like). An extended reality system will operate in a given focus mode until that focus mode is deactivated (e.g., based on a set of deactivation criteria, in response to a user request) or a new focus mode is activated. The extended reality systems may operate in different focus modes under different circumstances (depending on the user's current activity, user selection of the focus mode, etc.), with each focus mode applying different techniques and/or criteria for reducing distractions in an extended reality environment.

The extended reality systems described here may use a range of techniques to reduce distractions in an extended reality environment. For example, individual objects in a user's physical environment may be identified as potentially distracting and replaced with additional content in the extended reality environment. In other instances, entire regions of a user's physical environment may be selected as potentially distracting and replaced with additional content in the extended reality environment, such as a modified representation of that region. In still other instances, the entire physical environment may be replaced with additional content. The decision of which objects or regions of the physical environment to replace with additional content may be based on predetermined criteria and/or dynamically selected based on a user's interaction with the extended reality environment. For example, an extended reality system may determine which portions of the user's physical environment are not associated with the user's current activity, and may reduce distractions in these regions to focus on user's attention on objects and/or portions of the environment associated with the current activity.

The extended reality systems described herein may also continually evaluate changes in the physical environment and/or a user's interaction with extended reality environment, and update the extended reality environment in accordance with these monitored changes. For example, the extended reality systems described herein may dynamically modify and/or display portions of the physical environment in the extended reality environment. This may include modifying real-world objects or replacing real-world objects in the extended reality environment using additional content at one time, and re-introducing the real-world objects back into the extended reality environment at a later time based on updated circumstances (e.g., detected user interaction with the extended reality environment and/or measured parameters of the user). Additionally or alternatively, the extended reality systems described herein can prepare a user for a specific task, by evaluating a user's current attentive state and engage the user in a set of tasks that are designed to increase the user's attentive state to match an attentive criteria required for specific tasks. In some cases, the extended reality systems may monitor a user's attentive state and alter, delay or otherwise modify a current activity based on the user's attentive state.

These and other embodiments are discussed below with reference to FIGS. 1-37. However, those skilled in the art will readily appreciate that the detailed description given herein with respect to these Figures is for explanatory purposes only and should not be construed as limiting.

Various terms are used herein to describe the various extended reality systems and associated extended reality environments described herein. As used herein, a "physical environment" a portion of the physical world/real world around a user that the user may perceive and interact with without the aid of the extended reality systems described herein. For example, a physical environment may include a room of a building or an outdoor space, as well as any objects (also referred to herein as "real-world objects") in that space, such as plants, furniture, books, or the like. For the purpose of this application, a person in a physical environment may be considered an object for the purpose of generating an extended reality environment.

As used herein, an "extended reality environment" refers to a wholly or partially simulated environment that a user may perceive and/or interact with using an extended reality system as described herein. In some instances, an extended reality environment may be a virtual reality environment, which refers to a wholly simulated environment in which the user's physical environment is completely replaced with virtual content within the virtual reality environment. The virtual reality environment may not be dependent on the user's physical environment, and thus may allow the user to perceive that they are in a different, simulated location (e.g., standing at a beach when they are actually standing in a room of a building). The virtual reality environment may include virtual objects (i.e., simulated objects that may be perceived by the user but are not actually present in the physical environment) with which the user may interact.

In other instances, an extended reality environment may be a mixed reality environment, a wholly or partially simulated environment in which virtual content may be presented along with a portion of a user's physical environment. Specifically, a mixed reality environment may include a reproduction and/or a modified representation (discussed in more detail below) of one or more portions of the user's physical environment surrounding the extended reality system. In this way, the user may be able to perceive (directly or indirectly) their physical environment through the mixed reality environment while also still perceiving the virtual content.

In some instances, a mixed reality environment allows the virtual content to interact with the physical environment and/or vice versa within the mixed reality environment. For example, a mixed reality environment may allow a user to perceive a virtual cat knocking over a real-world cup (which may then be replaced with a virtual cup since the real-world cup has not actually moved) in a mixed reality environment. Conversely, a real-world dog entering the mixed reality environment may startle the virtual cat. In other variations, a mixed reality environment includes an augmented reality environment in which the virtual content is superimposed on a portion of the user's physical environment.

As used herein, a "reproduction" of a portion of a physical environment refers to a portion of an extended reality environment that recreates that portion of the physical environment within the extended reality environment. For example, the extended reality system may have a transparent or translucent display and may be configured to present virtual content on the transparent or translucent display (or displays) to create the extended reality environment. In these embodiments, the user may directly view, through the transparent or translucent display (or displays), portions of the physical environment that are not obscured by the presented virtual content. Accordingly, these portions of the physical environment directly viewable by the user would be considered reproductions for the purposes of this application, and are referred to herein as "direct reproductions."

In other embodiments, the extended reality system includes an opaque display (or displays), such that a user is unable to directly view the physical environment through the display. In these embodiments, the system may comprise one or image sensors (e.g., as part of a camera or other imaging system) that are able to capture images of the physical environment. The extended reality system may present a portion of these images to a user by displaying them via the opaque display, such that the user indirectly views the physical environment via the displayed images. The images (or portions thereof), when presented to a user as part of an extended reality environment, are considered reproductions (also referred to herein as "indirect reproductions") for the purposes of this application. It should be appreciated that images captured of the physical environment that are used to generate indirect reproductions may undergo standard image processing operations such as tone mapping, color balancing, image sharpening, in an effort to match the indirect reproduction to the physical environment. Additionally, in some instances the extended reality environment is displayed using foveated rendering, in which different portions of the extended reality environment are rendered using different levels of fidelity (e.g., image resolution) depending on a direction of a user's gaze. In these instances, portions of a reproduction that are rendered at lower fidelity using these foveated rendering techniques are still considered indirect reproduction for the purposes of this application.

As used herein, a "modified representation" of a portion of a physical environment refers to a portion of an extended reality environment that is derived from the physical environment, but intentionally obscures one or more aspects of the physical environment. Whereas an indirect reproduction attempts to replicate a portion the user's physical environment within the extended reality environment, a modified representation intentionally alters one or more visual aspects of a portion of the user's physical environment (e.g., using one or more visual effects such an artificial blur). In this way, a modified representation of a portion of a user's physical environment, may allow user to perceive certain aspects of that portion of the physical environment while obscuring other aspects. In the example of an artificial blur, a user may still be able to perceive the general shape and placement of real-world objects within the modified representation, but may not be able perceive the visual details of these objects that would otherwise be visible in the physical environment. In instances where the extended reality environment is displayed using foveated rendering, portions of a modified representation that are in peripheral regions of the extended reality environment (relative to the user's gaze) may be rendered at lower fidelity using foveated rendering techniques.

As used herein, "additional content" refers to one or more portions of an extended reality environment that does not reproduce the physical environment (i.e., directly or indirectly). Additional content may include a modified representation of a portion of the physical environment and/or virtual content that changes what a user perceives to be present at a given location in the physical environment. For example, virtual content may be selected and generated to make it appear as if a real-world object has vanished from the physical environment, to make it appear as if a real-world object has been replaced by a different object, or make it appear as if a real-world object is in a different state (e.g., as if a lamp is turned off in the extended reality environment even though the real-world lamp is currently generating light). It should be appreciated that additional content may also include a "modified representation" of a virtual object, in which the same modifications used to alter a portion of the user's physical environment (e.g., to generate a modified representation of the user's physical environment) is also applied to a virtual object. This may allow for the modified representation of the virtual object to replace the modified representation of a real-world object in an extended reality environment.

As used herein, an "attentive state" that is determined, detected, measured or otherwise identified for a user refers to one or more metrics that represent a user's ability to focus on a given activity. The extended reality systems described herein may be able to determine the attentive state of user using physiological information obtained from the user (e.g., sensed using one or more sensors and/or derived from feedback or other information provided to the extended reality system by the user). The physiological information may be used to determine one or more metrics that reflect a user's level of fatigue, level of attentiveness, level of stress, combinations thereof, or the like. An individual metric or multiple of these metrics may be used to represent the user's attentive state.

FIG. 1 shows an example block diagram of an extended reality system 100, which can take the form of any of the devices described herein and be used to generate extended reality environments as described herein. The extended reality system 100 can include a head-mounted display 102, sensors 104, one or more processors 106, an input/output (I/O) mechanism(s) 108, memory 110, and a power source 112. The processor 106 can control some or all of the operations of the extended reality system 100 and communicate, either directly or indirectly, with some or all of the components of the extended reality system 100.

The head-mounted display 102 can be a display that is worn by a user and can be used to create an immersive extended reality experience by displaying content in close proximity and in the visual field of the user. The head-mounted display 102 can include a head band or other fastening mechanism that may be used to releasably couple the head-mounted display 102 to a user's head so that when a user's moves their head in different directions the display moves with the user and a relative position of the display to the user's eye remain constant. In some cases, the one or more displays can be curved or have non-planar profiles. The head-mounted display 102 may include a single display, or may include multiple displays (e.g., one display for each eye of a user).

The head-mounted display 102 can include a liquid-crystal display (LCD), an organic light emitting diode (OLED) display, a light emitting diode (LED) display, or the like. The displays, such as an LCD display can include a backlight component that can be controlled to provide variable levels of display brightness. In some instance the head-mounted display 102 may include a transparent or translucent display or displays, while in other instances the head-mounted display 102 may include an opaque display or display, such as described previously. In some cases, the brightness of the displays may be controlled by modifying the electrical signals that are provided to display elements.

The sensors 104 can include one or more sensors that are configured to sense one or more aspects of the physical environment around the user and/or sense one or more parameters of the user. The sensors can include an optical sensors that measure the physical environment and/or movement of a user. The optical sensors can include a depth measurement sensor (or sensors) that can determine a distance between various objects in the physical environment and a location of the sensing unit (e.g., the-head mounted display). Depth measurement sensors may include a time-of-flight sensor, a structured light sensor, a stereo camera, or the like. The optical sensing unit can include a camera or other suitable imaging device that is configured to capture an image of a scene (which may in turn be used to identify one or more regions of the physical environment and/or the user). For example, the optical sensing unit can include a first camera that can image the physical environment and a second camera that can image one or more portions of a user (e.g., the user's eyes). The depth sensor and the camera can have overlapping fields of view, such that the identification of objects in the physical environment and/or anatomical features via the camera can be used by the device to associate objects and/or anatomical features with measurements made by the depth sensor.

The extended reality system 100 can communicate with other devices such as a wearable electronic device such as a smartphone or other suitable device. The electronic device can measure movement of the user and communicate the movement to the extended reality system 100. For example, the electronic device and the extended reality system can each include one or more antennas and can transmit signals, such as UWB signals, that can be used to determine distance and/or positions of the device with respect to each other.

The extended reality system can include additional sensors such as accelerometers, gyrometer, positioning sensors such as global position system (GPS) sensors, wireless positioning systems, altimeters, pressure sensing systems and/or the like. Additionally or alternatively, the extended reality system 100 can include physiological sensors such as temperature sensors, hear rate monitors and/or other suitable sensors. The sensor(s) 104 can includes sensors that are configured to sense pressure, light, touch, biometric data (e.g., one or more physiological parameters), and so on. For example, the sensor(s) 104 may include a heat sensor, a position sensor, a light or optical sensor, an accelerometer, a pressure transducer, a gyroscope, a magnetometer, a health monitoring sensor, and so on. Additionally, the one or more sensors 104 can utilize any suitable sensing technology, including, but not limited to, capacitive, ultrasonic, resistive, optical, ultrasound, piezoelectric, and thermal sensing technology.

The processor 106 can be implemented as any electronic device capable of processing, receiving, or transmitting data or instructions. For example, the processor 106 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements. The processing unit can be programmed to perform the various aspects of the systems described herein.

It should be noted that the components of the extended reality system 100 can be controlled by multiple processors. For example, select components of the extended reality system (e.g., sensors 104) may be controlled by a first processor and other components of the extended reality system 100 (e.g., the I/O 108) may be controlled by a second processor, where the first and second processors may or may not be in communication with each other.

The I/O device 108 can include devices that outputs controls, instructions or other options for operating the extended reality system 100 to a user. The I/O devices can include displays, speakers, one or more microphones, and haptic output devices one or more of which may be used to present the guided breathing exercise to the user.

The I/O device 108 can include devices transmit and/or receive data from a user or another electronic device. An I/O device can transmit electronic signals via a communications network, such as a wireless and/or wired network connection. Examples of wireless and wired network connections include, but are not limited to, cellular, Wi-Fi, Bluetooth, IR, and Ethernet connections. In some cases, the I/O device 804 can communicate with an external electronic device, such as a smartphone, electronic device, or other portable electronic device, as described here.

The memory 110 can store electronic data that can be used by the extended reality system 100. For example, the memory 110 can store electrical data or content such as, for example, audio and video files, documents and applications, device settings and user preferences, timing signals, control signals, and data structures or databases. The memory 110 can also include one or more non-transitory computer-readable storage devices, for storing computer-executable instructions, which, when executed by one or more computer processors, for example, can cause the computer processors to perform the techniques that are described here (e.g., to generate an extended reality environment that is configured to reduce distraction for a user).

A computer-readable storage device can be any medium that can tangibly contain or store computer-executable instructions for use by or in connection with the instruction execution system, apparatus, or device. In some examples, the storage device is a transitory computer-readable storage medium. In some examples, the storage device is a non-transitory computer-readable storage medium. The non-transitory computer-readable storage device can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The power source 112 can be implemented with any device capable of providing energy to the extended reality system 100. For example, the power source 112 may be one or more batteries or rechargeable batteries. Additionally or alternatively, the power source 112 can be a power connector or power cord that connects the extended reality system 100 to another power source, such as a wall outlet.

Figure 2A:
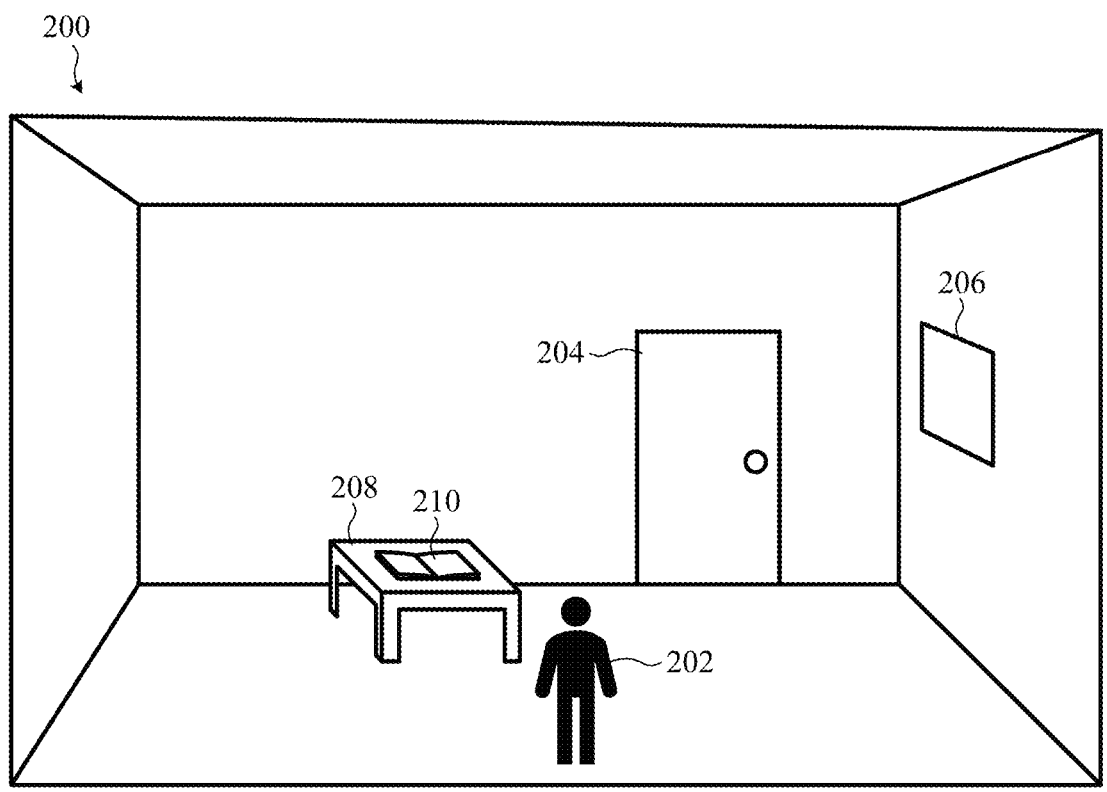
FIG. 2A shows a perspective view of a user positioned in a physical environment.
Figure 2B:
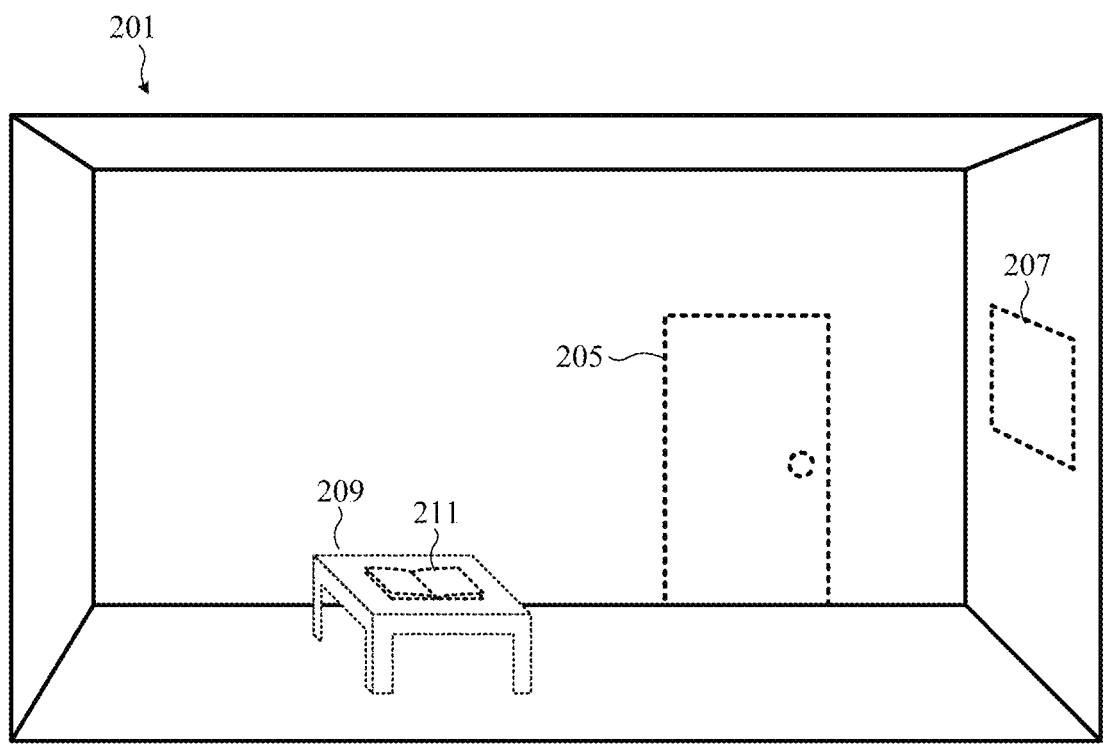
FIGS. 2B and 2C show an example of an extended reality environment that is generated based on the physical environment around the user.
Figure 2C:
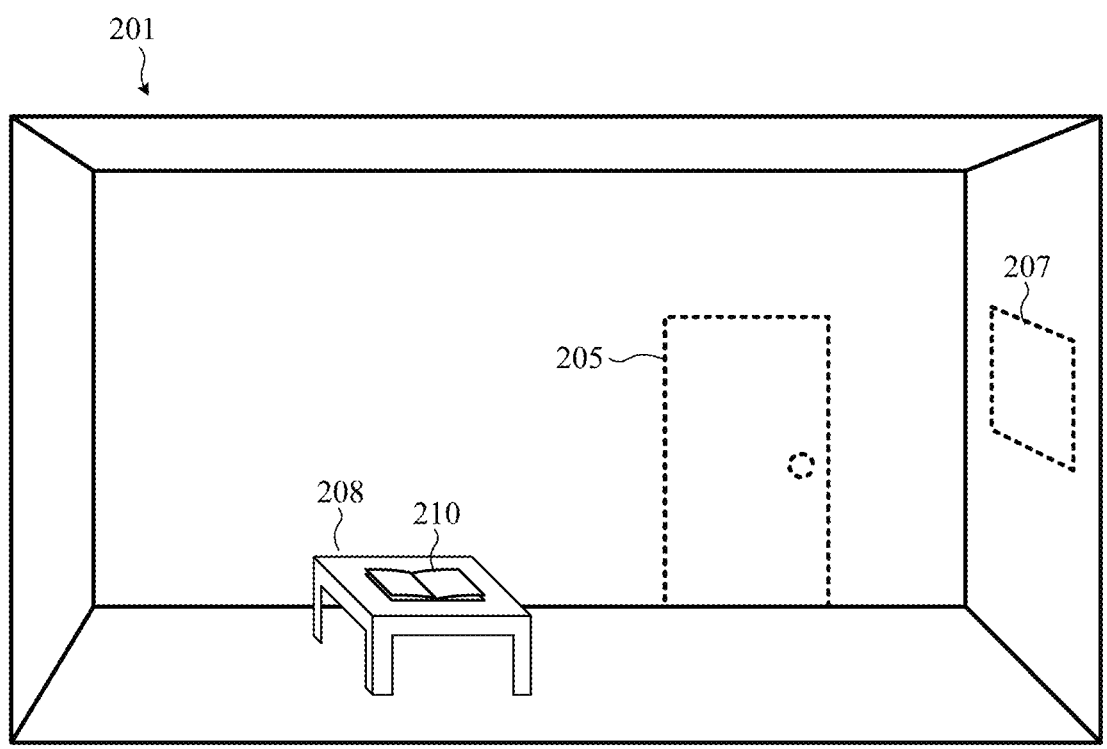

FIGS. 2A-2C show an example of how an extended reality environment 201 can be generated by an extended reality system based on a physical environment 200 around a user 202. Specifically, FIG. 2A shows the user 202 positioned within the physical environment 200, while FIGS. 2B and 2C show examples of the extended reality environment 201 that may be presented to the user 200 via the extended reality system. The extended reality environment 201 may be displayed on a head-mounted display of the extended reality system, as described herein.

The extended reality environment 201 may be generated to include (e.g., reproduce) one or more portions of the physical environment 200 around a user 202, such as in a mixed reality environment as discussed previously. In some of these instances, the extended reality environment 200 can be displayed from the perspective of the user 202 relative to the physical environment 200, which may orient the user relative to the physical environment 200 and allow the user to see and physically interact with real-world objects without needing to remove the extend reality system. The extended reality environment 201 may further display virtual content in addition to one or more portions of the physical environment 200. Accordingly, the extended reality environment may include both the physical environment and virtual content in some cases, though it should be appreciated that in other instances the extended reality environment may include only virtual content (e.g., such as in a virtual reality environment as discussed previously).

The extended reality system may use one or more sensors to receive imaging data, and/or other data about the physical environment 200 to determine aspects of the physical environment. The extended reality may use this information to determine the locations, dimensions, and/or other characteristics of objects in the physical environment and/or the user's position with respect to the physical environment 200, and to generate the extended reality environment 201. The extended reality system can generate the extended reality environment 201 to reproduce one or more portions of a physical environment 200 based on how a user would perceive them in the physical environment 200. Similarly, virtual objects may be sized and positioned within the extended reality environment 201 in a manner that allows the user 202 to perceive the virtual objects as if they were actually present in the physical environment 200.

As shown in FIG. 2A the physical environment 200 can be a room that includes a door 204, a window 206, a table 208 and a book 210. The extended reality environment 201 may reproduce some or all of these objects or replace them with additional content depending on the operation of the extended reality system. For example, the user 202 may be performing a first activity that includes interacting with the book 210 (e.g., reading, drawing, etc.). The extended reality system can operate in a focus mode as described herein that generates the extended reality environment 201 in a manner designed to reduce distractions while the user 202 is performing this activity. For example, the extended reality system may identify the door 204 as a potential distractor to the user 202, as a user may be distracted by people opening or closing the door, walking by the doorway, or the like. Accordingly, the extended reality environment 201 may be generated to replace the door with virtual content.

As shown in FIG. 2B, the extended reality environment 201 is generated to replace the door 2004, as well as the window 206, the table 208 and the book 210 with virtual content. In this instance, the extended reality environment 201 otherwise reproduces the room of the physical environment, but includes a virtual door 205, a virtual window 206, a virtual table 208 and a virtual book 210 in place of their corresponding real-world objects. The virtual objects are displayed based on the perspective of the user. For example, the user may pick up the real-world book 210, but the extended reality environment 201 allows the user to perceive that they are holding the virtual book 210, which may allow the user to have the sensation of holding a physical book while reading virtual content.

Some of the focus modes described herein can reduce distractions by selectively replacing physical aspects of the environment with additional content such as virtual objects. In some instances, this may reduce distractions by removing movement of one or more objects in the physical environment 200 that would otherwise result in corresponding movement in extended reality environment 201. In the instance mentioned above with the door 204 is identified as a potential distractor, the extended reality system may generate the virtual door 205 to replace the real-world door 204 within the extended reality environment 201. For example, the virtual door 205 may appear to remain shut even when the real-world door 204 is opening and closing in the physical environment 200. The virtual reality system may also include sound modification to remove noises associated with opening and closing the door. Accordingly, from the perspective of the user 202 the virtual door 205 may remain shut, and the user 202 may not be aware the real-world door 204 has been opened or otherwise moved (and thereby reduce the likelihood the user 202 is distracted by this movement).

In another example, the virtual window 207 may be displayed to remove real-world actions, such as a person or other object passing by the window. The virtual window 207 can be configured to display content that is different from the real-world window 206. This may include showing virtual content that is derived from a different location, such that a user looking through virtual window 207 see a different location than the physical environment 201. For example, a user may look through the virtual window 207 and see the surface of the moon or a cityscape from a different geographic region. In other instances, the virtual content may be generated to reproduce the user's view from the real-world window 206 but under different circumstances. For example, it is raining in the physical environment outside the real-world window 206, but the virtual window 207 may simulate the same environment as it would be like during a sunny day. In this way, while a would otherwise see rain through the real-world window 206, they may perceive the extended reality environment 201 as if it not actually raining outside.

In other instances it may be desirable to reproduce certain real-world objects in the extended reality environment 201. In instances where a user is engaging with real-world objects as a part of an activity (e.g., such as when a user is reading from or drawing in the real-world book 210 as mentioned above), it may be desirable to reproduce these objects in the extended reality environment 201. For example, as shown in FIG. 2C, the extended reality environment 201 can be generated to reproduce the physical book 210 and table 208, while replacing other object of the physical environment with virtual objects. As shown, the real-world door 204 is replaced with a virtual door 205 and the real-world window 206 is replaced with a virtual window 207 such as discussed previously.

In some instances, when a user is performing an activity within an extended reality environment, the extended reality system may be configured to generate virtual content associated with that activity within the extended reality environment. For example, if a user wishes to watch a movie using an extend reality system, a virtual viewing window may be presented in the extended reality environment, and the movie may be displayed on the virtual viewing window. In some instances this virtual viewing window may take up the entire extended reality environment to provide a fully immersive experience to the user while watching the movie. In these instances, the virtual content (e.g., the virtual viewing window) may completely obscure a user's ability to perceive the physical environment.

In other instances, however, the virtual content associated with the activity only takes up a subset of the extended reality environment that is visible to the user. In these instances, the extended reality environment may include (e.g., reproduce) a portion of the user's environment in addition to the virtual content associated with the activity. When a focus mode as described herein is used to modify one or more aspects of an extended reality environment as described herein, these modifications may be applied to regions of the extended reality environment that are not associated with the user's activity. Accordingly, for a given activity being performed by a user, the extended reality systems described herein may designate certain portions of an extended reality environment as "associated with the activity" (which may include reproductions or representations of real-world objects or other portions of the physical environment and/or additional content such as virtual objects, user interfaces, or the like) and other portions as "not associated with the activity" (which may include reproductions or representations of real-world objects or other portions of the physical environment and/or additional content such as virtual objects, user interfaces, or the like). In these instances, the focus mode may operate to reduce distractions in the portions of the extended reality environment that are designated as not associated with the user's activity. Conversely, the focus mode may not impact the portions of extended reality environment that are associated with the activity, such that the extended reality system may generate these portions of the extended reality environment independently.

Figure 3:
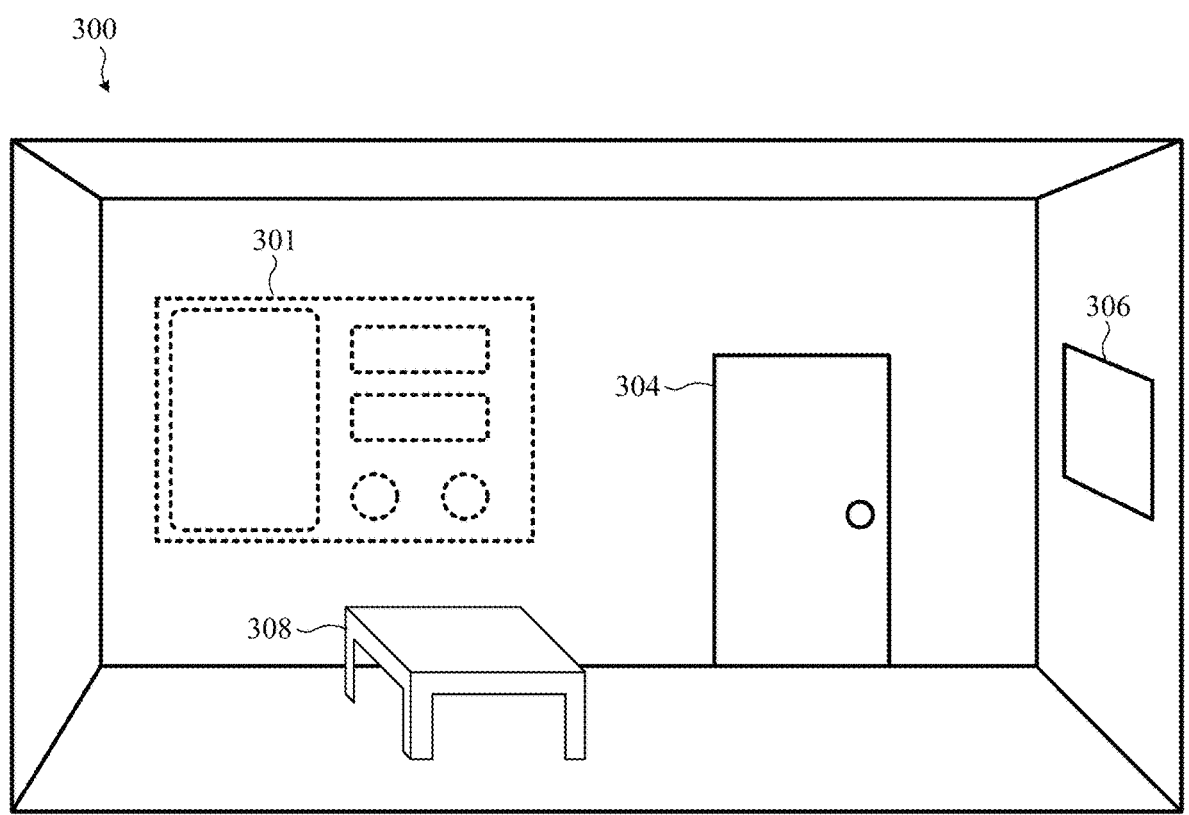
FIG. 3 shows an extended reality environment that includes virtual content that is added to the physical environment.

FIG. 3 shows an extended reality environment 300 that includes virtual content 301 in addition to aspects of the physical environment. Aside from the virtual content 301, the extended reality environment 300 may include a reproduction of a physical environment as described herein (such as the physical environment 200 depicted in FIG. 2A). The physical environment may include a door 304, a window 306 and a table 308, which may be reproduced in the extended reality environment (e.g., as direct reproductions or indirect reproductions depending on the extended reality system used to generate the extended reality environment 300).

The virtual content 301 can include a graphical overlay that is displayed as if it is positioned in a portion of the physical environment. In some cases, the virtual content 301 can be associated an activity as discussed above and a user may interact with the virtual content 301 within the extended reality environment. In the variation shown in FIG. 3, the virtual content 301 includes a user interface that allows a user to select operating parameters of the extended reality system and may provide options that the user can select to provide inputs to the extended realty system. For example, the virtual content 301 may display information to a user about various focus modes that the extended reality system can implement. For example, the virtual content 301 may display potentially distracting objects in the physical environment (e.g., using gaze detection) and present options for the use to confirm/deny whether the objects should be classified as distracting, set distraction criteria for the objects, classify one or more of the objects and so on, as will be described in more detail below. Accordingly, the virtual content 301 can be displayed in the extended reality environment to allow a user to view information about the extended reality system and provide inputs to the extended reality system.

In instances where the virtual content 301 is designated as being associated with a user activity, some or all of the regions of the physical environment that are reproduced in the virtual environment 300 may be designed as not being associated with the user activity. In these instances, the focus mode may operate to reduce distractions in the regions of the extended reality environment 300.

In some embodiments, the techniques described herein are incorporated into a system that includes a head-mounted display and a set of sensors that receive imaging data of a physical environment around a user, detect activities of a user and/or detect physiological parameters of a user. The system may operate in a focus mode that identifies distracting objects within the physiological environment and generate an extended reality environment that replaces the distracting object with additional content (e.g., replaces the object with a different virtual object, modifies the appearance of the object, or removes the object from the extended reality environment). They system can determine a distraction metric for objects within the physical environment and compare the distraction metric to a distraction criteria to determine whether a particular object should be replaced with additional content. In some cases, the distraction criteria can be based on an activity of the user. For example, activities that require higher concentration may have distraction criteria that is easier to satisfy and may result in more objects being replaced with additional content. Activities that require lower concentration may have distraction criteria that is harder to satisfy and may result in fewer objects being replaced with virtual content.

The system can replace one or more objects with additional content in a variety of ways. In some cases, the system can remove a distracting object within the extended reality environment. For example, the system may generate an extended reality environment that reproduces one or more regions of the physical environment, but removes the object from the extended reality environment. This may include generating virtual content to replace the object, where the virtual content "fills in" the region of the extended reality environment where the object would be. In other cases, the virtual content may include a virtual object that replaces the real-world object. The virtual object may be different from the virtual object and be selected to be an object that is considered less distracting to the user.

Figure 4:
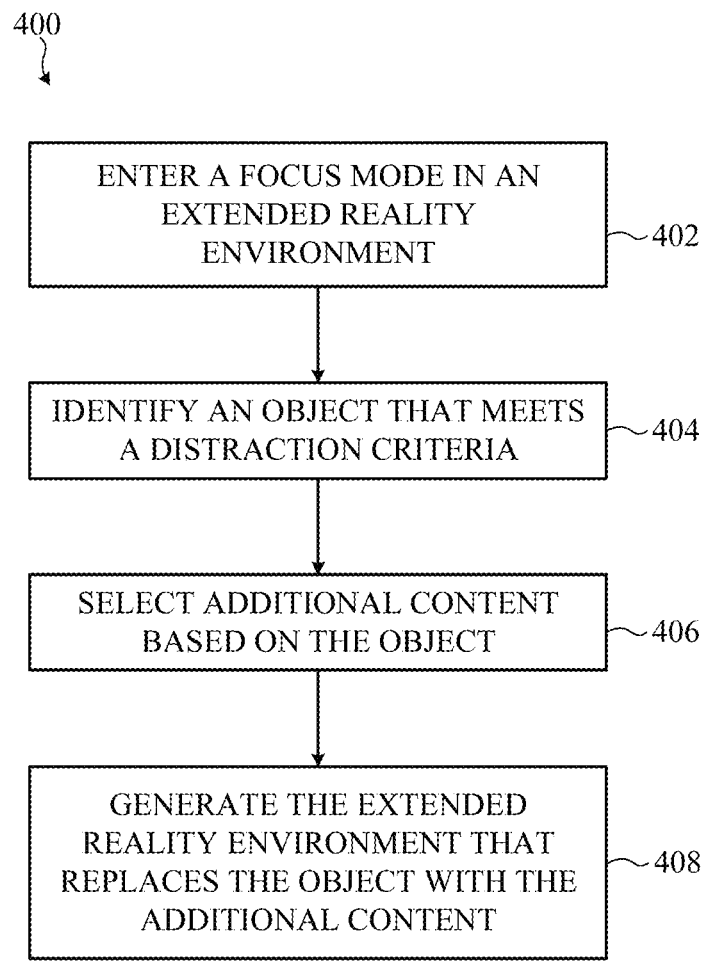
FIG. 4 shows an example process for identifying that an object meets a distraction criteria and generating an extended reality environment that replaces the object with additional content.

FIG. 4 shows an example process 400 for identifying that an object meets a distraction criteria and generating an extended reality environment that replaces the object with additional content. The process 400 can be performed by the extended reality systems described herein.

At operation 402, the process 400 can include entering a focus mode in an extended reality environment. The focus mode can generate an extended reality environment that reduces distractions in a physical environment around a user. In some cases, the focus mode can be triggered by one or more activation criteria. The activation criteria may be based on a current activity of a user and the focus mode may be initiated in response to the user engaging in a particular activity. The extended reality system may monitor physiological parameters of a user and/or retrieve other information to determine if the user is engaging in a particular activity. For example, the sensor data may indicate that the user is focusing on a particular object such as a book and/or computer screen, which may indicate that the user is performing an activity that requires a higher focus level. In some cases, the extended reality system may access calendar data, email data, and/or other data associated with a user to determine a particular activity and/or type of activity that the user is performing. In still other instances, a user may select and initiate an activity (e.g., a game, productivity application, or the like) within the extended reality environment.

The extended reality system can be configured to initiate a focus mode in response to the user engaging in defined activity and/or type of activity. For example, the extended reality system may identify that a user is reading a book and determine that reading is an activity that is associated with an activation criteria for initiating a focus mode. Accordingly, the system may enter a focus mode to generate an extended reality environment that reduce distractions around the user.

At operation 404, the process 400 can include identifying an object within the physical environment that meets a distraction criteria. The focus mode can be configured to generate an extended reality environment that removes, replaces or otherwise modifies objects that are determined to be distracting to a user. In some cases, the extended reality system can monitor a user's interaction with the physical environment to identify objects that are distracting to a user (e.g., diverting the user's attention from the current activity). For example, the extended reality system can include sensors that monitors a user's gaze as well as sensors that image the physical environment around the user. The outputs of these sensors may be used to determine particular objects that a user is focusing on and an amount of time that a user is focusing on a particular object.

The focus mode may include parameters for identifying an object to be replaced with additional content, and these parameters collectively form distraction criteria used by the extended reality to identify these objects. For example, the distraction criteria may include object type criteria, such that extended reality system will replace a real-world object with additional content if that object is determined to be a certain types of object (e.g., an animal, a person, a television). Additionally or alternatively, the distraction criteria may include motion criteria, such that the extended reality replaces objects that have a certain level or type of motion (e.g., spinning fans, bouncing balls). Additionally or alternatively, the distraction criteria may include a brightness criteria, such that the extended reality system will replace objects that have a certain brightness or that changes in brightness (e.g., flashing LEDs, television screens playing dynamic content). It should be appreciated that a given real-world object may, depending on the distraction criteria, only need to satisfy a single parameter (e.g., an object type criteria) or multiple parameters (e.g., an object type criteria and a motion criteria, such as a dog walking through a room) before the extended reality system replaces the object with additional content in an extended reality environment.

The parameters that make up the distraction criteria may be based on a particular activity being performed by the user, the particular focus mode that is active, and/or the user's attentive state. Accordingly, a given focus mode may apply different distraction criteria for different activities being performed by a user. For example, a given focus mode may apply less stringent distraction criteria when a user is studying than when the user is cooking, such that a wider range of real-world will be replaced with additional content while the user is studying. In other instances, a given focus mode may apply different distraction criteria for different attentive states of the user. For example, a given focus mode may apply less stringent distraction criteria when a user is fatigued than when the user is alert. Overall, the extended reality system may tailor the amount that the distraction reduction provided by the system in different contexts.

At operation 406, the process 400 can include selecting additional content that will be used to replace the real-world object in the extended reality environment. For example, in some instance the additional content includes virtual content that is generated to make it look as if the object has been removed from the physical environment. For example, if the real-world object is a television that is positioned is mounted on a wall, the virtual content may be generated to replace the television with a representation of a portion of the wall. In some instances, this virtual content may be generated from images captured of the same physical environment at an earlier time when the virtual object was not present. Additionally or alternatively, the virtual content may be interpolated using information from other portions of the physical environment.

In other instances, the additional content includes a virtual object, such that a user perceives that the real-world object has been replaced with the virtual object within the extended reality environment. For example, in the case of a real-world television, the extended reality system, the content may be a static virtual object such as a poster, picture, painting, or the like. In some instances, the virtual object may be the same type of object as the real-world object. For example, if a real-world television is displaying dynamic content such as movie, the virtual object may be a virtual television that replaces the real-world television in the extended reality environment.

In still other instances, the additional content includes virtual content that overlays at least a portion of real-world object to make it appear as if the real-world object is in a different state. In these instances, the extended reality environment may include a reproduction of a portion of the object while another portion of the object is replaced with virtual content. In the case of a real-world television displaying dynamic content, this may include replacing a screen of the television with virtual content (e.g., a blank screen) in the extended reality environment. In this way, the user may still see a reproduction of a portion (e.g., the bezel/frame) of the real-world television in the extended reality environment, but may perceive that the television is off even though it is turned on in the physical environment.

The additional content can be selected based on the type of object and/or one or more characteristics associated with the object. As a non-limiting example, televisions displaying dynamic content may have their screens replaced with virtual content, while phones displaying dynamic content may be fully replaced by a virtual object. As another non-limiting example, moving objects (such as a cat walking through a room) may be "removed" from the room with virtual content, while stationary objects (such as a toy) may be replaced with virtual objects. Accordingly, an object that meets the distraction criteria may be assigned or otherwise associated with a classification (or multiple classifications), such as an object type, object size, that is used to select the additional content.

In some instances, the additional content associated with a given classification may be determined at least in part by the user. For example, a user may configure the system to replace a particular type of object (e.g., television) with a particular virtual object (e.g., painting) and/or category of virtual content (e.g., classical artwork). Additionally or alternatively, the system may select or adjust the additional content associated with certain classifications based on learnings from the user. For example, the extended reality system may sense a user's interaction with real-world and/or virtual objects over time and determine that certain objects and/or types of objects are less distracting to a user. In this way, the extended reality system may prioritize using these objects and/or type of objects as additional content to replace more distracting objects.

At operation 408, the process 400 can include generating an extended reality environment that includes a reproduction of a region of the physical environment, and where the particular object identified as satisfying the distraction criteria is replaced with the additional virtual content identified at operation 406. As discussed previously, this may include generating an extended reality environment that makes it appear as if the virtual object is no longer present (e.g., interpolating or simulating a region of the physical environment to replace the real-world environment). In other cases, the extended reality environment can be generated to replace the particular object (or a portion thereof) with the identified virtual object.

In other cases, the extended reality system may modify the particular object to provide a modified representation of that object within the extended reality environment. For example, in the case of a television displaying dynamic content, the dynamic content may be blurred to make it harder for a user to focus on the dynamic content. In other instances, a moving object may be filtered in a way where it appears to be moving slowly. For example, a blinking light may be replaced with a modified representation that uses an average intensity of the light of a preceding period of time (which may make the light appear to slowly pulse or have a constant intensity).

Figure 5A:
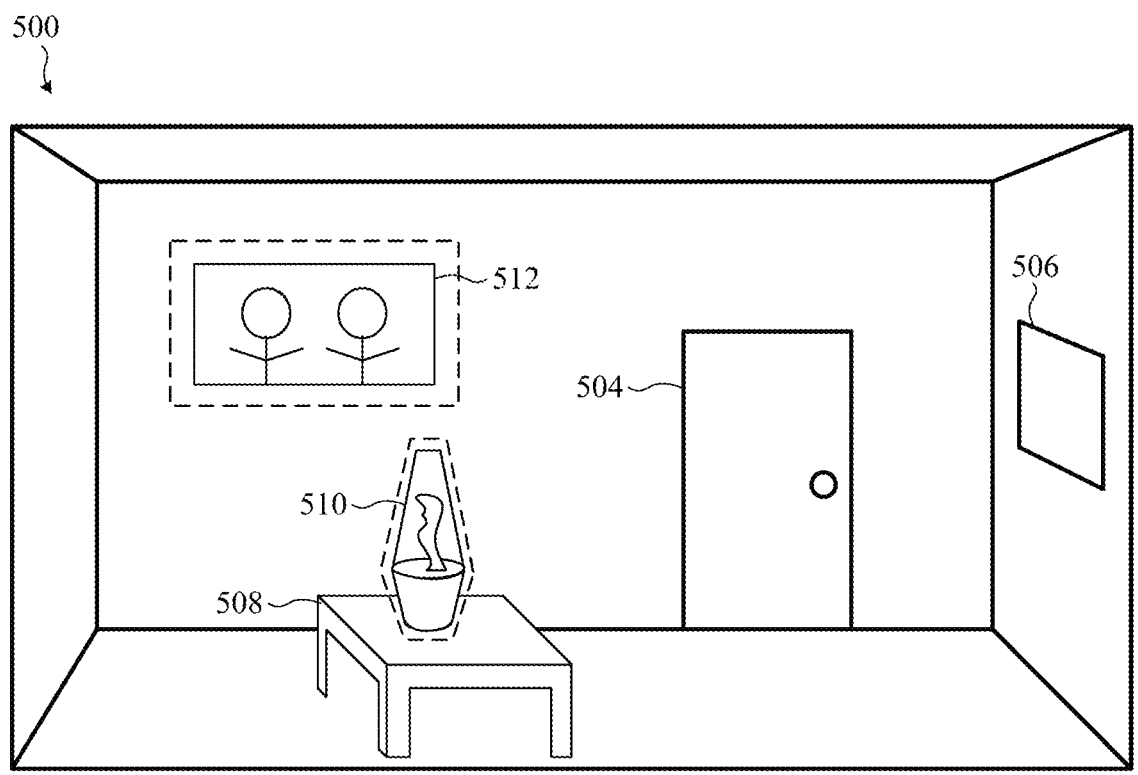
FIGS. 5A and 5B show an example of identifying objects in a physical environment 500 and replacing the objects with additional content in an extended reality environment.
Figure 5B:
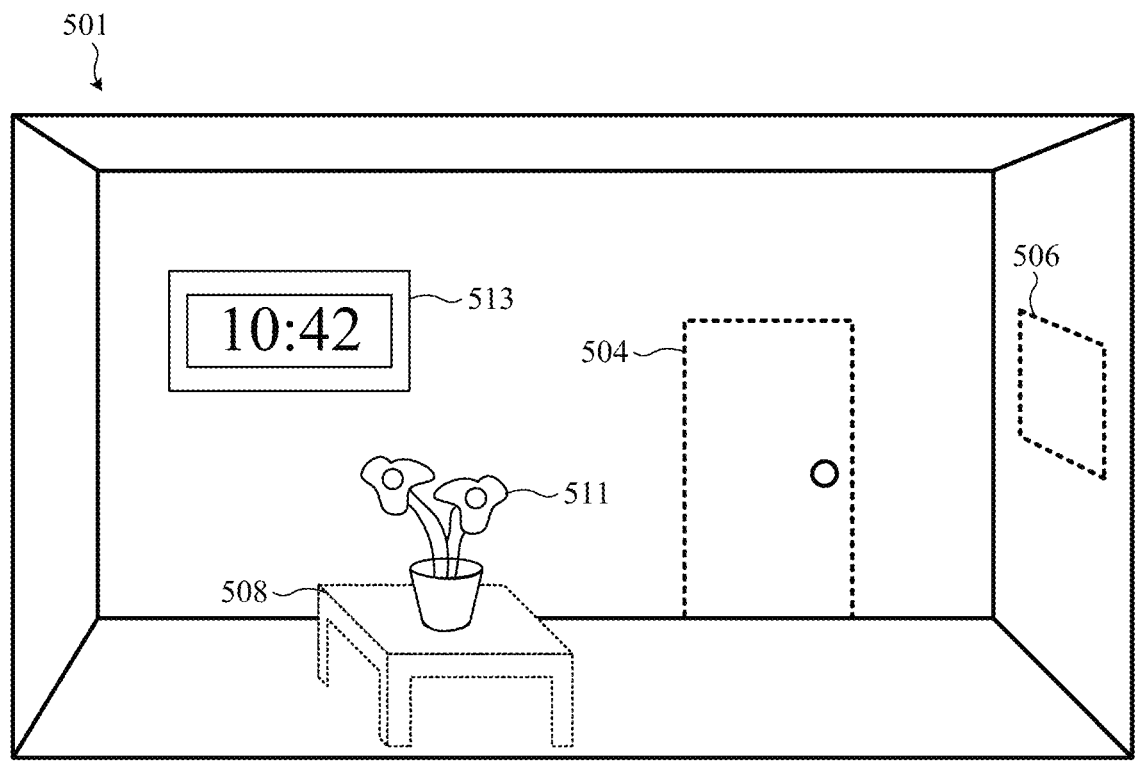

FIGS. 5A and 5B show an example of identifying distracting objects in a physical environment 500 and replacing the objects with virtual content in an extended reality environment 501. The extended reality environment 501 may be an example of the extended reality environments described herein and include virtual content, which may be displayed within the context of the physical environment and/or replace one or more portions of the physical environment.

FIG. 5A shows an example of a physical environment 500 that includes real-world objects such as a door 504, a window 506, a table 508, a lamp 510 and a television 512. As described herein (e.g., in relation to process 400), the extended reality system may enter a focus mode and identify one or more real-world objects that meet a distraction criteria. In this example, the extended reality system may identify that the lamp 510 and the television 512 meet a distraction criteria associated with the focus mode, as described herein.

FIG. 5B shows an example of the extended reality environment 501 that is generated during the focus mode. The extended reality environment 501 may reproduce one or more regions of the physical environment 500, which may include generating reproductions of real-world objects in the physical environment. For example, the extended reality environment 501 can include reproductions of the door 504, the window 506 and the table 508, which may be generated to appear as real objects. The representations of these object may be generated from imaging data of the physical environment that is obtained using one or more sensors as described herein.

The generated virtual reality environment 501 may also include additional virtual objects including a virtual flower 511 and a virtual clock 513 that replace the objects meeting the distraction criteria. For example, the virtual flower 511 may replace the lamp 510 and the virtual clock 513 may replace the television 512. In some cases, the virtual objects may be selected based on one or more physical characteristics of the real-world objects. For example, the virtual flower 511 can have size parameters that are similar to the size parameters of the lamp 510 and the virtual clock 513 can have size parameters that are similar to the television 512. This may help prevent a user from inadvertently interacting with (e.g., bumping into or otherwise contacting) the real-world lamp 510 and television 512), as the user may perceive there are objects present at these locations (i.e., the virtual flowers 511 and the virtual clock 510).

In some instances, the extended reality systems described herein may dynamically update the distraction criteria to change which types of objects will satisfy the distraction criteria. For example, some embodiments as described herein are directed to a system with a head-mounted device that include a display, a first set of sensors that can detect a physical environment around the user and a second set of sensors that can measure physiological parameters of a user. The system may operate in a first mode to identify and classify distracting objects. In the first mode, the system may generate and display and extended reality environment that includes a reproduction of the physical environment around the user. The system can operate the second set of sensors to detect user engagement with objects in the extended reality environment and assign a distraction type to various objects. For example, objects that the user focuses on for a threshold duration may be assigned a distraction type. The assigned distraction type can then be used to identify and remove and/or modify real-word objects being reproduced in a second mode. For example, the system may initiate a focus mode that generates an extended reality environment that reduces distractions. In the focus mode, the system may use the assigned distraction types to identify object that should be replaced with additional content (e.g., removed from the extended reality environment, modified in the extended reality environment, replaced with a less distracting object, and so on). Accordingly, as different people may find different types of objects distracting, the system may learn over time what types of objects are distracting to a given user.

In some cases, while operating in the first detection mode, a user's gaze can be used to determine whether an object should be assigned a distraction type. For example, if a user gazes at an object for an amount of time that meets a time threshold, the system can assign that object a distraction type, which can be used in the focus mode to determine whether the object should be replaced with additional content. The focus mode may have different thresholds/criteria for replacing objects. Each time a focus mode may is initiated, the focus mode may be associated with a focus level, which may be based on a focus require for an activity or task. The system may identify distraction types based on the focus mode. Accordingly, in some cases the system may replace objects with a particular distraction type while reproducing objects with other distraction types.

Figure 6:
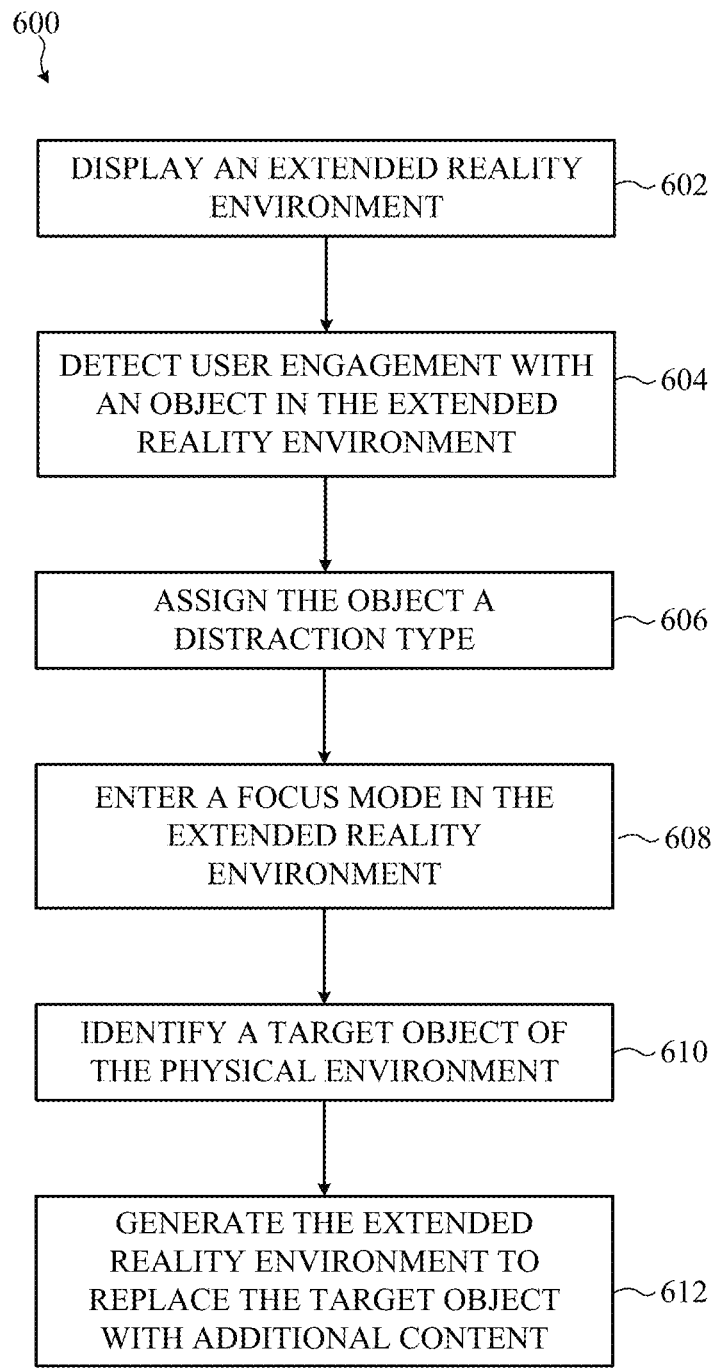
FIG. 6 shows an example process for assigning a distraction type to objects within a physical environment and generating an extended reality environment that replaces particular objects with additional content using the assigned distraction type.

FIG. 6 shows an example process 600 for assigning a distraction type to objects within a physical environment and generating an extended reality environment that replaces particular objects with additional content using the assigned distraction type. The process 600 can be performed by the extended reality systems described herein.

At operation 602, the process 600 can include generating and displaying an extended reality environment that reproduces of one or more portions of a physical environment. The extended reality can be generated and display virtual objects to a user in a way that makes the virtual objects mimic the appearance and placement of the physical environment. The extended reality environment may be generated to determine which objects within the physical environment will be associated with a distraction criteria for a user.

At operation 604, the process 600 can include detecting user engagement with one or more objects in the extended reality environment. The extended reality system can be configured to detect user engagement with one or more objects (or types of objects) that meet one or more selection criteria that indicates that these objects (or types of objects) are considered to be distracting to the user. For example, the extended reality system can monitor user parameters (e.g., a user gaze) to identify an object that the user is focusing on and determine if the user focus meets one or more selection criteria. In some cases, the selection criteria may include a length of time that the user looks at the object, a frequency that the user looks at the object, a frequency that the user touches or otherwise physically interacts with an object (e.g., how often a user picks up their phone), and/or any other suitable parameters. In some cases, the system may monitor one or more physiological metrics of the users (e.g., a respiration rate, heart rate, pupil dilation, combinations thereof, or the like) while the user is engaging with an objection, may use these metrics to determine if a user's engagement with an object meets the selection criteria.

At operation 606, the process 600 can include assigning a distraction type to one or more objects in the extended reality environment. For example, objects that meet certain selection criteria as discussed above may be assigned a distraction type. In general, a distraction type is a designation that is applied to a group of objects, and may be used by the extended reality system to determine how a focus mode will alter objects from this group within a given focus mode. In some instances, the system may determine that a particular type of object is distracting to a user, and may thus assign a distraction type to that particular type of object.

For example, if a user is determined to be distracted by ceiling fans, the extended reality system may assign a "furniture" distraction type to ceiling fans detected in a user's physical environment. The "furniture" distraction type may also include other type of furniture that are determined to be distracting to the user, such as standing fans, mobiles, or windchimes. A given focus mode may be configured to use a particular technique for replacing objects with the "furniture" distraction type with additional content, such that any real-world object that is determined to fall under this distraction type will be replaced in the extended reality environment with additional content that is selected using the particular technique.

In other instances, the extended reality system may assign a distraction type based on movement and/or one or more other characteristics of a given object. In one example, the system may determine that objects are distracting based on how they reflect light, and may assign objects with high reflectivity a "reflective object" distraction type. In another, the system may determine that objects that undergo a certain type of repetitive motion are distracting to a user (regardless of the underlying object). In these instances, objects that are determined to meet certain criteria for this repetitive motion are assigned a "repetitive motion" distraction type.

Other examples include distraction types that are assigned to objects that display dynamic visual content (e.g., media, games, user interfaces, or the like) such as a television or mobile phone. Another example distraction type may be used to identify specific types of sounds such as alerts and/or alarms. Yet other types of distraction may classify an object according to other parameters such as size and shape. In some instances, a distraction type may specify both a type of object as well as motion or characteristic of the object. For example, a spinning ceiling fan may be assigned a "moving furniture" distraction type, while a stationary ceiling fan may be assigned a different distraction type (e.g. a "furniture" distraction type as mentioned above) or may not be assigned a distraction type.

In some cases, the distraction type may classify a degree/severity of the distraction caused (or anticipated to be caused) by the object. Different distraction criteria may be used to classify objects in different distraction types. For example, object that cause a greater amount of distraction may be assigned to certain "higher distraction" distraction type and objects that cause less distraction may be assigned to other "lower distraction" distraction type. Accordingly, certain focus modes may be configured to identify objects that fall into one or more of these distraction types (e.g., using distraction criteria as discussed previously) and replace these objects with additional content in an extended reality environment. For example, one focus mode may only replace objects that fall into the "higher distraction" distraction types, while another focus mode may replace objects that fall into both the "higher distraction" and "lower distraction" distraction types.

The assigned distraction types for the objects can be saved by the extended reality system to later identify objects that should be replaced with additional content in a focus mode. In some cases, the distraction types are associated with a particular user of the system, such that certain focus modes may operate differently for different users. Additionally or alternatively, different focus modes may be configured to remove objects with specific distraction types. Accordingly, the extended reality environment generated for a focus mode may be based both on user specific distraction types and/or a particular focus mode selected by the extended reality environment.

At operation 608, the process 600 can include entering a focus mode that reduces distractions in the extended reality environment. While in the focus mode, the extended reality system may acquire imaging data of the physical environment around the user using one or more sensors, as described herein. A focus mode may be initiated by a user, or may be automatically initiated by the extended reality system when certain criteria are met (e.g., a specific activity has been initiated).

At operation 610, the process 600 can include identifying a target object of the physical environment that is associated with the assigned distraction type. The extended reality system may receive imaging data and use the imaging data to identify objects in the physical environment. For example, the extended reality system may use a machine vision system to identify and classify objects in the physical environment. The extended reality system may determine whether an identified target object is associated with the assigned distraction type. If the target object is determined to be associated with the assigned distraction type, the extended reality system may determine that the target object should be replaced with additional content in the extended reality environment.

For example, if ceiling fans are assigned a distraction type (e.g. a "furniture" distraction type) at operation 606 as discussed previously, the focus mode selected at operation 608 may look for instances of ceiling fans (as well as any other objects that are also assigned the "furniture" distraction type) in the physical environment. The ceiling fans identified in the physical environment, by virtue of being assigned to the distraction type, may be replaced with additional content in the extended reality environment. A given focus mode may look for objects associated with multiple different distraction types, and may be select different additional content depending on the distraction type.

At operation 612, the process 600 can include generating the extended reality environment to replace the identified target objects with additional content. The extended reality environment can be generated to remove the target object from the extended reality environment, replace the target object with a different virtual object, and/or modify the target object in the virtual environment, as described herein.

Figure 7:
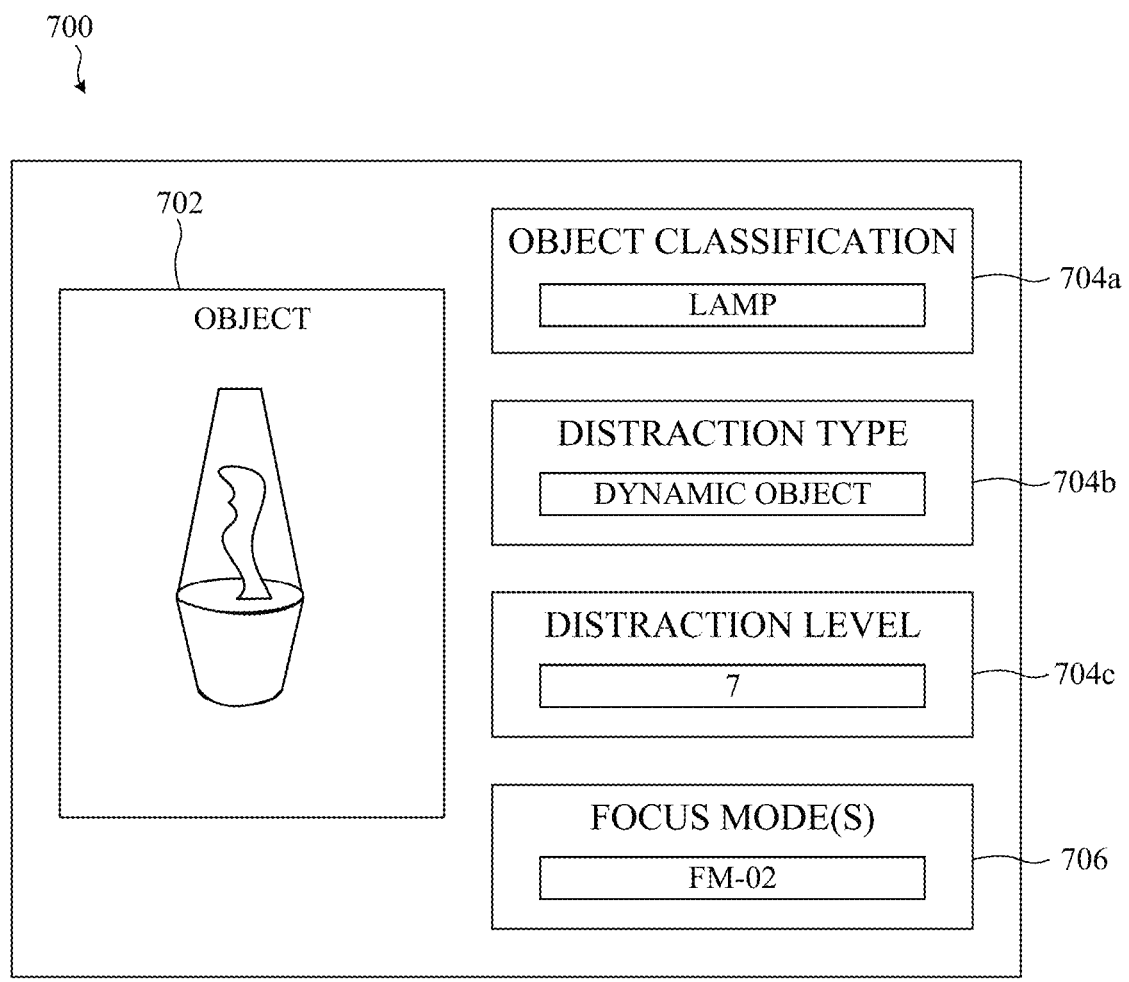
FIG. 7 shows an example user interface for assigning objects a distraction criteria.

While the extended reality systems described herein may be configured to automatically associate certain objects with a distraction type and thereby set distraction criteria used to determine whether a given object is replaced with additional content. FIG. 7 shows an example user interface 700 for assigning objects to a distraction type. The user interface 700 can be displayed in the extended reality system on a head mounted display and provide controls for assigning distraction types to objects within the physical environment. The assigned distraction criteria can be used to generate extended reality environments, as described herein.

The user interface 700 can include a preview portion 702 and one or more parameters 704 associated with the object and an option 706 to assign the object to a particular distraction type and/or focus mode. The preview portion 702 can include an image of an identified object from the physical environment, which may be generated using imaging data from one or more sensors of the extended reality system.

The parameters 704 can include pre-populated data that is determined by the extended reality system and presented to a user in the user interface 700. The user may change one or more of the parameters 704, which will affect how the object and/or similar objects are managed by the extended reality system. The parameters 704 may be initial determined by the extended reality system (e.g., using machine vision, machine learning and/or other suitable technique) and the initial determinations can be presented in the user interface 700. For example, a first parameter 704a may include an object classification that identifies a class (i.e., an object type) that the object belongs to. The first parameter 704a can be updated by a user of the extended reality system, such as if the extended reality system mischaracterizes the object (e.g., classifies a real-world cat as a dog). In some cases, a user may user voice commands to confirm or change the first parameter. Additionally or alternatively, the user interface (e.g., the first parameter 704a) may display a list of suggested object types that the user can choose from. For example, in response to the user indicating a change to first parameter 704a, the user interface may display an additional menu that includes a list of different classes that the user can choose from.

In some cases, an object can be associated with multiple class which may have different hierarchical relations. The classes may have a defined hierarchical structure that includes broader and/or narrower classes. For example, the "lamp" classification may be a subset of a larger "furniture" classification, which may be at a higher hierarchical level. Accordingly, assigning an object to a particular classification may also assign that object to higher level classifications (e.g., an object assigned to a lamp classification will also be assigned to the furniture classification) that have related hierarchical structures. The extended reality system may identify objects at different hierarchical levels, depending on the focus mode. For example, in a first focus mode the extended reality system may be configured to identify all objects that fall into the "lamp" classification and replace those objects with different additional content (but not necessarily all objects that fall into the "furniture" classification). In a second focus mode the extended reality system may be configured to identify all objects that fall into a "furniture" classification and replace those objects with different additional content.

A second parameter 704b may be displayed in the user interface 700 and include a distraction type that can be assigned to the object. The distraction type can be used by the extended reality system to determine whether an object should be replaced with additional content, such as described above with respect to FIG. 6. For example, some focus modes may be configured to replace objects with a particular distraction type with additional content while reproducing other objects that don't have that distraction type. In some cases, objects with a same classification can have different distraction types (e.g., two items within a "furniture" classification may be assigned different distraction types). Accordingly, the extended reality system may generate an extended reality environment in which a first object with a particular classification is reproduced and a second object with the same particular classification is replaced with additional content. An object may be assigned multiple distraction types.

The user can update the second parameter 704b, which may include selecting additional or alternative distraction types from a set of predefined distraction types and/or creating new distraction types.

A third parameter 704c may include a distraction level, which may be a measure of how distracting a particular object is determined to be for the user. The distraction level may be determined by one or more sensors which monitor a user's interaction with the object (e.g., gaze detection) in the physical and/or an extended reality environment and/or physical parameters of the user (e.g., changes in heart rate, respiration rate, eye movement, muscle tension, posture, or any other suitable parameters). The distraction level may characterize an amount of time the user is focused on the object. The distraction level may be used to by the extended reality system as part of a distraction criteria to determine whether to replace the object with additional content or reproduce the object within an extended reality environment. As described herein, different focus modes may define different distraction level thresholds for determining if an object should be reproduced or replaced. The third parameter 704c may be modified by the user through interactions with the extended reality system if the user wants the extended reality system to treat a particular object as more or less distracting than its current setting.

The parameters 704 shown in the user interface are provided as examples and the user interface can include additional or different parameters. In some cases, the extended reality may associate parameters with an object that are not modifiable by the user, and that may or may not be displayed in the user interface 700. For example, the extended reality system may determine certain characteristics of a particular object (e.g., size, color, etc.) that are not surfaced to the user, or are surfaced to the user without allowing the user to change the determined characteristics. These determined characteristics may also be used as distraction criteria when deciding whether to replace an object with additional content in the extended reality environment.

The option 706 to assign the object to a particular focus mode may allow the user to cause the system to automatically replace the object with additional content when operating in that focus mode. For example, the user interface may display one or more focus modes (e.g., FM-02) that are assigned to an object. When the extended reality system is operating in one of those focused modes, the object may be replaced with additional content regardless of whether other parameters 704 satisfy a distraction criteria.

As mentioned previously, the extended reality systems described herein may operate in different focus modes at different times. For example, embodiments are also directed to methods for operating head-mounted devices in focus modes that reduce distractions in an extended reality environment. The methods can include operating in different focus modes that have different distraction criteria used to determine whether an object should be replaced with additional content in an extended reality environment. For example, a first focus mode may have a first distraction criteria, and when operating in the first focus mode, the system may determine that a particular object does not satisfy the first distraction criteria. While operating in the first focus mode, the system may reproduce the physical environment including a representation of the particular object in the extended reality environment. A second focus mode may have a second distraction criteria, and when operating in the second focus mode, the system may determine that the particular object does satisfy the second distraction criteria. While operating in the second focus mode, the system may generate an extended reality environment that reproduces the physical environment and replaces the particular object with additional content. Accordingly different focus modes can be configured with different threshold and/or criteria for modifying, replacing or removing real-world objects within the extended reality environment.

Figure 8:
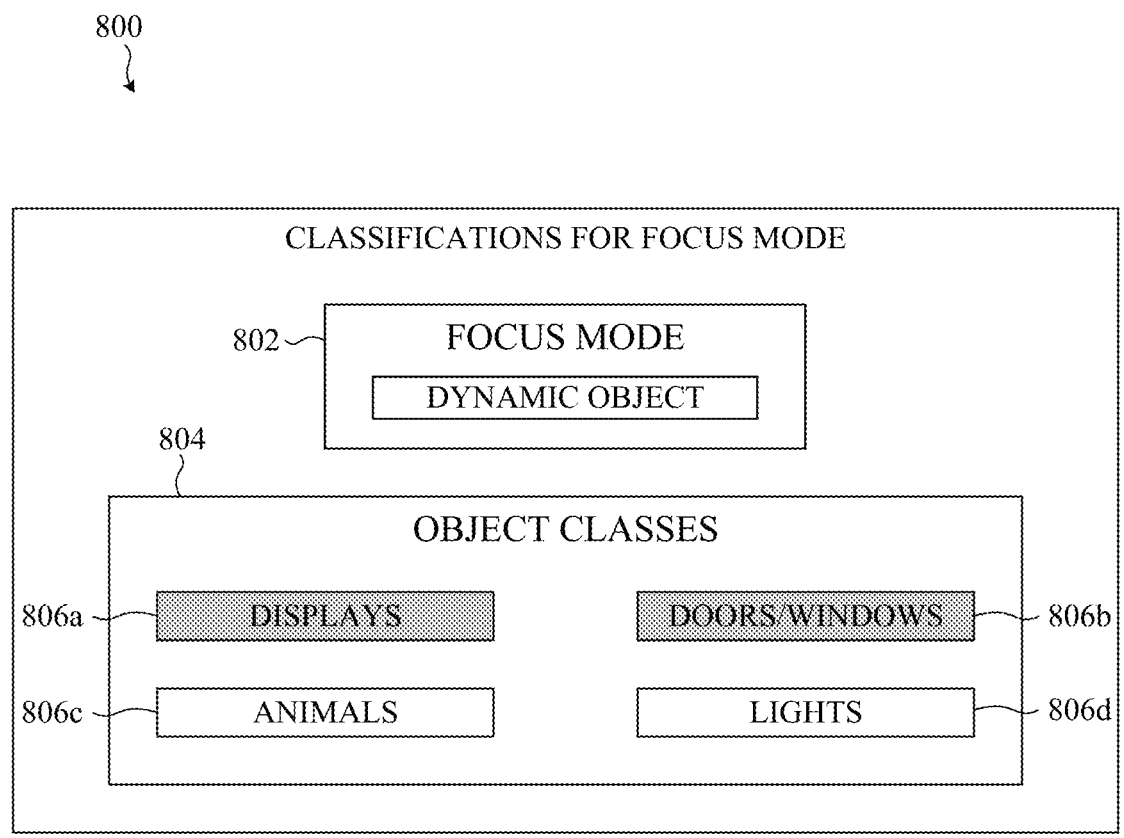
FIG. 8 shows an example user interface for setting distraction criteria for various focus modes that can be implemented by the extended reality system.

FIG. 8 shows an example user interface 800 for setting distraction criteria for various focus modes that can be implemented by the extended reality systems described herein. The user interface 800 can be displayed on a head mounted display of the extended reality system and provide controls for assigning distraction criteria to objects within the physical environment.

The user interface 800 can include a first region 802 for identifying and/or selecting a focus mode for which distraction criteria will be defined. The region 804 element may display a name of the focus mode and/or provide options for changing between different focus modes. For example, a user may user voice commands or other inputs to select a specific focus mode (e.g., "Dynamic Object" focus mode) to set one or more distraction criteria.

The user interface 800 can include a second region 804 that can be used to assign distraction criteria to one or more focus modes. In the example shown in FIG. 8, the distraction criteria can include object classes, which may define one or more classes of objects that will replace with additional content while operating in the designated focus mode. In other examples, the second region 804 can selected to display other distraction criteria and/or the user interface can include other regions for additional distraction criteria. For example, a user interface may display additional regions for defining distraction types (e.g., Dynamic Object as described with reference to FIG. 7), distraction level and so on. The user may be able to interact with the interface to select one or more defined options. For example, the user may select a first object class 806a (e.g., "Displays") and a second object class 806b ("Doors/Windows"), while a third object class 806c (e.g., "Animals") and a fourth object class 806d ("Lights") remain unselected.

The selected object classes 806 (and/or distraction types) can be used to determine which objects will be replaced with additional content to generate an extended reality environment while operating in the designated focus mode. For example, the extended reality system can use the first and second distraction classes 806a, 806b to identify objects that have displays (e.g., televisions, computers, and so on) and window and doors within the physical environment. The extended reality system can replace these object with additional content to reduce distraction in the extended reality environment while the extended reality system is operating in the first focus mode. For example, the extended reality environment can be generated to replace any displays with other objects such as a picture, make the display appear to be off, or remove the device from the extended reality environment. As another example, the extended reality environment can be generated to remove distractions caused by opening doors and/or movement in windows by generating additional content that makes the door appear to remain shut when opened and/or removes movement through a window such as a person walking by a window.

Figure 9:
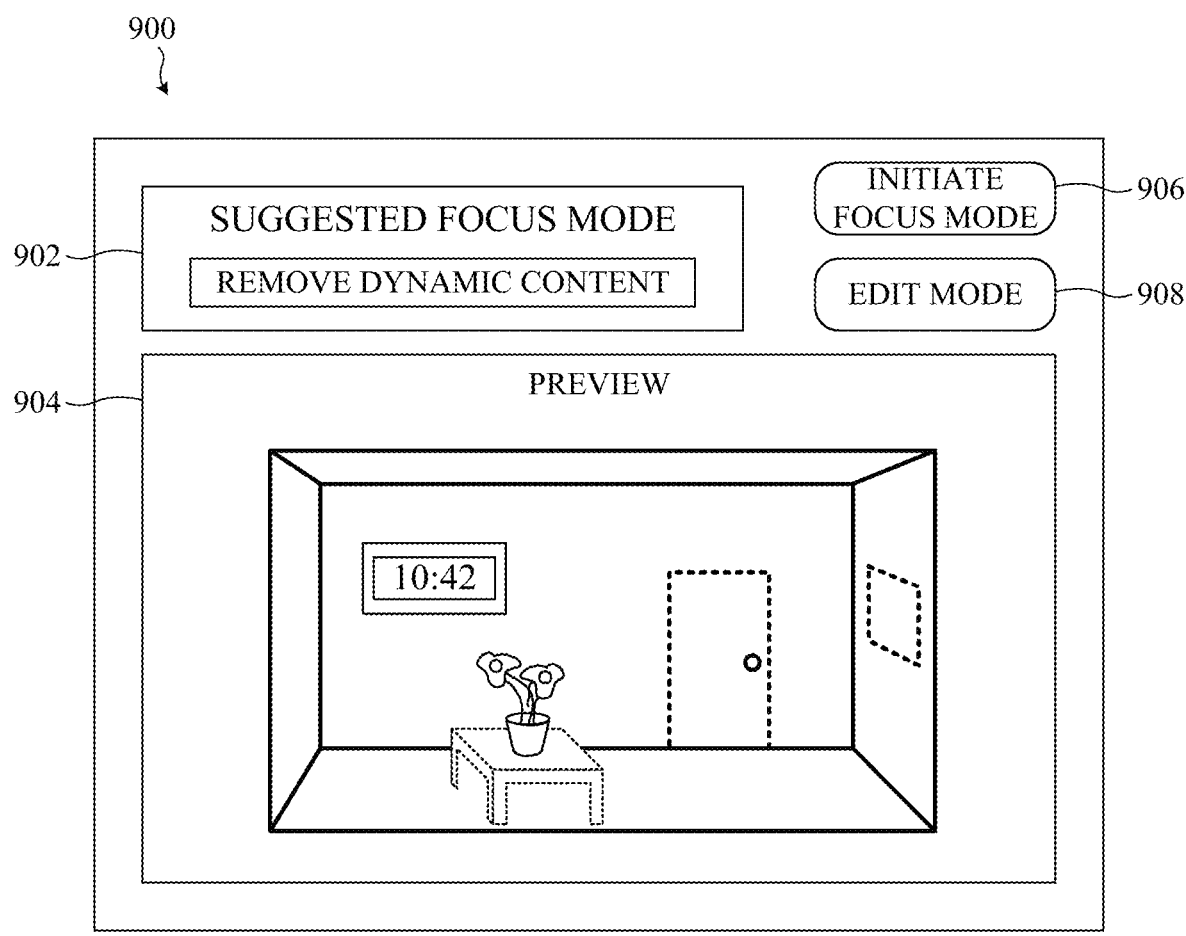
FIG. 9 shows an example user interface that presents a recommended focus mode and includes options for a user to select between different focus modes.

FIG. 9 shows an example user interface 900 that presents a recommended focus mode and includes options for a user to select between different focus modes. The user interface 900 can be displayed on a head mounted display of the extended reality system described herein.

The user interface 900 can include a first region 902 that presents a suggested focus mode that can be used to generate an extended reality environment. In some cases, the suggested focus mode can be based on an activity of the user. For example, the extended reality system may determine a current activity or an activity that the user is about to begin and select a focus mode based on the determined activity. In some cases, the extended reality system may use sensor data to determine an activity of a user. For example, the extended reality system may use imagining data, accelerometer data, temperature data, and/or any other suitable data to determine an activity. Additionally or alternatively, the extended reality system may access data source such as a calendar application to determine the activity. In some cases, the system can prompt a user to identify and/or confirm and activity or the user can otherwise indicate an activity.

In some cases, the suggested focus mode is based on a focus level required for an activity. For example, the extended reality system can associate a particular activity with focus level. Activities that require greater concentration may be associated with a higher focus level and activities that require less concentration may be assigned a lower focus level. The focus mode suggest in the first region can be based on a focus level associated with an identified current or upcoming activity of the user. For example, for an activity with a higher focus level the extended reality system may identify and suggest a focus mode that removes more distractions in the extended reality environment.

The user interface 900 can include a preview region 904, which displays a preview of the extended reality environment as adjusted using the suggested focus mode. For example, if the suggested focus mode is configured to replace a particular object(s) with additional content, the preview region 904 can display the extended reality environment to show the effect of replacing the particular object(s) with additional content. If a user selects a different focus mode in the suggested first region 902, the preview region 904 can update to show the extended reality environment in accordance with the user selected focus mode.

The user interface 900 can include a first interface element 906 that initiates the suggested focus mode. In response to a user selection of the first interface element, the extended reality system can generate the extended reality environment according to the suggested focus mode and display the extended reality environment on a head mounted display, as described herein.

The user interface 900 can include a second interface element 908 that can be used to edit (or navigate to a new menu that allows the user to edit) one or more parameters of a suggested focus mode. In some cases, a user may see the extended reality environment in the preview region 904 and desire to change an aspect of how the extended reality environment is generated. Accordingly, in response to selecting the second interface element, the extended reality system can be configured to display a user interface for modifying the suggested focus mode.

Figure 10:
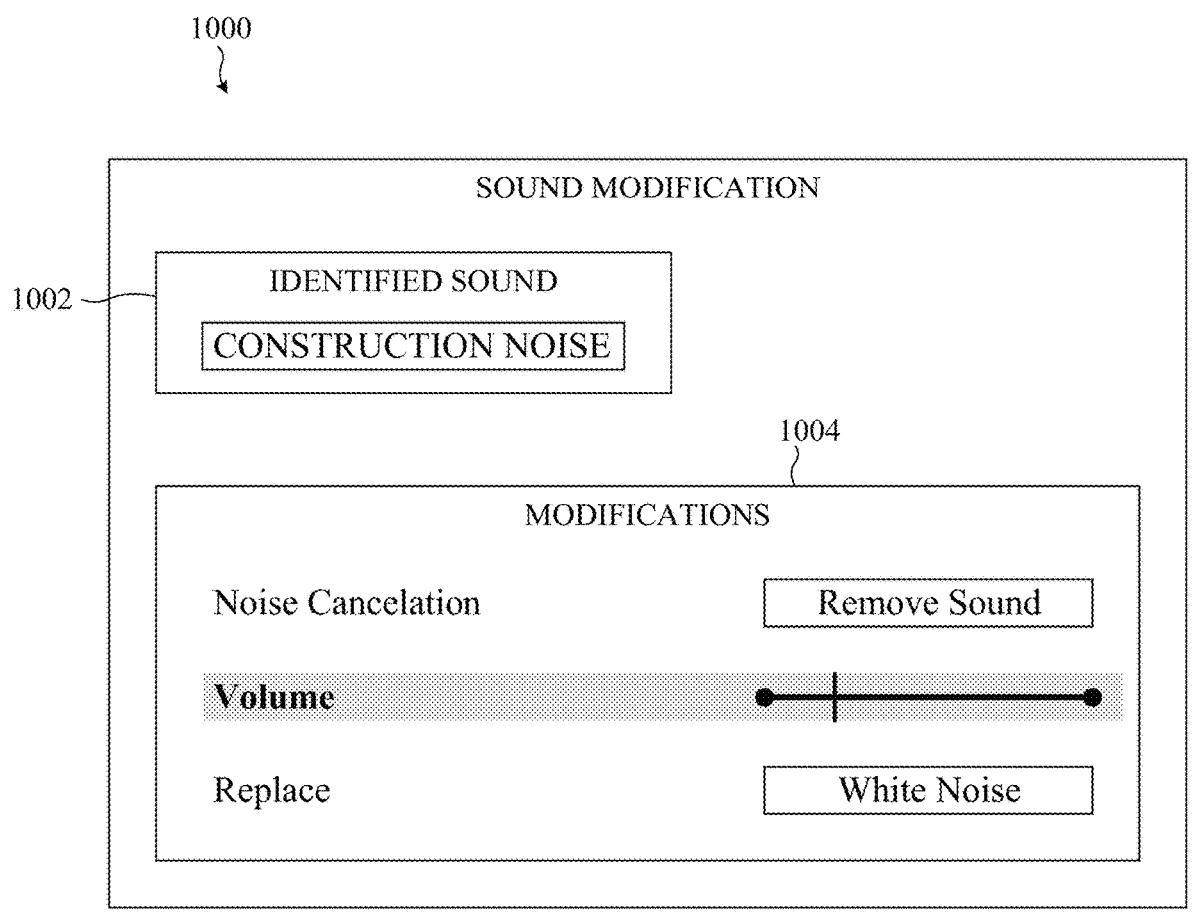
FIG. 10 shows an example user interface for identifying and/or modifying sounds for an extended reality environment.

FIG. 10 shows an example user interface 1000 for identifying and/or modifying sounds for an extended reality environment. The user interface 1000 can be displayed on a head mounted display of the extended reality system described herein. In some cases, the extended reality system can be configured to sense sounds in the physical environment and block, modify and/or replace detected sounds. The user interface 1000 can allow a user to define operating parameters for how the extended reality system responds to detected sounds. In some case, the particular sound modification settings can be associated with particular focus modes, and thereby, associated with particular display setting for addressing how objects are displayed in the extended reality environment. In other cases, a user may independently choose or select a sound modification settings independently of a visual based extended reality environment.

The user interface 1000 can include a first region 1002 that indicates a sound identified by an extended reality system for later modification. In some cases, the extended reality system may identify sounds within the physical environment and display the identified sounds in the first region 1002 of the user interface. The extended reality may be configured with one or more criteria for identifying whether a sound is potentially distracting, which can then be displayed in the user interface 1000 to the user. In some cases, the extended reality system may identify sounds using defined parameters such as an intensity level, duration, pitch, frequency and so on. In other cases, the extended reality system may use a machine learning component to identify particular sounds. For example, the machine learning component may output an identification of a sound such as a siren, alarm, construction noise, bird chirping, and so on. The extended reality system can be configured with a set of defined sounds that are modified by the system.

In some cases, the extended reality system may be configured with specific rules for addressing different identified sounds. For example, the extended reality system may always transmit a siren or other emergency sounds to a user. Other sounds, such as alarms may be delayed and or modified to reduce distraction, for example, while the extended reality system is operating in a focus mode. In some cases, the extended reality may allow a user to modify or define how a particular sound or class of sounds is modified. In some cases, the user interface 1000 with an identified sound may be displayed to a user when a new sounds is detected. In other cases, the extended reality system may set initial parameters for addressing an identified sound and prompt a user to modify the parameters (e.g., using user interface 1000).

The user interface 1000 can include a second region 1004 for setting parameters for modifying an identified sound. The second region can include a variety of controls that a user can set, some of which are shown in FIG. 10. For example, the second region 1004 may include a noise cancellation control and a user can select the noise cancellation control to remove the particular sound while in a focus mode. In some cases, the noise cancelation control may have different options for how it modifies a sound. For example, the noise cancelation control may allow a sound to be removed so that the user does not hear it. The second region may also include controls for modify the volume of a particular sound. For example, the volume control may cause the extended reality system to reduce a volume level of the transmitted sound to the user. Accordingly, the user may still hear the sound, but at a reduced volume. In other examples, the second region 1004 may allow a user to replace the sound with a different noise.

Figure 11:
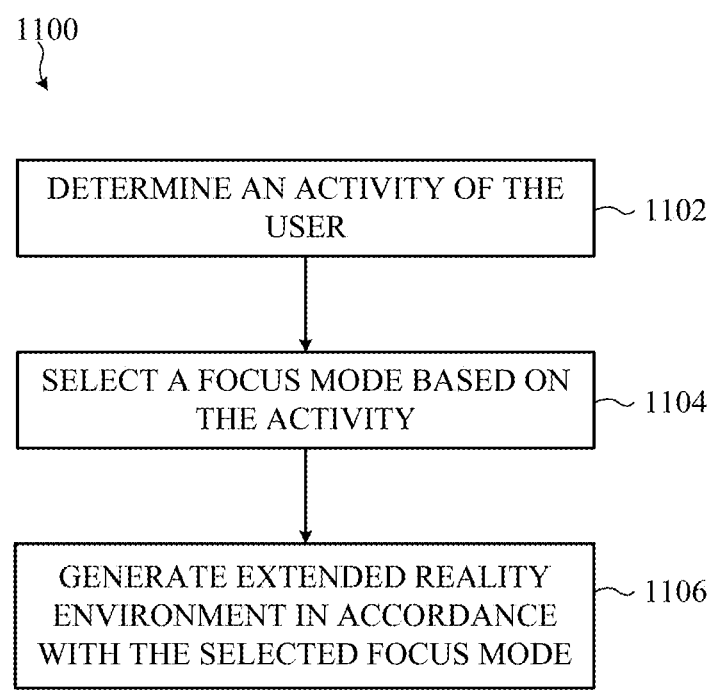
FIG. 11 shows an example process for modifying objects within the extended reality environment based on an activity of the user

FIG. 11 shows an example process 1100 for modifying objects within the extended reality environment based on an activity of the user. In some cases, the process can be automated, and the extended reality system may automatically enter a new focus mode or may automatically prompt a user to confirm to enter the focus mode. The process 1100 can be performed by an extended reality system including the extended reality systems described herein.

At operation 1102, the process 1100 can include determining an activity associated with a user. In some cases, the activity can be a current activity and in other cases, the activity can be a future activity, such as an activity that the user is about to start. The extended reality may determine an activity in a variety of ways. In some cases, the user may indicate the activity, for example, using an interface of the extended reality system. In other cases, the extended reality system may determine an activity using one or more sensors and/or other data sources. The extended reality system may prompt a user to confirm whether the identified activity is correct and/or provide an option for user to correct or specify a different activity.

In some cases, the extended reality system may determine an activity of a user using calendar data. For example, the extended reality system may access the user's digital calendar to determine if/what activities the user has scheduled. For example, the calendar data may indicate that the user has a scheduled activity that is upcoming. In some cases, the extended reality system may use sensor data to determine when the user is starting the activity. For example, imaging data may be used to identify environment aspects that indicate a user is in or entering a physical environment associated with the activity. Additionally or alternatively, other sensors data may be used such as accelerometer day, which may be used to identify motion associated with a particular activity.

In other cases, historical data can be used to predict an activity. For example, the system may track a user's interaction with the system and use this data to determine when a user is engaging in a particular activity or about to engage in a particular activity. For example, if a user performs an activity and initiates a particular focus mode on a routine schedule, the extended reality system may track this use and use it to determine when a future activity will occur.

At operation 1104, the process 1100 can include selecting a focus mode based on an activity. In some cases, the system may have a defined association between a particular activity and a particular focus mode. Accordingly, in response to determining that a user is engaging in the particular activity, the system may initiate the particular focus mode associated with the activity. In other cases, the system may select a focus mode based on historical data. For example, the system may determine that each time a user engages in a particular activity the user selects a specific focus mode. In this example, the system may suggest that focus mode and/or automatically initiate the focus mode in response to determining that the user is engaged in that activity or about to engage in that activity.

At operation 1106, the process 1100 can include generating an extended reality environment in accordance with the second focus mode. In some cases, the extended reality system may automatically generate and display the extended reality environment in response to detecting that the user is initiating and/or already performing the activity. In other cases, the system may prompt a user to start the focus mode. For example, the system may display an indication of the selected focus mode to the user and ask the user to provide an input to the system to start the selected focus mode.

Figure 12:
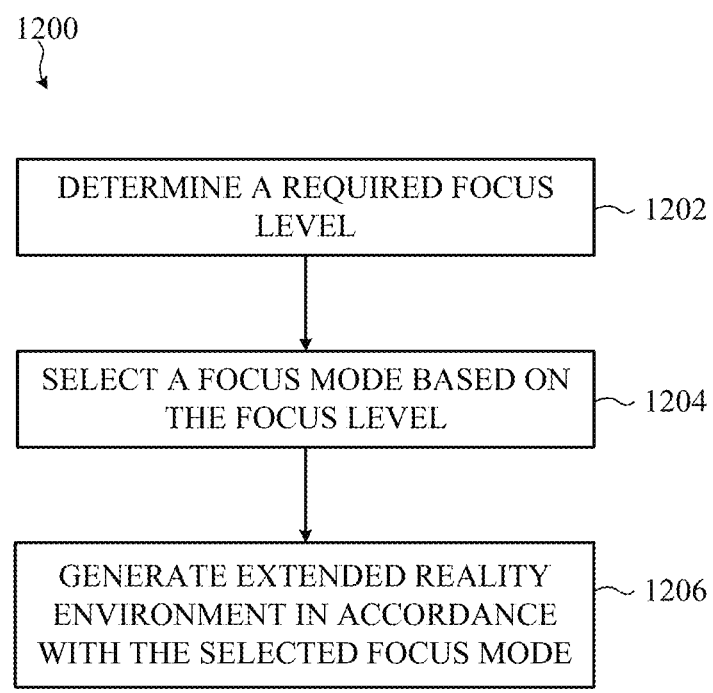
FIG. 12 shows an example process for modifying objects within the extended reality environment based on a determined focus level

FIG. 12 shows an example process 1200 for selecting an activating different focus modes or modifying a focus mode within the extended reality environment based on a determined focus level. The process 1200 can be performed by an extended reality system including the extended reality systems described herein.

At operation 1202, the process 1200 can include determining a required focus level for a user, which may represent how much attention a user desires (or is anticipated) to direct toward a given task. Accordingly, a higher focus level represents a level of attention that is expected, and thus an extended reality system will take a more comprehensive approach to reducing distractions. The required focus level may be selected from a discrete number of options, and may be represented as a numerical value (e.g., from 0 to 100), as a characterization (e.g., "high", "medium", or "low"), or the like.

In some cases, the required focus level may be based on an activity being performed or about to be performed by the user. The extended reality system may associate different activities with different required focus levels. In some cases, the focus level for an activity can be user defined and in other cases, the system may determine a focus level, for example, using sensor data. For example, the extended reality system may monitor parameters of a user such as eye movement, an amount time focused on an object associated with the activity, physiological parameters such as respiration, user movement (e.g., using accelerometer signals), and so on. The monitored parameters can be used to assign a required focus level for an activity. For example, if a user's gaze is focused on a particular object for a substantial portion of the time of the activity, the extended reality system may determine that the activity requires a higher level of focus.

In other cases, the required focus level may be set by the user in response to initiating an extended reality environment or a particular activity within the extended reality environment. The extended reality system can display different focus levels to a user, and the user can select a desired focus level. In other cases, the extended reality system may determine a required focus level based on a user state. For example, the system may obtain information about that amount of activity the user has performed that day, sleep data for the user and/or other metrics to determine if the user is likely to get distracted easily. For example, if the system determines that the user has performed a high number of activities that day (e.g., as compared to other days) and/or the user is fatigued (e.g., due to getting less than an average amount of sleep) the system may determine select a higher required focus level. That is, performing a high number of activities in a day or being fatigued may be cause a user to be more easily distracted. Accordingly, in some cases, the system can be configured to select a higher focus level to account for this factors.

At operation 1204, the process 1200 can include selecting a focus mode based on the required focus level. In some cases, the extended reality system can select a focus mode that removes more potential distracting objects by replacing the objects with additional content for higher required focus levels. In these examples, as the focus level increases the range of objects replaced with additional content may increase. In some cases, the extended reality may be configured with defined limits for the number of objects that are replaced with additional content. The defined limits may be used to prevent the extended reality from becoming different from the physical environment.

The extended reality system may select a subset of focus modes based on the required focus level and present those focus modes to a user for the user to select a particular focus mode. For example, each focus mode may be associated with a focus level or range of focus levels. The extended reality system may identify which focus modes correspond to the required focus level of the user (e.g., determined at operation 1202) and display those focus modes to the user.

At operation 1206, the process 1200 can include generating an extended reality environment in accordance with the selected focus mode. In some cases, the extended reality system may automatically generate and display the extended reality environment in response to determining a particular focus mode or the user selecting a particular focus mode. In other cases, the system may prompt a user to start the focus mode. For example, the system may display an indication of the selected focus mode to the user and ask the user to provide an input to the system to start the selected focus mode.

Figure 13:
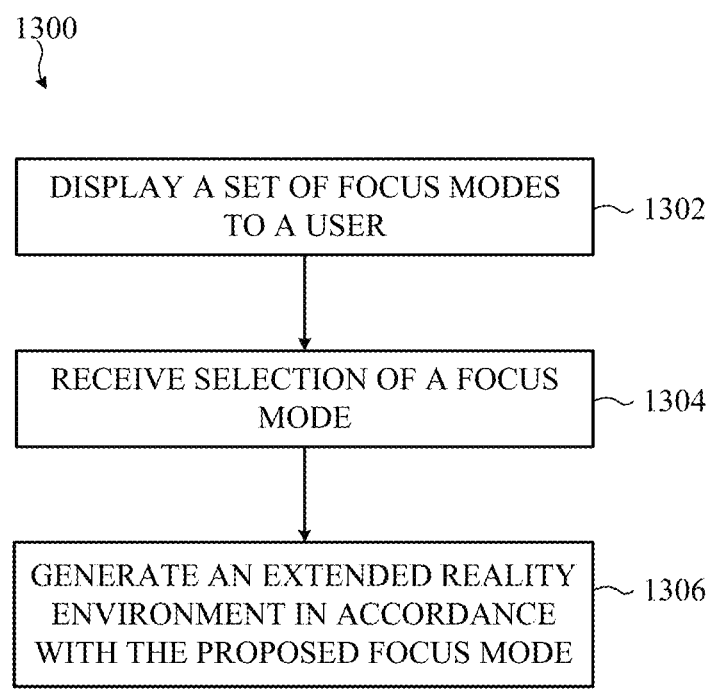
FIG. 13 shows an example process for detecting and replacing objects in the extended reality environment based on a user elected focus mode.

FIG. 13 shows an example process 1300 for detecting and replacing objects in the extended reality environment based on a user selected focus mode. The process 1300 can be performed by an extended reality system including the extended reality systems described herein.

At operation 1302, the system can include displaying a set of focus mode to a user. In some cases, the set of focus modes may include all the focus modes available to the user. In other cases, the system may identify a subset of focus modes, for example, based on an activity and/or focus level, and display the subset of focus modes. In some cases, the focus modes can be organized into different categories, which can be based on an effect provide by the focus mode. For example, one or more focus modes may cause an extended reality environment that replaces dynamic content on screens with static content to remove distractions from televisions, other computers (e.g., not associated with a current activity) and so on. A category of focus modes can be presented to the user.

In other examples, the system may determine focus modes to suggest to the user based on the user's previous interaction with the extended reality system. For example, if a user selects a particular focus mode every time they are performing a particular activity, the extended reality system may identify this routine and suggest the particular focus mode to the user.

At operation 1304, the process 1300 can include receiving a selection of a particular focus mode at the extended reality system A user may select a particular focus mode in a variety of ways including voice commands, gestures, using interface controls and so on.

At operation 1306, the process can include generating an extended reality environment in accordance with the selected focus mode. In some cases, the extended reality system may generate and display the extended reality environment in response to the user selecting a particular focus mode. In other cases, the system may prompt a user to start the focus mode. For example, the system may display an indication of the selected focus mode to the user and ask the user to provide an input to the system to start the selected focus mode.

Figure 14:
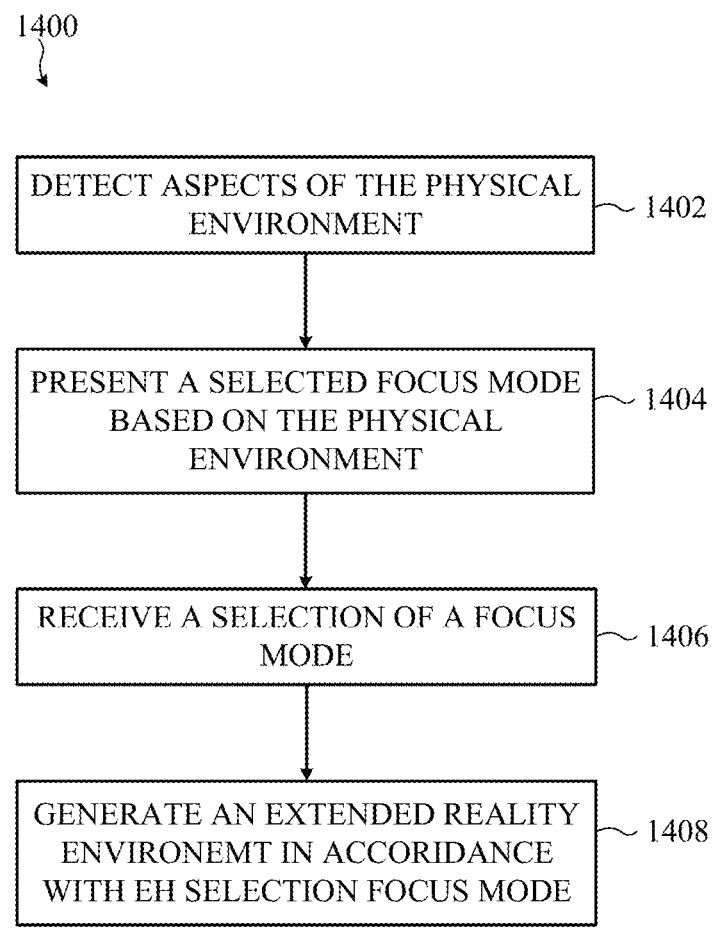
FIG. 14 shows an example process for recommending a focus mode at the extended reality system based on the user's environment.

FIG. 14 shows an example process 1400 for recommending a focus mode at the extended reality system based on the user's environment. The process 1400 can be performed by an extended reality system including the extended reality systems described herein.

At operation 1402, the process 1400 can include detecting aspects of the physical environment, which may be used to identify one or more focus modes. The extended reality system may evaluate the environment to identify the number, type and/or level of distraction present in the environment. In some cases, the system can select one or more focus modes to present to the user based on the current conditions of the environment. For example, if the extended reality system detects high levels of noise and activity, the system may select focus modes that remove both noise and dynamic objects. In other cases, the system may detect an object(s) that has been determined to be particular distracting to the user and may select focus modes that result in that object(s) being replaced with additional content in the extended reality environment.

At operation 1404, the process 1400 can include presenting the selected focus mode(s) to the user based on the conditions present in the physical environment. In some cases, the extended reality system may continue to monitor and evaluate conditions in the physical environment and suggest a new or modified focus mode based on changing conditions. For example, a first focus mode may be initiated when the physical environment is relatively quiet and there is a low amount of detected activity within the physical environment. Aspects of environment may change, and the noise and/or activity level may increase. In response to detecting this change in the physical environment, the extended reality system may suggest a different or modified focus mode to the user to accounts for these changes. In other cases, the extended reality system may determine that a user has changed activities and suggest a modified or different focus mode based on the detected change.

At operation 1406, the process 1400 can include receiving a selection of a particular focus mode at the extended reality system A user may select a particular focus mode in a variety of ways including voice commands, gestures, using interface controls and so on.

At operation 1406, the process can include generating an extended reality environment in accordance with the selected focus mode. In some cases, the extended reality system may generate and display the extended reality environment in response to the user selecting a particular focus mode. In other cases, the system may prompt a user to start the focus mode. For example, the system may display an indication of the selected focus mode to the user and ask the user to provide an input to the system to start the selected focus mode.

Embodiments are also directed to an extended reality system that includes a head-mounted display, a set of sensors and a processor. The system can be configured to identify different regions within a physical environment and generate an extended reality environment that applies a modification to one or more of the different regions to create a modified representation of the physical environment. The system can operate in a focus mode that uses the regional modification to reduce distractions in the extended reality environment. The extended reality system can receive imaging data of the physical environment around a user and identify different regions within the physical environment. In some cases, the environment can be separated into a region that is associated with a current activity and a region that is peripheral to the current activity.

The extended reality system may generate an extended reality environment that reproduces the region associated with the current activity and modifies the appearance of the region that is peripheral to the current activity. For example, the peripheral region can be modified by blurring (or otherwise changings a focus) to help focus the user's attention on the primary region associated with the activity. For example, blurring the peripheral region may reduce details of objects and/or other portions of the peripheral region to reduce the potential for a user to focus on these aspects of the extended reality environment. In other cases, a color profile, brightness, contrast, or other visual effects of the peripheral region can be modified. In some cases, a filter or other visual affect can be applied to the peripheral region. For example, a synthetic style transfer can be applied to the peripheral region that causes portions of the physical environment in the peripheral region to be displayed in a stylized fashion. The stylized fashion may cause the peripheral region to appear as though it were drawn, painted or otherwise differentiated from the primary region that reproduces the physical environment.

In some cases the modification applied to the peripheral region can be selected based on a current activity of a user. For example, the modification may be based on a focus level that is associated with a current activity. If an activity is associated with a higher level of focus, the extended reality system may apply a great modification to the peripheral region and if the activity is associated with a lower level of focus, the extended reality system may apply a less significant modification to the peripheral region. In some cases, a same type of modification can be adjusted based on the activity and/or the associated focus level. For example, a modification that produces a blur effect in the peripheral region may have less blurring for an activity with a lower focus level and more significant blurring for an activity with a higher focus threshold. In other cases, different region affects can be applied based on the focus level associated with an activity.

One or more regional modifications can be applied in an extended reality environment in addition to or as an alternative to an object based modification as described herein. For example, the extended reality system can generate an extended reality environment in which a first region of a physical environment is reproduced, and a second region of the physical environment is modified to create a different visual effect (e.g., blur effect, style transfer, and so on). The extended reality can also identify an object in the first or the second region and replace the object with additional content as described herein.

Embodiments are directed to extended reality systems that can identify an object within a physical environment and reproduce that object in the extended reality environment while applying a regional affect to other portions of the extended reality environment. For example, the extended reality system may identify an object(s) that the user is currently interacting with and reproduce the real-world object while generating an extended reality environment around the object. The extended reality system may apply a regional modification to the extended reality environment surrounding the object. Accordingly, a user may be able to view and interact with real-world objects while in an extended reality environment and the extended reality environment can be configured to help increase a user's focus/attention on the real-world object.

Embodiment can also include extended reality systems that are configured to generate regional modification to generate modified representations in extended reality environment based on current state of the user. The extended reality system may determine and monitor an attentive state of a user and select regional modification for an extended reality environment based on the user's attentive state. For example, if the extended reality system determines that a user has a high attention level, the system may apply a less signification modification regional in the extended reality environment. Alternatively, if the extended reality system determines that a user has a lower/decreased attentive state, the system may apply a more signification regional modification in the extended reality environment. In some cases, the extended reality system may periodically or continually monitor a user's attentive state and update or otherwise change the modification based on changes in a user's attentive state. Accordingly, the system may dynamically adapt modification in an extended reality environment based on changes in a user's state and/or changes in the environment around the user.

Figure 15A:
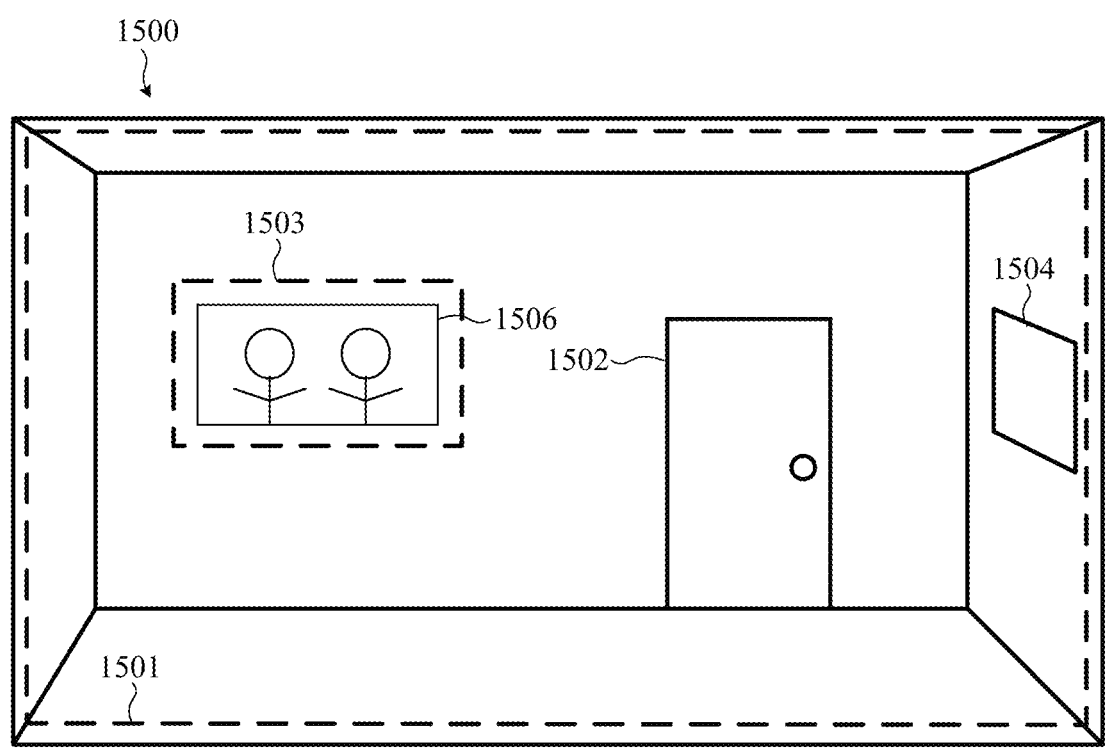
FIGS. 15A and 15B an example of an extended reality environment that can be generated by an extended reality system based and apply different modification to different regions of a physical environment around a user.
Figure 15B:
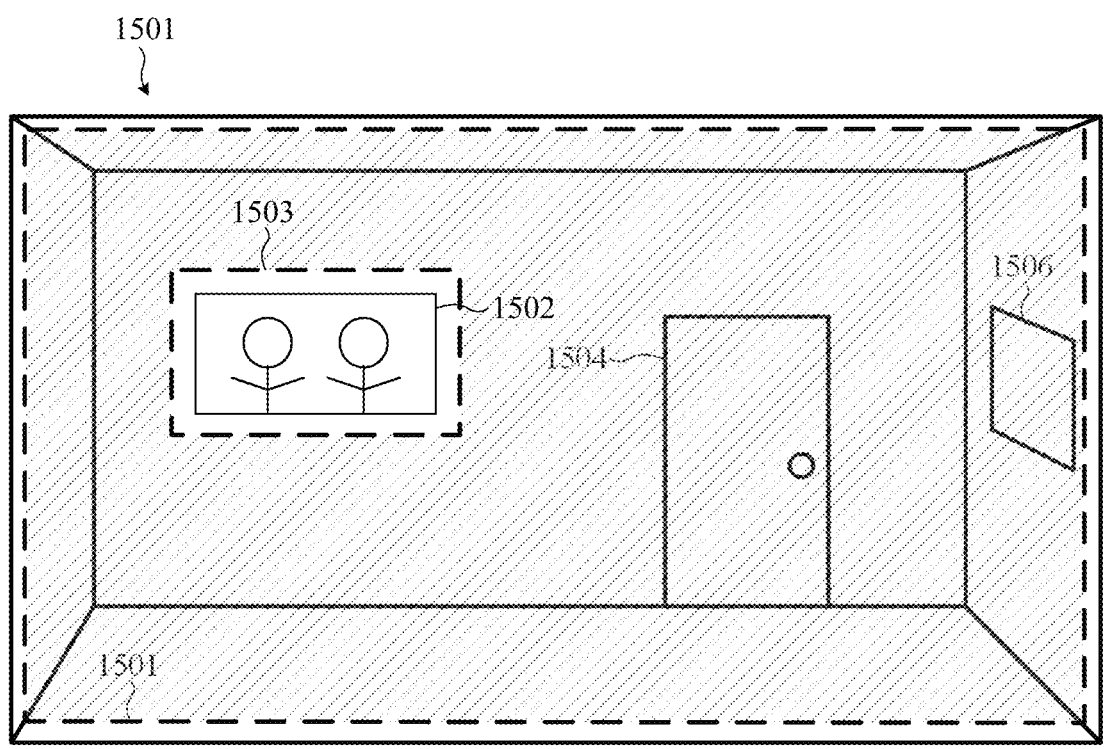

FIGS. 15A and 15B an example of an extended reality environment 1501 that can be generated by an extended reality system based and apply different modifications to different regions of a physical environment 1500 around a user. The extended reality environment 1501 may be an example of the extended reality environments described herein and displayed to a user by an extended reality system as described herein.

The physical environment may include a door 1502, a window 1504 and an object 1506. The extended reality system can be configured to enter a focus mode that reduces distractions by identifying one or more regions of the physical environment and generating an extended reality environment that includes a modified representation of the region. For example, the extended reality system may be configured to determine that the door and/or the window are likely to distract a user. For example, opening and closing of the door and/or movement seen through the window 1504 may cause the user to focus on these portions of the room.

The extended reality system can use imaging data to identify different regions of a physical environment. For example, the extended reality environment may enter a focus mode that modifies a first region 1501 of the physical environment that include the door 1502 and the window 1504 and reproduces a second region 1503 that includes the object 1506. The extended reality system can identify the first region 1501 and the second region 1503 using imaging data and define boundaries around these regions, which can be used to determine which regions of the physical environment should be reproduced and which regions of the physical environment should be modified in the extended reality environment.

In some cases, the extended reality can determine and select the regions based on a current activity of the user. The extended reality system may determine an activity associated with a user, as described herein. For example, the object 1502 may include a display and the extended reality system may identify that the user is interacting with the object 1502. The extended reality system may also identify objects that meet a distraction criteria for the focus mode, such as the door 1504 and the window 1506, as described herein. The extended reality system may select the first region 1501 to include the door 1504 and the window 1506 and select the second region to include the object 1503 associated with the activity. In some cases, the extended reality system may designate the region associated with the activity (e.g., the second region 1503) as the primary region and other region (s) (e.g., the first region 1501) as the peripheral region.

FIG. 15B shows an example extended reality environment 1501 that includes a modified representation of the first region 1501 and a reproduction of the second region 1503. The extended reality system can generate the modified representation by applying a modification to the imaging data. The modification to the imaging data can be applied in a variety of ways to produce different visual representations of the second region. In some cases, the modification can be a blur effect which decreases the sharpness of the peripheral region 1501 such that it appears out of focus (which may make it harder for a user to perceive and be distracted by details within the peripheral region). In other cases, the modification can intentionally alter other display parameters such as a color profile, brightness, saturation, color temperature and/or the like of the peripheral region 1501 to distort how the representation of the physical environment compares to the actual physical environment. For example, a portion of the peripheral region 1501 may be changed to a monochromatic color scheme, which may reduce distractions associated with colorful, visually "busy" portions of the physical environment. Additionally or alternatively, the modification can apply a style transfer to the peripheral region 1501 which can include displaying the peripheral region 1501 to appear in black and white, a sepia effect, display the peripheral region in accordance with particular artistic style and/or any other suitable visual modification.

A modification (e.g., the blur affect, color profile, etc.) can be applied to different degrees ranging from a slight modification of the visual representation of the peripheral region 1501 to a more significant modification to the peripheral region 1501. In some cases, the degree of the modification can be based on an activity, a focus level associated with the focus mode, a distraction level of the objects in the peripheral region 1501, and so on.

In some cases, the type of modification can be selected based on an activity associated with a user, such as a current activity. A user can assign particular modification to a particular activity. In other cases, the system may select a modification based on parameters associated with a particular activity. For example, for an activity that involve a user engaging with different regions of an extended reality environment, the extended reality system may select a modification that shows objects or other features in the peripheral region 1501. This may help a user maintain a continuity as they transition focus to different regions of the room. In other examples, an activity may involve a user focusing on a particular object that is unlikely to move. In these cases, the extended reality system may select a modification that blocks our more significantly alters the peripheral region, which may help maintain a user's focus on the current activity.

Figure 16:
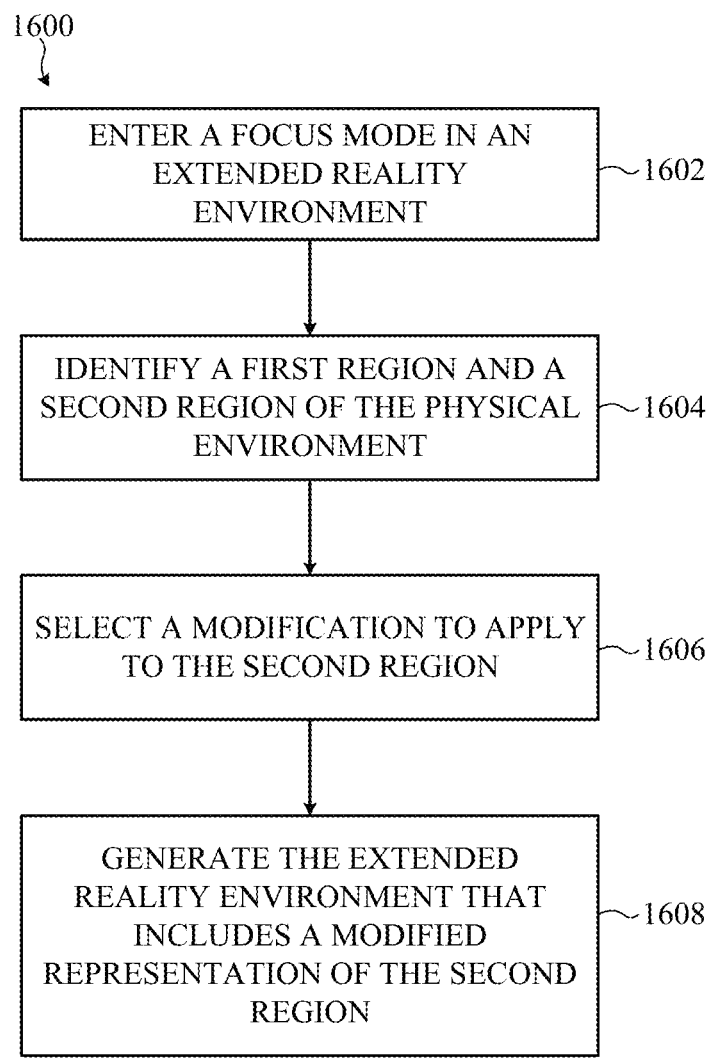
FIG. 16 shows an example process for identifying different regions of a physical environment and generating an extended reality environment that applies a visual modification to one or more of the regions

FIG. 16 shows an example process 1600 for identifying different regions of a physical environment and generating an extended reality environment that applies a visual modification to one or more of the regions. The process 1600 can be performed by an extended reality system such as the extended reality systems described herein.

At operation 1602, the process 1600 can include entering a focus mode in an extended reality environment. The focus mode can generate an extended reality environment that reduces distractions in a physical environment around a user. In some cases, the process can be initiated in response to an activation criteria being met, as described herein.

At operation 1604, the process 1600 can include identifying a first region and a second region of the physical environment. In some cases, the first and second regions can be determined based on a user's interaction with the physical and/or virtual environment. For example, the extended reality system may determine a region of the environment that the user is primarily interacting with, which may be determined based on a time duration that the user is engaged with the region. In some cases, the extended reality system may determine an activity that the user is performing and determine a region of the environment based on the activity. For example, an activity such as reading a book can be associated with particular objects, such as the book, a desk, chair and so on. The extended reality system may identify regions of the environment by identifying these objects within the environment.

In some cases, the second region can be determined using the first region. For example, when the physical environment is a room, the second region may be the rest of the room that does not include the first region. In other cases, the second region may be determined based on a proximity to a user. For example, the second region can be a defined distance from the user, defined amount of area around the user that does not include the first region, and/or the like. In other cases, the second region can be identified from potential distractors within the environment. For example, the extended reality system may use one or more sensors to identify objects such as window, doors, screens and so on as described herein. In some cases, the extended reality system may identify objects based on user defined distractors, and/or objects that the system has learned draw a user's attention from a current task. In these cases, the extended reality system may select the second region to include one or more identified objects.

At operation 1606, the process 600 can include selecting a modification to apply to the second region. The modification can be applied to the region that does not involve a current activity of a user. However, in other cases, the modification may be applied to the first region which involves the current activity. In these cases, the modification may be used to enhance a user's focus on a current activity and/or draw a user's attention to specific physical and/or virtual objects that are associated with the activity.

The extended reality system can apply a modification to the second region generated in the extended reality environment. The modification can include the modification described herein (e.g., with respect to FIGS. 15A and 15B) and modify a visual appearance of the second region. The modification(s) can be selected based on an activity, parameters of the environment, parameters of the user and so on, as described herein. In some cases, the modification can be selected based on a time of day and/or environment of a user. For example, for the same activity, a first modification may be selected in the morning and a different modification may be selected in the evening. In some cases, for the same activity, a first modification may be selected in a first environment (e.g., office) and a second activity may be selected in a second environment (e.g., home).

At operation 1608, the process 1600 can include generating the extended reality environment that includes a modified representation of the second region. The extended reality can be generated as described herein and include the selected modification. Th extended reality system may be generated to reproduce the first region so that it reproduces the physical environment. In some cases, the extended reality system can be updated the extended reality environment including the regions (e.g., size, shape, location, effect, and so on) based on changing environmental parameters and/or changes in how the user is interacting with the environment.

Figure 17A:
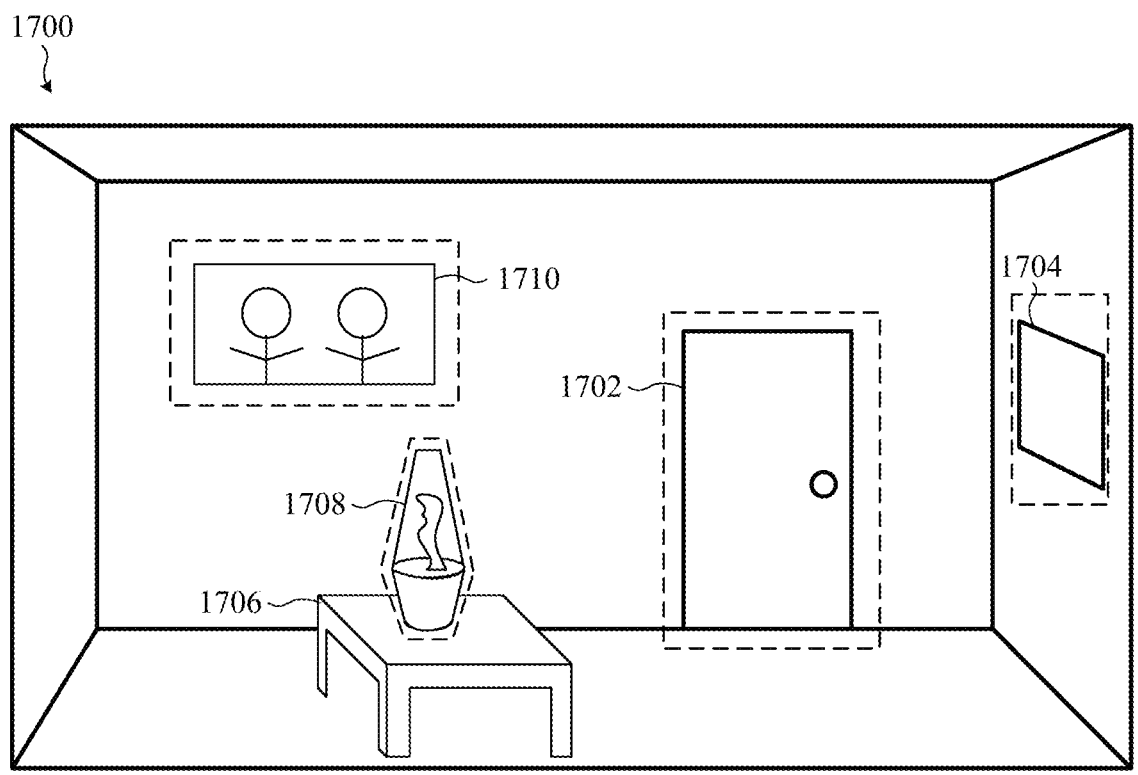
FIGS. 17A and 17B show example extended reality environment that may be used to analyze the physical environment and select a focus mode based on sensed parameters of the physical environment.
Figure 17B:
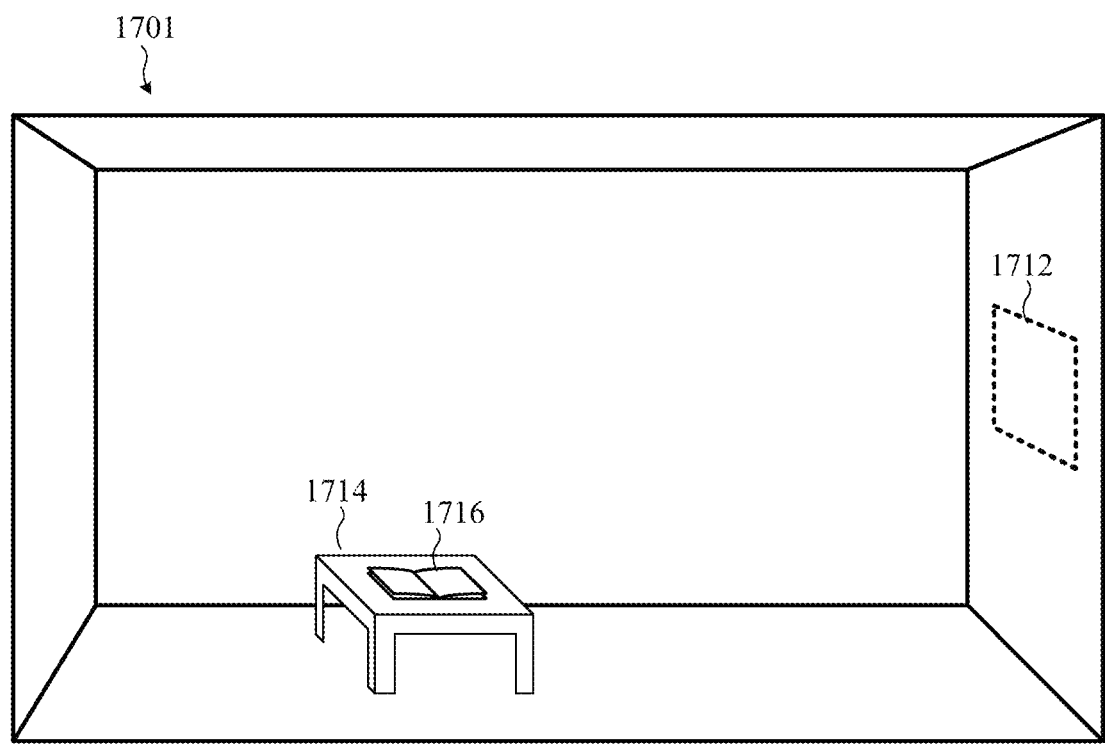

FIGS. 17A and 17B show example extended reality environment that may be used to analyze the physical environment and select a focus mode based on sensed parameters of the physical environment. The extended reality system can be configured to evaluate the environment and select a focus mode, which can be automatically initiated or recommended to a user as described herein. The extended reality system may be configured to select a focus based on the types of objects and/or potential distractors within an environment. For example, a physical environment with multiple distracting objects that are positioned across a space may require a focus mode that modifies a greater portion of an environment. In these cases, the system may select a regional based focus mode. In other cases, a physical environment may have a single distracting object and/or the distractors are positioned closer together. In this case, the extended reality system may select an object based focus mode that replaces specific objects with additional content.

FIG. 17A shows an example of a first extended reality environment 1700 where the extended reality system may select a regional focus mode. The first extended reality environment 1700 that can be generated from a surrounding physical environment. The extended reality environment 1700 can include a door 1702, a window 1704, a desk 1706, a lamp 1708, and a television 1710. The system may determine that multiple objects in the environment are assigned a distraction type or otherwise satisfy a distraction criteria. For example, the door 1702, the window 1704, the lamp 1708 and the television 1710 may satisfy a distraction criteria, as described herein.

The extended reality system may sense a number of parameters associated with the identified objects. For example, the system may determine a number of objects, relative positioning of the objects, a distance between the objects, or other parameters. The extended realty system can select a focus mode based on the sensed parameters meeting one or more criteria. For example, if a number of objects exceeds a threshold (e.g., two objects), the extended reality system can select a regional based focus mode. In other example, if the objects are positioned a threshold distance from each other the system can select the regional focus mode.

In yet other embodiments, specific types/classed of objects may trigger the extended reality system to select the regional based focus mode. For example, a door or window may result in the system applying a regional based focus mode.

FIG. 17B shows an example of a second extended reality environment 1701 where the extended reality system may select a regional focus mode. The first extended reality environment 1701 that can be generated from a surrounding physical environment. The extended reality environment 1701 can include a room that has a window 1712, 1 table 1714 and a book 1716. The extended reality system may identify the window 1712 as being associated with a distraction type and/or meeting a distraction criteria as described herein. In this example, the extended reality system may select an object based focus mode to replace the window with additional content as described herein. The object based focus mode may be selected based on the number of distracting objects (e.g., the window 1712) being below a threshold. The object based focus mode may also be selected based on the location of the distracting object to other objects (e.g., objects associated with a current activity).

Figure 18:
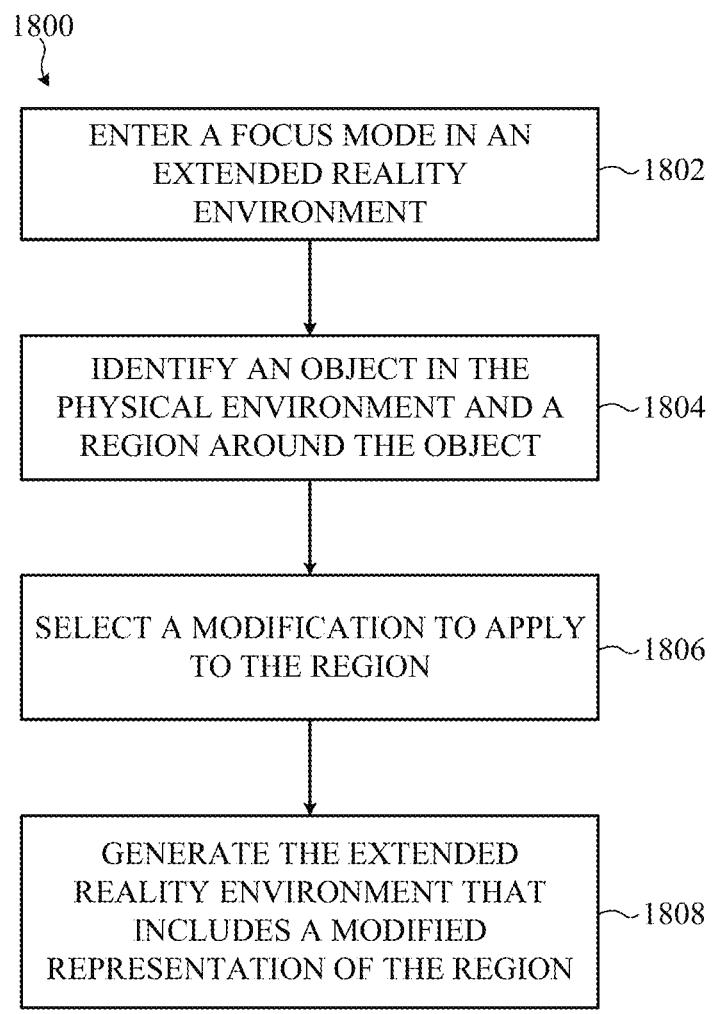
FIG. 18 shows an example process that can identify one or more objects within a physical environment and apply a regional modification to a region(s) around the object(s), but reproduce the object(s) in the extended reality environment.

FIG. 18 shows an example process 1800 that can identify one or more objects within a physical environment and apply a regional modification to a region(s) around the object(s), but reproduce the object(s) in the extended reality environment. The process 1800 can be performed by an extended reality system including the extended reality system described herein.

At operation 1802, the process 1800 can include entering a focus mode in an extended reality environment. The focus mode can be configured to reduce distractions by applying regional modification around one or more objects in an extended reality environment. For example, the extended reality environment can be configured to increase a focus on an object by removing distractions around the object and/or increasing the visual importance of the object within the extended reality environment. Accordingly, regional modification may be applied that draw a user's attention to the object.

At operation 1804, the process 1800 can include identifying an object in the physical environment and one or more regions of the environment around the object. In some cases, the object can be identified based on a user interaction with the environment and/or object. For example, if a user is reading the book, the extended reality system can detect the user's focus on the book (e.g., using gaze detection) and identify the book as a target object. In some cases, the extended reality system may prompt a user to confirm that the identified object is correct, for example, by displaying a confirmation notification within the extended reality environment.

In other cases, the extended reality system may identify one or more objects based on an activity associated with the user. The extended reality system may identify an activity using the techniques described herein. The activity may be associated with one or more objects and the user may not be interacting with the objects. Accordingly, identifying the objects based on an activity can allow the extended reality system to apply a modification that draws a user's attention to the objects. In some cases, as an activity progresses, the extended reality system may update the identified objects. For example, an activity may be configured to progress through a set of objects. The extended reality system may apply a first modification to highlight a first object, followed by a second modification that highlights a second object and so on. Accordingly, the identified objects can be used to direct a sequence of actions.

At operation 1806, the process 1800 can include selecting a modification to apply to the region, which can include one or more of the modification described herein. In some cases, the modification can be based on the type/class of object, as described herein. For example, if the object is a book the modification that is applied to a region around the book may include elements of the room, such as a table or desk that the book is place on, which may help maintain a user's orientation with the environment. Additionally or alternatively, the amount of modification may be based on the activity and/or focus level of an activity as described herein.

At operation 1808, the process 1800 can include generating an extended reality environment that includes a modified representation of the identified region around the object using the selected modification. In some cases, the extended reality system can generate an extended reality environment that reproduces the object using virtual content so that the virtual object appears to be the actual real-world object and displayed the region around the object using the selected visual modification. In these cases, the user may interact with the virtual object and the extended reality system can be configured to dynamically update the virtual object based on the user interaction.

In other cases, the extended reality system may show the actual real-world object and generate virtual content around the actual real-world object so that the extended reality environment includes both physical and virtual content. In these cases, the extended reality system may overlay the modification on the region surrounding the object. Accordingly, the user may interact with the actual object while the region around the object appears with the visual modification.

Figure 19:
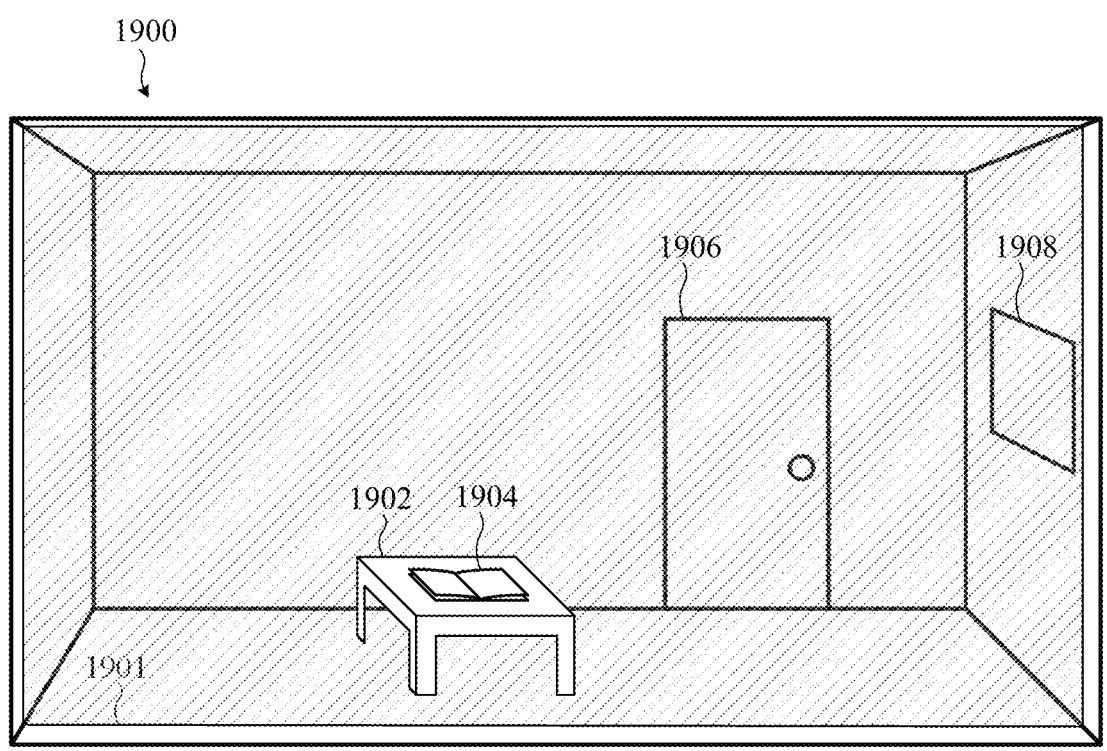
FIG. 19 shows an example of an extended reality environment that include one or more real-world objects that are shown to a user with a virtual modification applied to the region around the objects.

FIG. 19 shows an example of an extended reality environment 1900 that include one or more real-world objects that are shown to a user with a virtual modification applied to the region around the objects. The extended reality environment 1900 can include a table 1902 and a book 1904 positioned on the table 1904. The extended reality system can determine that the table 1902 and book 1904 are going to be shown to the user. For example, the extended reality system may determine that the table 1902 and the book are associated with a current activity and/or the user is currently interacting with these objects. The extended reality system may identify region 1901 as the region that the modification will be applied to. In this example, the rest of the room may be selected as the region 1901. However in other examples the region can be configured differently and include a smaller portion of the room.

The extended reality system 1901 may generate the extended reality environment to show the physical table 1902 and the physical book 1904 while using a virtual display to apply the modification to the region around the table 1902 and the book 1904. Accordingly, the user may interact with actual real-world objects in the context of the extended reality environment 1900.

The modification can be applied to other objects/portions of the environment so that these other objects are still shown and/or displayed to the user, but with the modification applied. For example, the region with the modification applied may include the door 1906 and the window 1908. The extended reality system can apply the modification so that the extended reality environment 1900 shows features of the door 1906 and the window 1908, but with a modified viral affect. For example, of the modification is a blur affect which changes the focus of the region 1901, the extended reality environment may display the door 1906 and the window 1908 with the blur affect so they appear out-of-focus to the user.

Figure 20A:
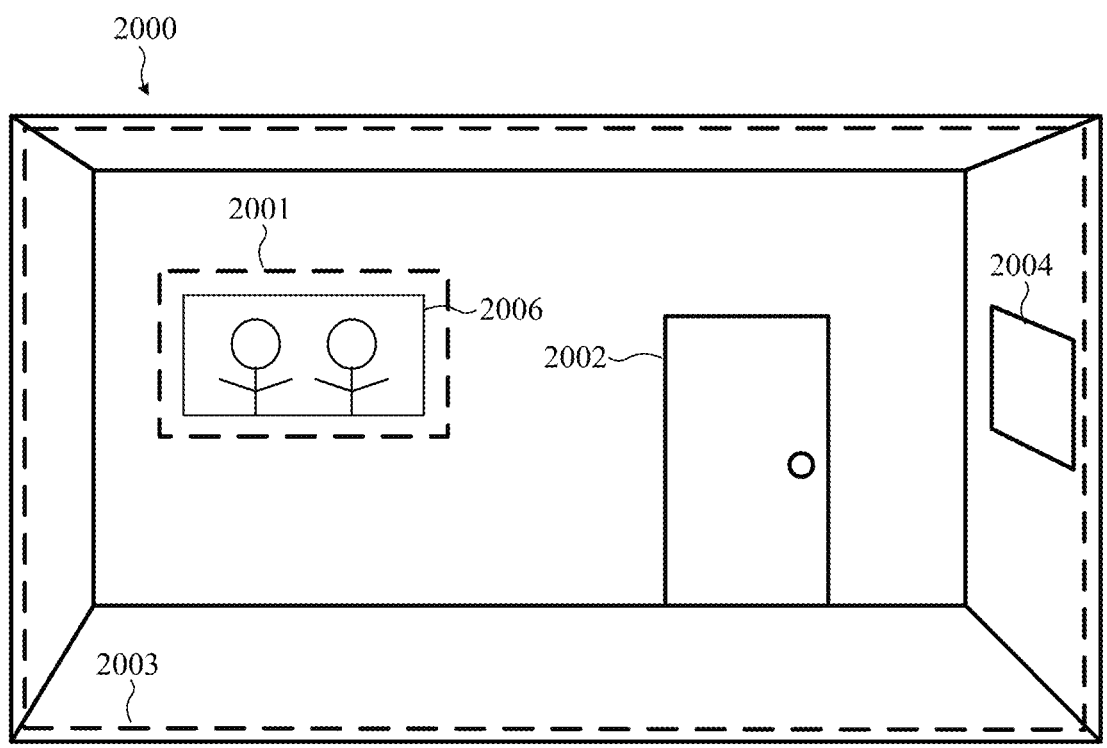
FIGS. 20A and 20B show an example of an extended reality environment which can be configured to replace a physical environment with additional content.
Figure 20B:
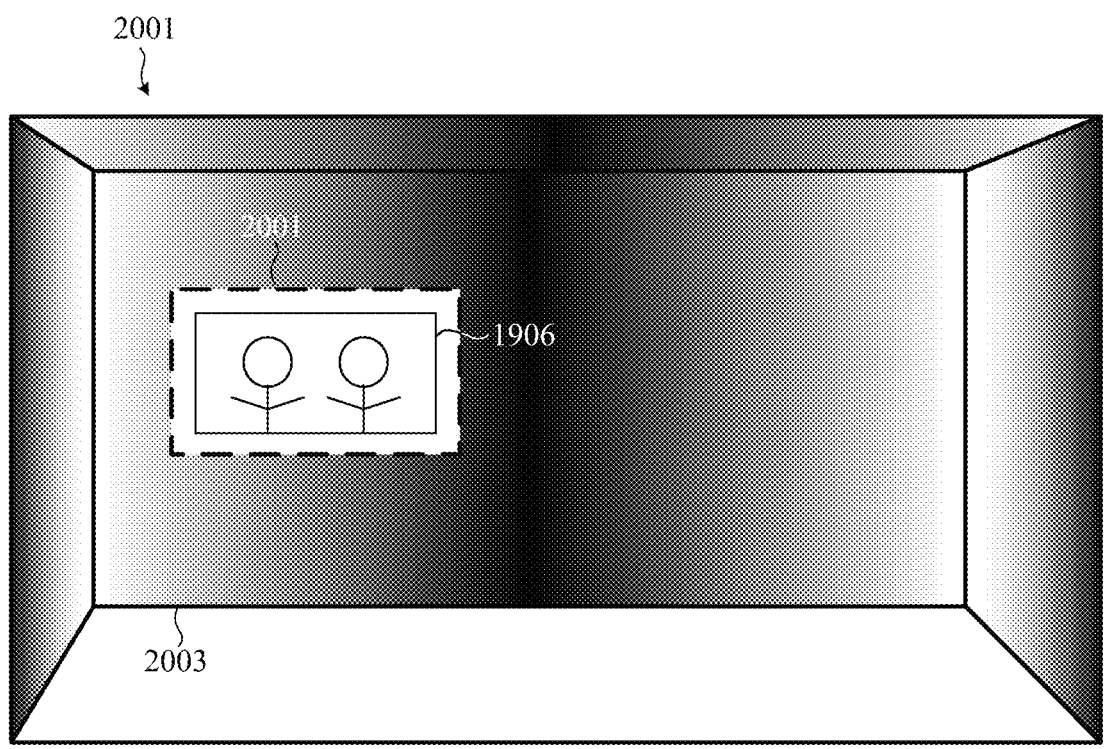

FIGS. 20A and 20B show an example of an extended reality environment 2001 which can be configured to replace a physical environment 2000 with virtual content. FIG. 20A shows a physical environment 2000 that includes a door 2002, a window 2004, and television 2006 within a room. In some cases, the extended reality system can generate a modification that replaces one or more regions of the room with other virtual content or objects in the extended reality environment 2001 with virtual content. For example, the extended reality system may identify a first region 2001 associated with the television 2006. For example, the user may be interacting/watching the television. The extended reality system may identify a second region 2003 that includes other portions of the physical environment 2000 in which the modification will be applied to.

FIG. 20B shows an example extended reality environment that can be generated based on the first region 2001 and the second region 2003. The extended reality system can generate virtual content in the second region that removes objects or other features of the physical environut 2000 from the extended reality environment 2001. For example, the modification to the second region 2003 may include a virtual overlay that focuses the user's attention on the first region 2001.

Figure 21:
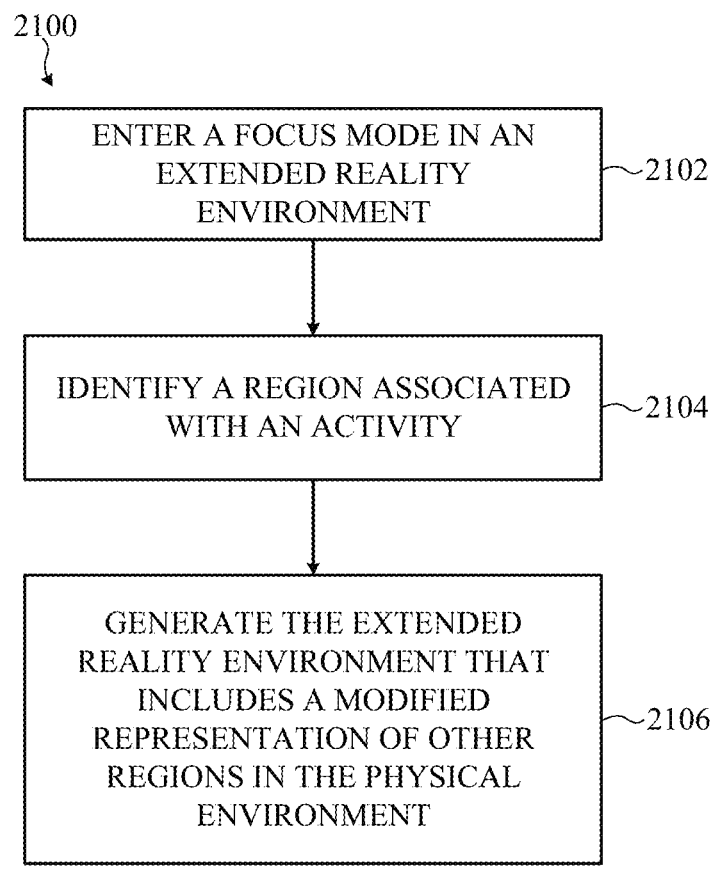
FIG. 21 shows an example process for determining a region associated with an activity and applying a regional modification to other portions of the extended reality environment.

FIG. 21 shows an example process 2100 for determining a region associated with an activity and applying a regional modification to other portions of the extended reality environment. The process can be performed by an extended reality system including the extended reality systems described herein.

At operation 2102, the process 2100 can include entering a focus mode in an extended reality environment. The focus mode can be configured to reduce distractions by identifying a region that is associated with an activity of the user and applying a regional modification to other portions of the extended reality environment. For example, the extended reality environment can be configured to increase a focus on an activity by reproducing a region associated with the activity, while applying a modification to other regions of the environment. The region associated may be determined based on the activity.

At operation 2104, the process 2100 can include identifying a region associated with the activity. In some cases, the size or area of the region can be determined based on a type of activity. An activity that includes a user interacting in a limited space may have a smaller region, while an activity that includes a user interacting with objects over a greater area may have a larger region. For example, for an activity that involves a user interacting with a book the extended reality system can be configured to define the region to include the area immediately around the book, such as a top of a table that the book is place on, a desk, and/or the like. For an activity that involves a greater area, such as a user cooking, the extended realty system can define the region to include a greater area, which may be based on objects that will be used such as a counter, an oven, a refrigerator and so on.

In some cases, the extended reality system can receive an indication of a region from the user. For example, the extended reality system may display a virtual environment of the activity and receive inputs from the user that defines a region associated with the activity. In other cases, the extended reality system may suggest a region to the user and provide an option for the user to accept the region and/or an option for the user to modify the suggested region and/or redefine a region. The extended reality can be configured to save a defined region and use the defined region for future activities.

In other cases, the extended reality system can define a dynamic region that changes based on a user's movements and/or interactions in the extended reality environment. For example, the extended reality system may use one or more sensors to determine a direction the user is looking and/or objects that the user is interacting with. The extended reality environment can define the dynamic region to include a current focus direction of the user. Accordingly, as the user changes focus to different portion of the room, the region may update based on these user movements.

At operation 2106, the process 2100 can include generating an extended reality environment that include includes a reproduction of the identified region and a modification of other regions of the environment, as described herein. The extended reality environment can be displayed to the user using a head mounted display, as described herein.

Figure 22:
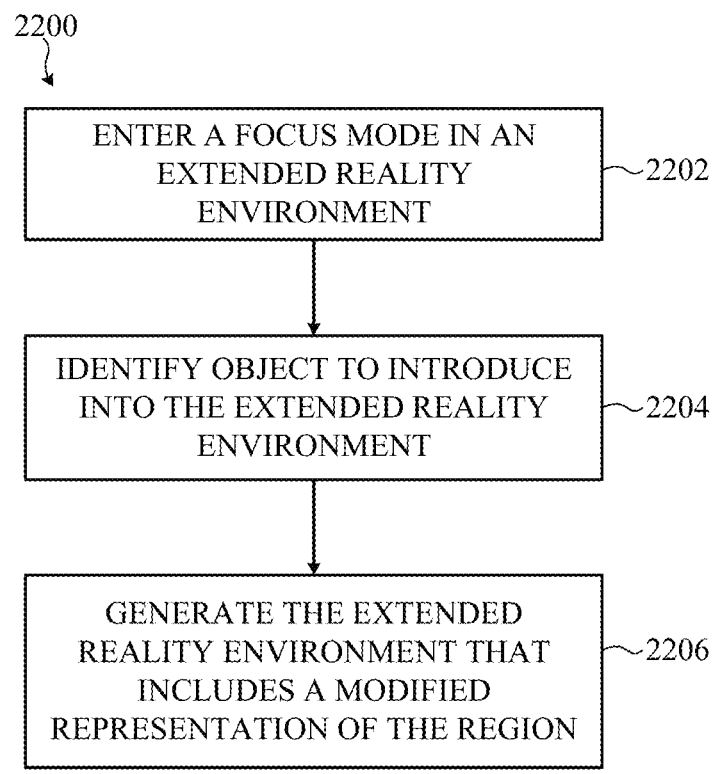
FIG. 22 show an example process for generating a virtual object in the extended reality environment while applying a regional modification within the extended reality environment.

FIG. 22 show an example process 2200 for generating a virtual object in the extended reality environment while applying a regional modification within the extended reality environment. The process 2200 can include incorporating aspects of both object modification schemes and regional modification schemes into an extended reality environment. The process can be performed by an extended reality system including the extended reality systems described herein.

At operation 2202, the process 2200 can include entering a focus mode in an extended reality environment. The focus mode can be initiated in response to one or more criteria being met and/or user initiated as described herein. The focus mode can be configured to reduce distractions in the extended reality environment by applying a regional modification to one or more portions of the extended reality environment and also generating virtual content within the extended reality environment.

At operation 2204, the process 2200 can include identifying virtual content to introduce into the extended reality environment. The virtual content can be content that is not a part of the physical environment and is introduced to enhances a user's focus on an activity or object, and/or reduce distractions within the extended reality environment.

In some cases, the virtual content can include an object that is introduced into the extended reality environment. In other cases, the virtual content can include sounds such as music, white noise and/or other sounds. A sound and/or object may be introduced that corresponds to an activity that user is engaged in. For example, if a user is reading a book about an animal such as a dog, the extended reality system can generate a virtual frog and include frog sounds such as a croaking noise. As another example, the user may be writing a piece about a subject that includes a snowy field. The extended reality environment may use one or more sensors to the determine that user is writing a piece and/or language processing techniques to identify a subject that the user is writing about. In the example of the user writing about a topic that includes a snowy field, the extended reality system may generate a virtual field that appears around the user and includes falling snow and/or sounds of falling snow. In this regard, the extended reality system can generate an atmosphere that enhances a user's connection to an identified activity.

As another example, the extended reality system may determine that a user is studying a particular painting, artist or style of art. In response to the determination that the user is studying a particular art work, the extended reality system may generate the extended reality environment to include a reproduction of the artwork. For example, the art work may be displayed corresponding to its actual physical size. Accordingly, a user's understanding and/or focus on the artwork may be increased by visualizing a realistic virtual representation of the artwork.

Additionally or alternatively, a regional modification can be generated, and the virtual content can be displayed with the regional modification. In some cases, the regional modification can be used to remove aspects of the physical environment to enhance the effect of the virtual content. For example, in the example of generating a virtual artwork to display in the extended reality environment, the regional modification can be displayed around the virtual artwork to focus a user's attention on the artwork and remove or decrease an impact of objects in the physical environment.

At operation 2206, the process 2200 can include generating the extended reality environment that include the virtual content and the regional modification. In some cases, the extended reality system may update a perspective of the artwork in the extended reality environment based on user movements. For example, as a user moves around the perspective of the artwork in the extended reality environment may change to correspond to the user's movements.

Figure 23:
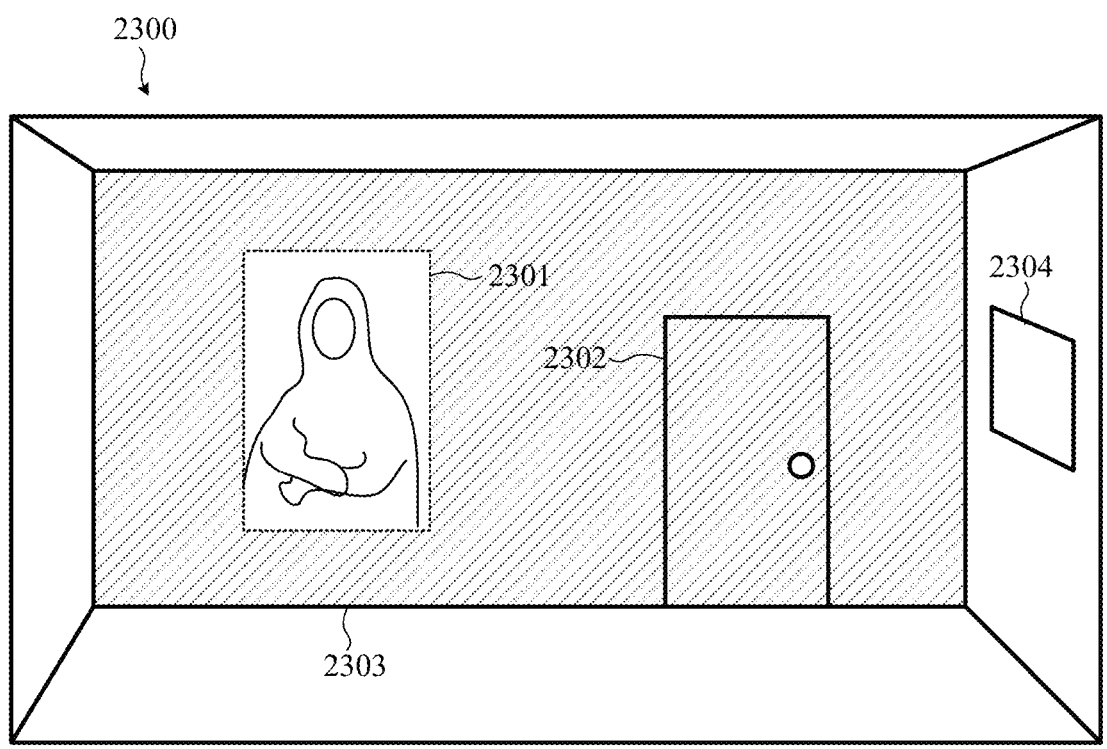
FIG. 23 shows an example of an extended reality environment that can be generated to include virtual content and a regional modification.

FIG. 23 shows an example of an extended reality environment 2300 that can be generated to include virtual content and a regional modification. The physical environment can include a room with a door 2302 and a window 2304. Continuing the art work example discussed with reference to FIG. 22, the extended reality system can generate the extended reality environment 2300 to include a virtual object 2301, which is shown as a painting in this example. Additionally the extended reality environment can include a modification to a region 2303, which is displayed around the virtual object 2301. The modification may to region 2303 can be applied to other objects in the region 2303, such as the door 2302.

Figure 24:
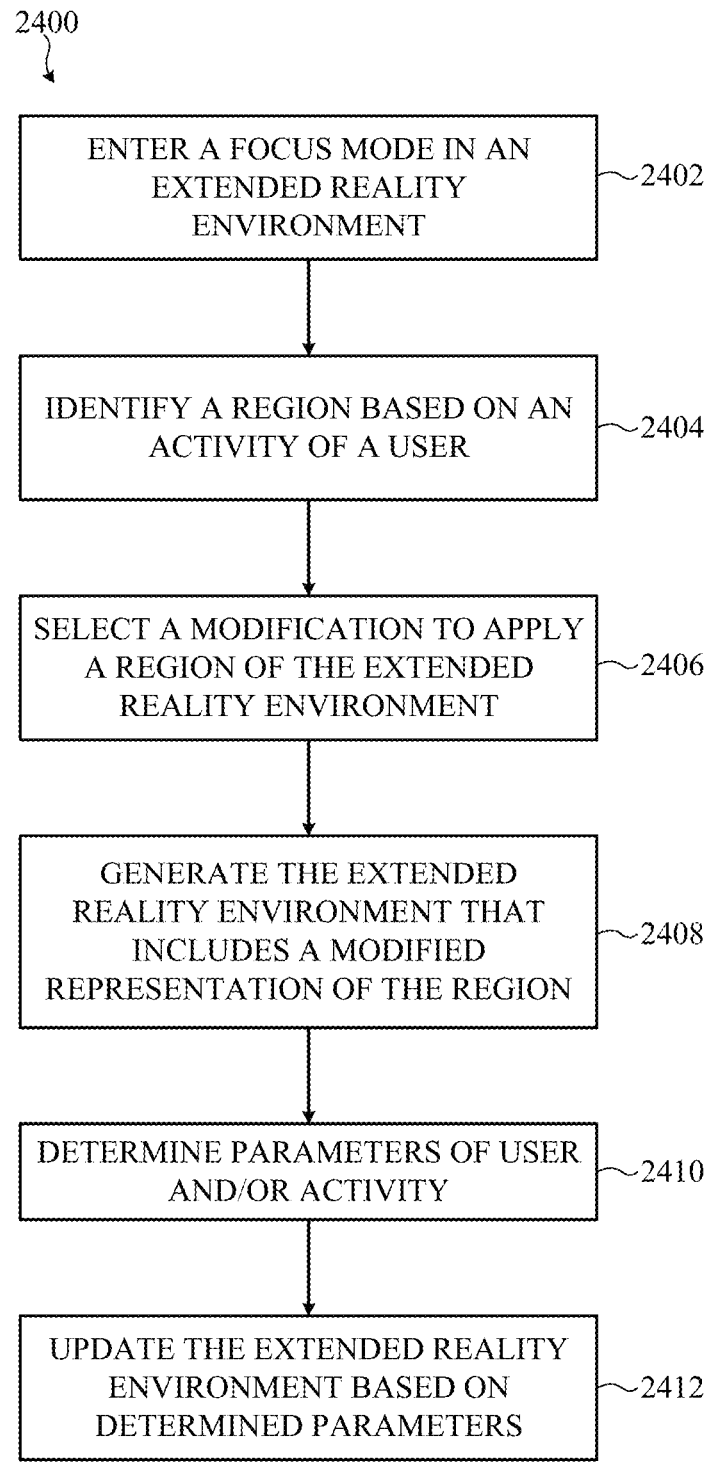
FIG. 24. shows an example process for dynamically updating or changing a regional modification during a focus mode.

FIG. 24. shows an example process 2400 for dynamically updating or changing a regional modification during a focus mode. In some cases, the regional modification may be updated based on user parameters such as user movement. In other cases, the regional modification can be updated based on an activity and/or a user's progression through an activity. In additional cases, the regional modification can be updated based on changes in the physical environment around the user. The process 2400 can be performed by an extended reality system including the extended reality systems described herein.

At operation 2402, the process 2400 can include entering a focus mode in an extended reality environment. The focus mode can be configured to reduce distractions by identifying a region that is associated with an activity of the user and applying a regional modification to other portions of the extended reality environment. For example, the extended reality environment can be configured to increase a focus on an activity by reproducing a region associated with the activity, while applying a modification to other regions of the environment. The region associated may be determined based on the activity.

At operation 2404, the process 2400 can include identifying a region based on an activity of a user, which can include the processes described herein. For example, the extended reality system can be configured to identify a region of the environment and/or one or more objects that are associated with the activity.

At operation 2406, the process 2400 can include selecting a modification to apply to a region in the extended reality environment. In some cases, the modification can be applied to other regions that are not associated with the activity as described herein. In other cases, the modification can be applied to the region that is associated with the activity.

At operation 2408, the process 2400 can include generating an extended reality environment that include includes a reproduction of the identified region and a modification of other regions of the environment, as described herein. The extended reality environment can be displayed to the user using a head mounted display, as described herein.

At operation 2410, the process 2400 can include monitoring parameters of a user and/or activity while the focus mode is active in the extended reality system. The system can monitor a user's focus on the activity and/or objects (e.g., using gaze detection) or other physiological data. The system can monitor a user's progress through an activity. Additionally or alternatively, the system can monitor changes in the physical environment around the user.

At operation 2412, the process 2400 can include updating the extended reality environment based on one or more determined parameters for a user. For example, if a user's attentive state falls below a threshold or satisfies a distraction criteria, the extended reality system may update the modification to the extended reality environment. This can include modifying the effect of a current regional modification such as increase how much the modification modifies the physical environment. For example, if a blur modification is being applied to a region, the extended reality system may increase the focus of the blurring effect, for example to deemphasizes regions of the environment. In other cases, the extended reality environment, may transition to a different type of modification, such as a style transfer. Additionally or alternatively, if the system determines that a particular object is distracting, system may replace that object with additional content as described herein.

In some cases, updating the extended reality environment can include adding a different type of modification. For example, if a visual modification is being applied to a region, the extended reality system may include a sound modification.

Embodiments described herein are directed to extended reality systems that may switch between different focus modes using one or more criteria. The extended reality systems can include a head-mounted display that can display an extended reality environment to a user. The extended reality system can also include a set of sensors that can receive imaging data of a physical environment and/or monitor parameters of a user. The extended reality system can determine that a first activation criteria has been met and enter a first focus mode, which may be an object based focus mode. While operating in the first focus mode, the extended reality system may identify one or more objects in the physical environment and generate an extended reality environment that include reproducing a portion of the physical environment and replacing the one or more object with additional content as described herein.

The extended reality system can determine that a second active criteria has been met and enter a second focus mode, which may be a region-based focus mode. While operating in the region based focus mode the extended reality system may generate an extended reality environment in which a first region of the physical environment is reproduced, and a second region of the physical environment is replaced with a modified representation of the physical environment. The modified representation of the second region can be generated by applying a modification to imaging data of the physical environment received from one or more sensors. The modified representation can be configured to reduce distractions in an extended reality environment by directing a user's focus to a region and/or objects of the extended reality environment that are associated with an activity that the user is performing. For example, the modifications can include de-emphasizing detail in the second region by changing a focus of the second region to generate a blurred effect, changing lighting conditions such as color temperature, brightness and so on, and/or applying a filter or style transfer to display the second region with a synthetic effect.

In some cases, the first mode may be implemented by the extended reality system when a required focus level is lower and the second mode may be implemented when the required focus level is higher. For example, the first mode may result in a less drastic modification to the physical environment and the extended reality environment may more substantially reproduce the physical environment except for one or more identified objects. The second mode may result in greater modification to the physical environment by modifying regions of the environment in the extended reality environment, which can more substantially change a user's perception of the environment.

The activation criteria for different focus modes can be based on a current activity of a user. In some cases, different activities can be associated with different focus levels. If a focus level of the current activity satisfies a first threshold, the extended reality system can enter the first focus mode. If the focus level of the current activity satisfies a second threshold, the extended reality system can enter the second focus mode. In some cases, the thresholds for the focus modes can be set to increase a modification to increase a sensitivity at which the system reduces distractions by replacing objects with virtual content and/or modifies one or more regions of an environment. For example, the first threshold to enter the first, object oriented, focus mode may be less than the second threshold to enter the second, region based, focus mode.

In some cases, the system may include multiple object based focus modes and/or multiple region based focus modes that have increasing levels of modification. For example, a first object based focus mode may be configured with higher thresholds for replacing objects with additional content, and thus, can result in a lower amount of modification to the physical environment (e.g., fewer objects being replaced with additional content). A second object based focus mode may be configured with lower thresholds for replacing objects with additional content, and thus, can result in a higher amount of modification to the physical environment. In some cases, a focus mode can include both object-based and region-based modifications.

Embodiments are also directed to extended reality systems which can display multiple different focus modes and allow a user to select a desired focus mode for generating an extended reality environment. In some cases, the extended reality can determine that a user is initiating an activity or about to initiate an activity and present one or more focus modes that can be used during the activity. In some cases, the one or more presented focus mode can be based on the identified activity. For example, the focus modes may be selected based on a focus level associated with the activity. In some cases, the extended reality system can monitor the user during the focus mode and adjust the focus mode, suggest a different focus mode or enter a different focus mode based on the monitored parameters. For example, if the extended reality system determines that a user changed from a first activity to a second activity, the system may initiate a second focus mode that is associated with the second activity.

In some cases, the extended reality system can transition between different focus modes based on an attentive state of the user. The extended reality system may monitor an attentive state of the user and updated or change the focus mode based on changes in the user's attentive state. For example, the extended reality system may operate in a first focus mode that presents an extended reality environment in which a first portion of a physical environment is replaced with additional content. In response to determining that a user's attentive state has decreased, the extended reality system can enter a second focus mode that presents an extended reality environment in which a second portion of the physical environment is replaced with additional content. The second portion of the physical environment can be a different portion from the first portion of the physical environment.

Figure 25:
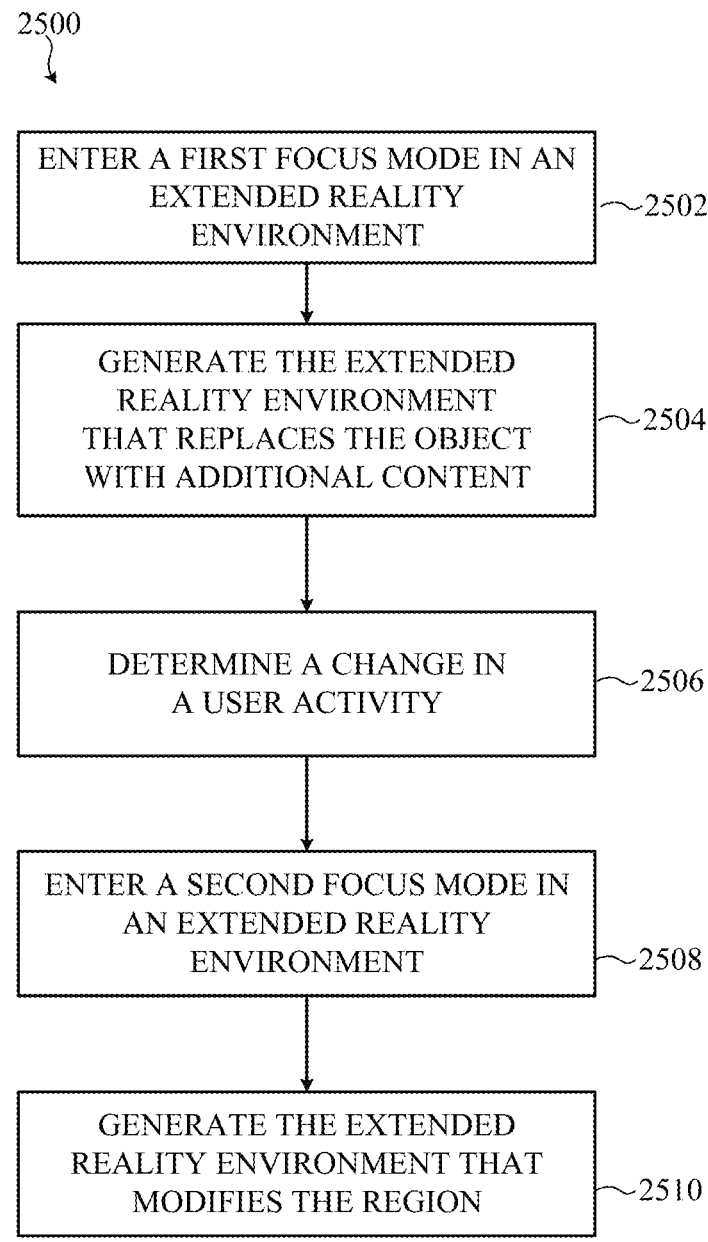
FIG. 25 shows an example process; for switching between different types of focus modes. In some cases, the extended reality system can be configured to switch between different focus modes based on an activity or change in activity of a user.

FIG. 25 shows an example process 2500 for switching between different types of focus modes. In some cases, the extended reality system can be configured to switch between different focus modes based on an activity or change in activity of a user. For example, the extended reality system may determine that a user has switch from a first activity to a second activity and change from a first focus mode to a second focus mode based on the detected change. The process 2500 can be performed by extended reality systems including the extended reality systems described herein.

At operation 2502, the process 2500 can include entering a first focus mode in an extended reality environment. The first focus mode can reduce distractions in the extended reality environment by identifying one or more objects that meet a distraction criteria and replacing the objects with additional content as described herein. The first focus mode can be selected in response to determining that the user is performing a particular activity or about to being a particular activity. The extended reality system may associate the particular activity with a particular focus mode. For example, an object based focus mode may be selected in response to the extended reality system determining that the user is performing a first activity.

At operation 2504, the process 2500 can include generating the extended reality environment that replaces the one or more objects with additional content, as described herein. For example, the extended reality system can be configured to identify particular objects, particular types/classes of objects, objects that meet a defined distraction criteria, and so on. The extended reality system can generate the extended reality environment and replace the identified objects with additional content, which can include replacing the identified objects with a different object(s), removing the object from the extended reality environment and/or modifying the object. The extended reality system can display the extended reality environment to the user using one or more head mounted displays as described herein.

At operation 2506, the process 2500 can include determining a change in the user activity. In some cases, the extended reality system may automatically determine that a user activity has changed. For example, the extended reality system may use sensor data from one or more sensors to determine a change in the user activity, which may be indicated by movement data, gaze detection, or any other suitable parameters as described herein. In other cases, the extended reality system may determine a change in the user activity based on one or more user inputs, for example a user may indicate they are changing to a different activity and/or select a different focus mode.

At operation 2508, the process 2500 can include entering a second focus mode in the extended reality environment. The second focus mode can be initiated in response to determining that the user has changed from a first activity to a second activity. In some cases, the second focus mode may be selected based on the second activity. For example, the extended reality system may select the second focus mode based on identifying a particular activity, which may be associated with the second focus mode. The second focus mode can operate to create a different effect in the extended reality environment that reduces distractions. In some cases, the second focus mode may include more significant modifications to the extended reality environment as compared to the first focus mode. For example, the first focus mode can be an object based focus mode that reproduces the physical environment and modifies objects within the environment using additional content. The second focus mode can be a region based focus mode that modifies one or more regions of the physical environment by changing a visual appearance of the region(s) in the extended reality environment.

At operation 2510, the process 2500 can include generating the extended reality environment that modifies one or more regions of the physical environment. The modification(s) can include modifying a visual appearance of the extended reality environment by changing visual aspects of the physical environment such as a focus, brightness, color temperature and so on. In other cases, the modifications to the one or more regions can include replacing portions of the environment with virtually generated content, which can include introducing virtual content that is not present in the physical environment and/or creating visual effects that are not present in the physical environment.

Figure 26A:
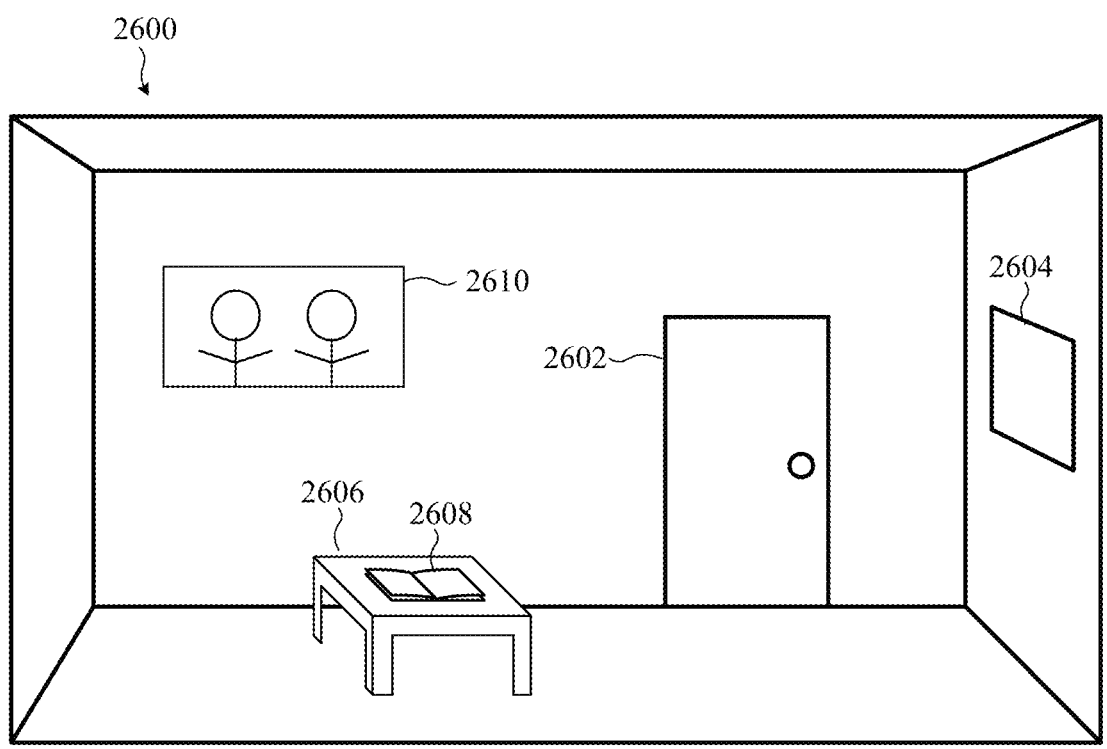
FIG. 26A shows the physical environment 2600 around a user and may include a room that has a door, a window, a table, a book and a display that is displaying dynamic content.
Figure 26B:
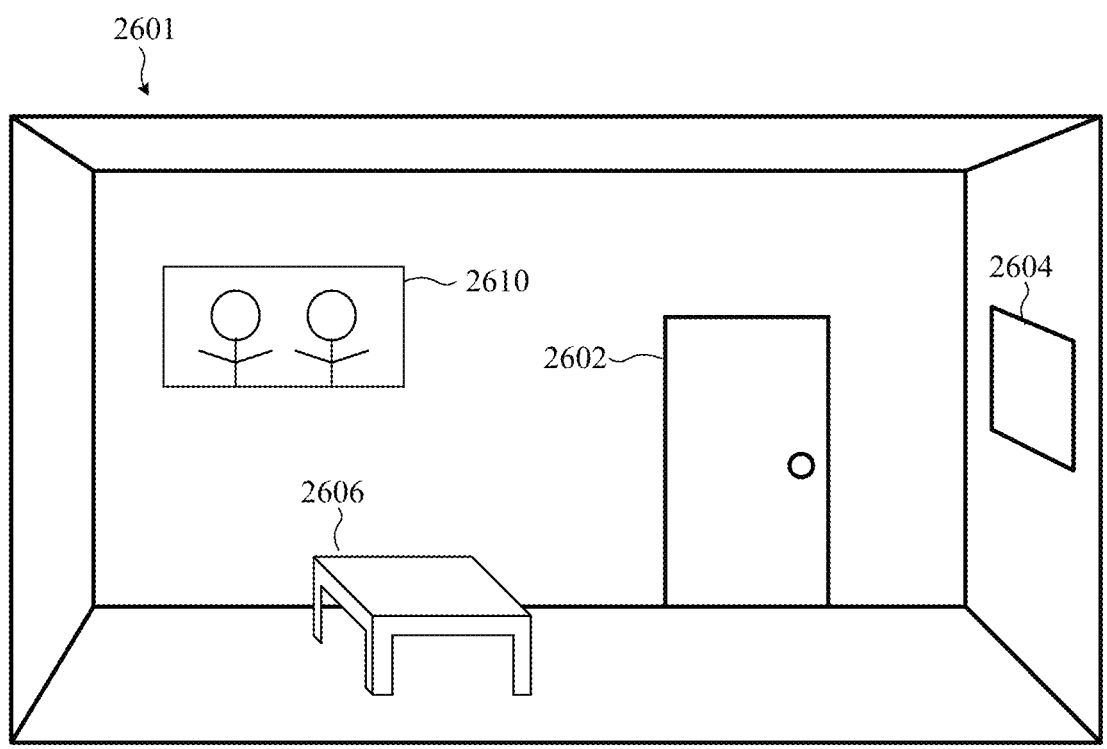
FIG. 26B shows a first extended reality environment that is generated by the extended reality system and displayed to the user.
Figure 26C:
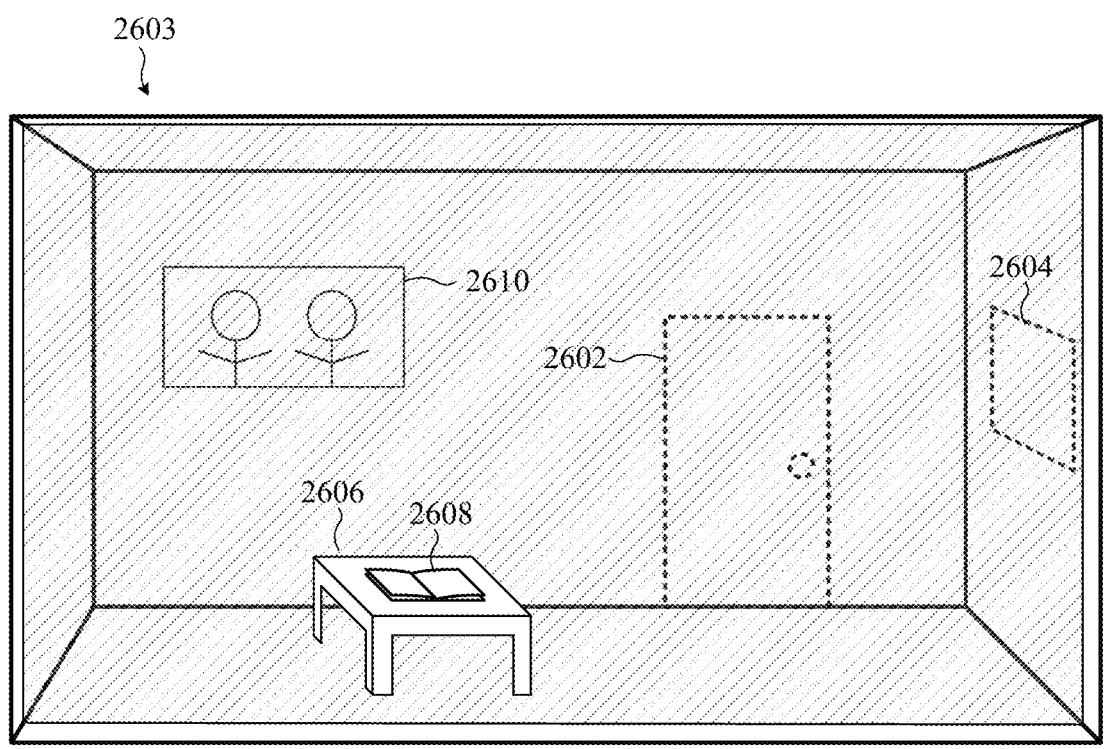
FIG. 26C shows a second extended reality environment that is generated by the extended reality system and displayed to the user.

FIG. 26A-26C show an example of different extended reality environments 2601, 2603 that can be generated in different focus modes and based on the physical environment 2600. In some cases, the extended reality system can generate a first extended reality environment 2601 in response to determining that a user is performing a first activity and generate a second extended reality environment 2603 is response to determining that the user is performing a second activity.

FIG. 26A shows the physical environment 2600 around a user and may include a room that has a door 2602, a window 2604, a table 2606, a book 2608 and a display 2610 this is displaying dynamic content. The extended reality system may determine that the user is performing a first activity that includes interacting with the display 2610. The first activity can be associated with a first focus mode that includes replacing objects that meet a distraction criteria with additional content. In the current example, the extended reality system determines that the book 2608 meets the distraction criteria. For example, the extended reality system may monitor a user's gaze to determine one or more objects that a suer is focusing on and duration of the focus on a particular object(s). The extended reality system may determine that a suer's focus on the book 2608 satisfies the distraction metric and may generate the first extended reality environment 2601 that replaces the book 2608 with additional content.

FIG. 26B shows the first extended reality environment 2601 that is generated by the extended reality system and displayed to the user. The extended reality environment 2601 may be generated to make it appear that there is no book on the table 2606. For example, the extended reality system may generate virtual content that replaces the book and fills in the area of the table where the book is located. In other cases, the book 2608 can be replaced with other additional content that displays other objects and/or modifies an appearance of the book 2608 in the extended reality environment.

The extended reality system may determine that the user has switched activities from interacting with the display 2610 to interacting with the book 2608. In response to the change in activity the extended reality system may enter a second focus mode that generates the second extended reality environment 2603 shown in FIG. 26C. The second extended reality environment 2603 may be granted based on the particular activity of the user. For example, while interacting with the book 2608, the suer may be more likely to be distracted by the physical environment. Accordingly, the second extended reality environment 2603 may be configured to generate more significant changes to the physical environment to help remove distractions. The second focus mode may include modifying one or more regions of the physical environment 2600. For example, the extended reality system may identify the book 2608 and table 2606 as being associated with the user's current activity. The extended reality system may modify the other regions of the environment that are not associated with the activity.

In some cases, the modification to the other regions can include generating visual modifications to other portions of the room including the door 2602, the window 2604 and the display 2610. In some cases, a modification can be uniformly applied to the entire room. For example, the extended realty system may generate a visual modification such as a blur effect, style transfer, or other change that is applied across the room except for the book 2608 and the table 2606. In other cases, the extended reality system can apply different modifications to different regions of the room. For example, the extended reality system may determine that the door 2602 and the window 2604 have a lower distraction probability and apply a first modification to the region of the room including the door 2602 and the window 2604. The extended reality system may determine that the display 2610 has a higher distraction probability and apply a different modification to the region of the room that includes the display 2610.

Figure 27:
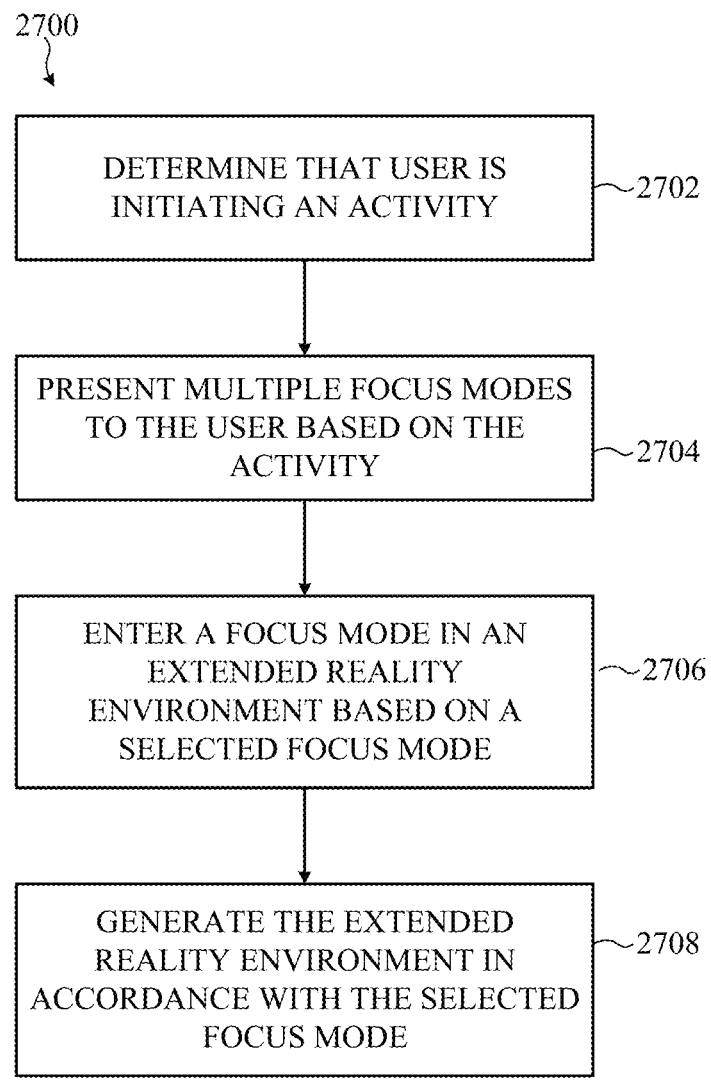
FIG. 27 shows an example process 2700 for changing between different focus modes based on user input to the extended reality system.

FIG. 27 shows an example process 2700 for changing between different focus modes based on user input to the extended reality system. The process may be performed by an extended reality system including the extended reality systems described herein.

At operation 2702, the process 2700 can include determining that a user is initiating an activity. The extended reality system may determine that a user is initiating a particular activity based on sensor data and/or other data received by the system as described herein. In some cases, the user may indicate that they are initiating a particular activity.

At operation 2704, the process 2700 can include presenting multiple different focus modes to the user for selection of a particular focus mode. In some cases, the extended reality system can display multiple selectable options each associated with a different focus mode. The different focus modes can be identified based on the activity. For example, the extended reality system may identify a particular activity being performed by the user and identify focus modes that are associated with the particular activity and/or the type of activity. In other cases, the activity may be associated with a particular focus level, and the extended reality system may select focus modes that have a focus level that corresponds to the particular focus level of the activity.

At operation 2706, the process 2700 can include entering a focus mode in an extended reality environment based on a user selected focus mode. For example, the user may select one of the displayed focus modes and the extended reality system may initiate the selected focus mode. In some cases, the extended reality system may use the user selected focus mode to recommend generate focus modes for recommending to a user for a particular activity. The extended reality system may also use the suer selected focus mode to automatically enter a particular focus mode in response to determining that a user is initiating a particular activity in the future. For example, a subsequent time that the extended reality system determines that the user is initiating a particular activity, the extended reality system may automatically enter the focus mode that was last selected by the user for that activity.

At operation 2708, the process 2700 can include generating the extended reality environment in accordance with the selected mode. The generated extended reality environment can be displayed to the user using a head mounted display as described herein. In some cases, the extended reality system may determine that a user activity has changed and exit the selected focus mode, switch to a different focus mode and/or prompt a user to select a different focus mode as described herein.

Figure 28:
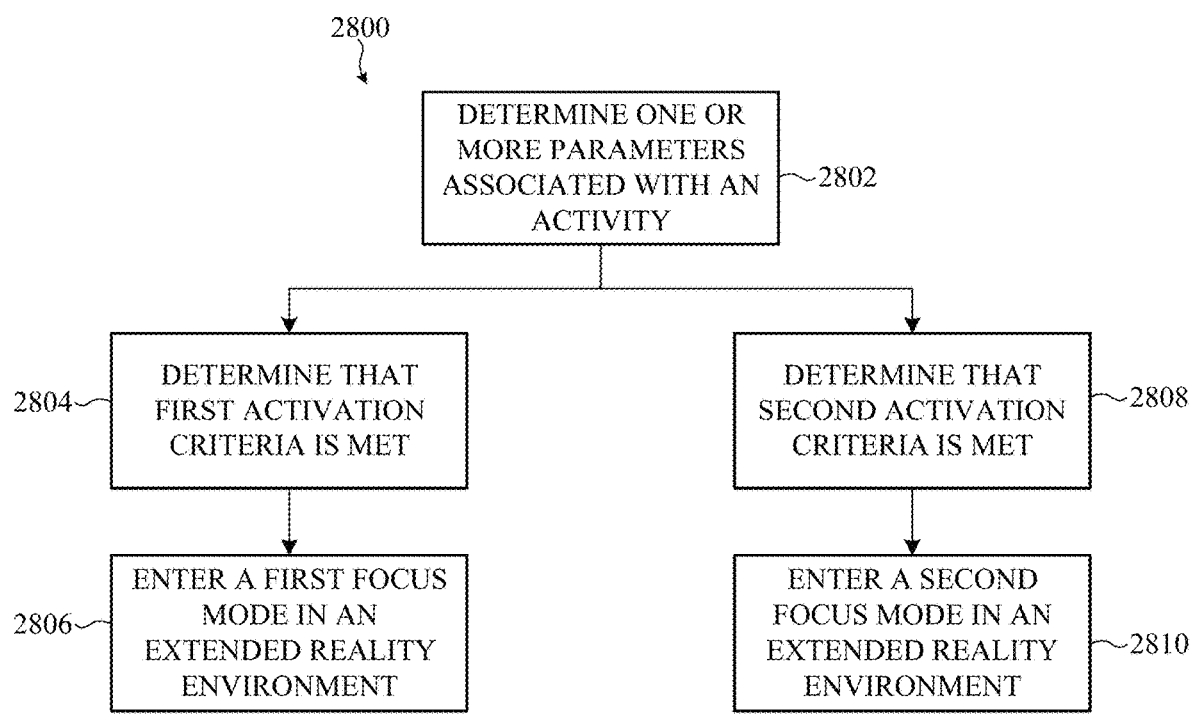
FIG. 28 shows an example process 2800 for initiating a focus mode and switching between different focus modes based one or more monitored parameters user and/or the environment.

FIG. 28 shows an example process 2800 for initiating a focus mode and switching between different focus modes based one or more monitored parameters user and/or the environment.

At operation 2802, the process 2800 can include determining one or more parameters associated with the user, the activity and/or the environment and selecting a second focus mode based on the determined parameters. In some cases the extended reality system can determine a focus level associated with a current activity. For example, different activities can be associated with different focus level as described herein.

At operation 2804, the process 2800 can include determining that a first activation criteria has been met. For example, the extended reality system may determine a focus level associated with an activity of a user satisfies a first threshold.

At operation 2806, the process 2800 can include entering a first focus mode in the extended reality environment based on the first activation criteria being met. The first focus mode may be selected based on the activity and/or a focus level associated with the activity. For example, a first focus mode may be associated with a particular focus level or range of focus levels and may be selected by the extended reality system upon determining that a focus level of the activity corresponds to the particular focus level of the first focus mode or falls within a range of focus levels associated with the first focus mode. In some cases, the effect of different focus modes can correspond to the focus levels required for an activity. In some cases, the first focus mode may be an object based focus mode and identify one or more distracting objects within the physical environment and replace the distracting objects with additional content is described herein.

At operation 2808, the process 2800 can include determining that a second activation criteria has been met. For example, the extended reality system may determine a focus level associated with an activity of a user satisfies a second threshold.

At operation 2810, the process 2800 can include entering a second focus mode in the extended reality environment based on the first activation criteria being met. The second focus mode may be selected based on the activity and/or a focus level associated with the activity. For example, the second focus mode may be associated with a particular focus level or range of focus levels and may be selected by the extended reality system upon determining that a focus level of the activity corresponds to the particular focus level of the second focus mode or falls within a range of focus levels associated with the second focus mode. In some cases, the second focus mode may be a region based focus mode that generated an extended reality environment that modifies a representation of a portion of the physical environment, as described herein.

Figure 29A:
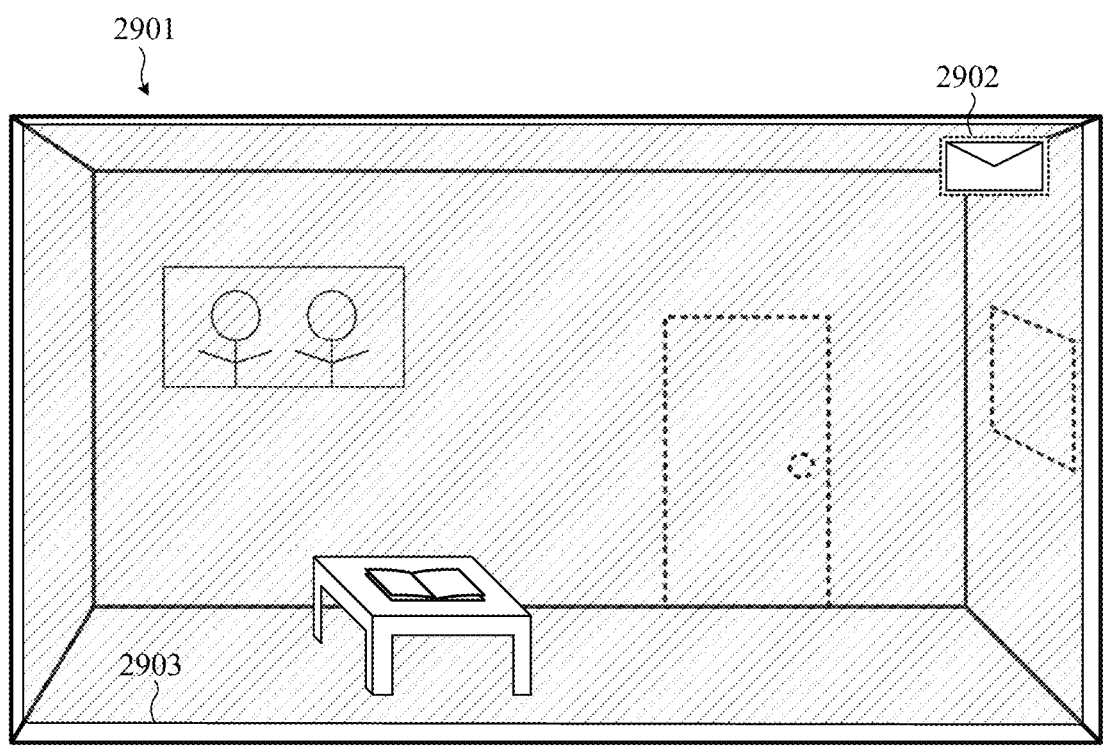
FIGS. 29A and 29B show different notifications that can be introduced into an extended reality environment during different focus modes.
Figure 29B:
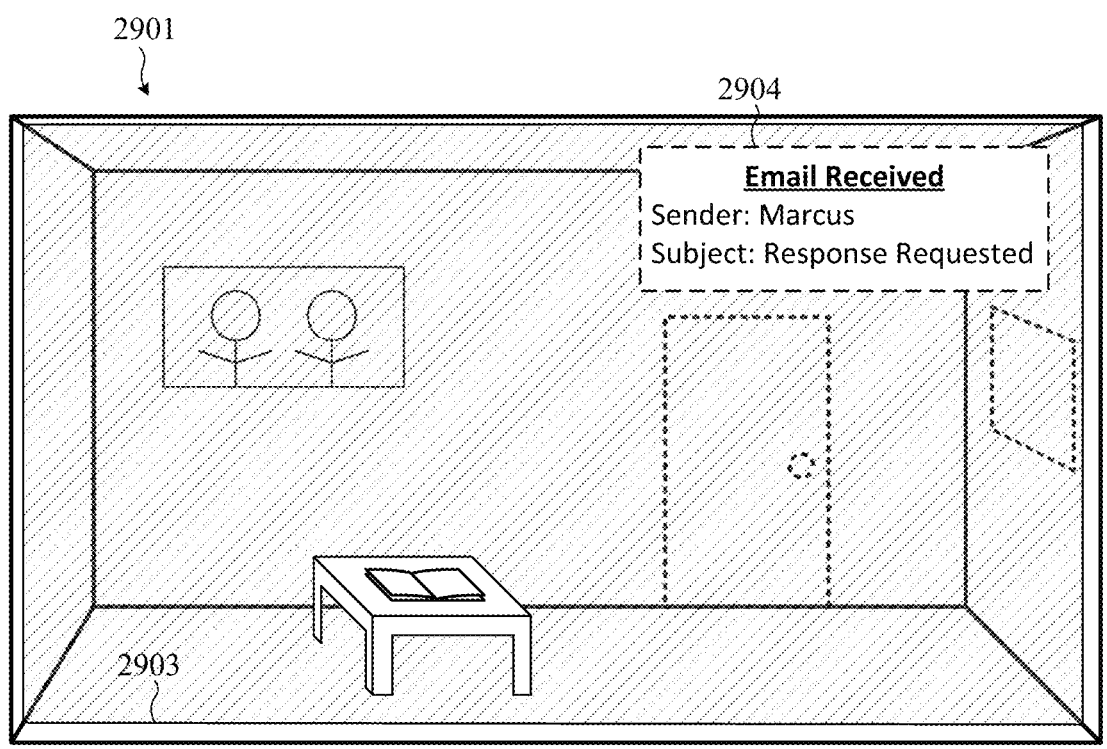

FIGS. 29A and 29B show different notifications that can be introduced into an extended reality environment during different focus modes. The extended reality system can display notifications in an extended reality environment in a variety of ways. In some cases, the prominence, amount of information, the way the notification is displayed, and/or other aspects of a notification may be introduced based on a focus mode, a particular activity and/or focus level. For example, focus modes that are associated with higher focus levels and/or remove greater amounts of distractions may suppress notifications and/or present notifications to decrease an impact on the extended reality environment. Focus modes that are associated with lower focus levels can present notifications with additional information and/or in ways that are more pronounced in an extended reality environment, which may be more likely to draw a user's attention to a particular notification.

Additionally or alternatively, notifications can be displayed or otherwise communicated to a user in an extended reality environment based on the content or type of notification. For example, in focus modes with higher focus levels, the extended reality system may only display notification with high importance and/or specific types of notifications such as emergency based notifications. In some cases, the presentation of the notification and/or the type of information communicated in the notification can be based on the content and/or the importance of the notification. For example, as shown in FIG. 29A, the extended reality system may display an extended reality environment 2901 that includes a modification to one or more regions 2903 of the physical environment. The extended reality system may display a first notification 2902 for an email by displaying an icon indicating that an email was received, but not providing specific information about the email. In this example, the icon may be less likely to draw a user's attention from a particular activity. In other cases, the extended reality system may display notifications that include additional information. For example, as shown in FIG. 29B, the extended reality system may display a second notification 2904 in the extended reality environment 2901 that includes additional information about an email such as a sender of the email, a subject and so on.

In these examples, the notifications may be generated based on the focus mode and/or parameters associated with the notification. For example, the first notification 2902 may be displayed in a focus mode with a higher focus level, and therefore, the extended reality system may generate a less disruptive notification. In other cases, the extended reality system 2902 may determine that the first notification is of low importance (e.g., based on content of the email, a sender of the email, an importance designation, a subject, and so on) and generate a less prominent notification. The extended reality system may generate the second notification 2904 to be more prominent based on a lower focus mode and/or determining that the second notification is of higher importance.

Embodiments described herein are directed to extended reality systems that can generate an extended reality environment that replaces a real-world object with additional content to reduce distractions in the extended reality environment. The extended reality system can monitor a user interaction with the environment and/or changes in the environment to determine if one or more breakthrough criteria have been met. As used herein, the term "breakthrough" may refer to reproducing/showing one or more objects in the extended reality environment that had previously been replaced by additional content within an extended reality environment. For example, in a focus mode, the extended reality environment may be generated to replace a real-world object or region of the environment with additional content or other modification such as another object. In some cases, the extended reality system can be configured with breakthrough criteria that can be used to determine when a real-world object that has been modified in the extended reality environment should be reproduced or shown in the extended reality environment.

In a first set of examples, the extended reality environment can be generated to replace an object that meets a distraction criteria with additional content. The extended reality system may monitor a user's engagement with the extended reality environment and detect a user engagement with the additional content that has been used to replace an object. In response to detecting that the user engagement with the additional content meets an interaction criteria, the extended reality system can update the extended reality environment to reproduce the object or a portion of the object. For example the physical environment may include a screen that is displaying dynamic content and the extended reality environment may replace the dynamic content with additional content such as blank screen or other content such as static picture. A user may desire to something on the screen and look at the direction of the screen in the virtual environment. In response to determining that the user looked in the direction of the screen for defined duration, the extended reality system may temporarily or permanently display the dynamic content in the extended reality environment.

In another set of examples, the extended reality system can display an object or a portion of the object that has been replaced with additional content in response to a change in the object. This may allow the object to breakthrough into the extended reality environment in response to some change in the object, which may include movement of the object, a change in content associated with the object and/or other changes in the object. For example, an extended reality environment may replace a door in a room with additional content to remove distraction associated with the door opening and closing. The extended reality system may detect that the door has been left open (as opposed to being open and shut) and update the extended reality environment to display a reproduction of the door so that the user can see that it has been left open.

In other examples, the extended reality system can enter different focus modes that are configured with different criteria for allowing object breakthrough. For example, in a first focus mode the extended reality system may replace an object with additional content and be configured with a first engagement criteria for allowing the object to breakthrough into the extended reality environment. In a second focus mode, the extended reality system may replace the object with additional content and be configured with a second engagement criteria for allowing the object to breakthrough into the extended reality environment. The criteria may be configured so that different focus mode have different levels of breakthrough, which may make it harder or easier for an object to breakthrough depending on an activity or a user and/or selected focus mode.

For example, the first engagement criteria may include a first time threshold for a user looking in the direction of an object that has been replaced by additional content and the second engagement criteria may be a second time threshold for a user looking in that direction. The second time threshold may be greater than the first time threshold. Accordingly, the second focus mode may require a greater user engagement with the additional content that is replacing the object to allow breakthrough.

Figure 30:
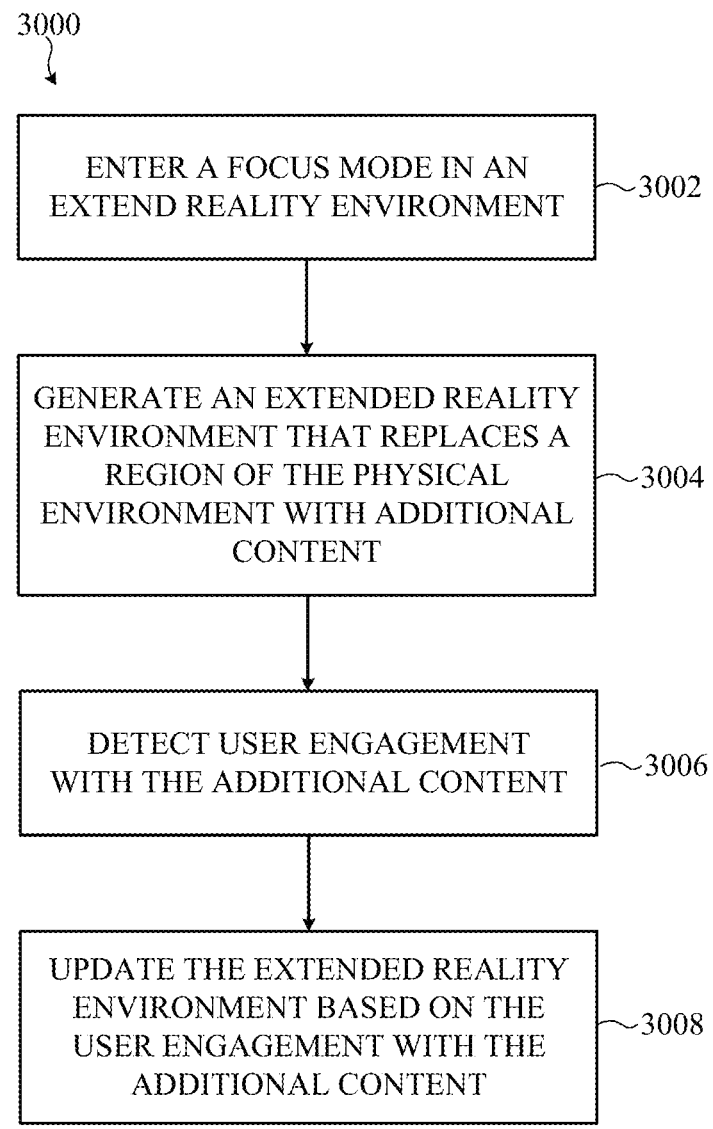
FIG. 30 shows a process for determining when to allow breakthrough of an object in an extended reality environment.

FIG. 30 shows a process 3000 for determining when to allow breakthrough of an object in an extended reality environment. The extended reality system can be configured to allow breakthrough of objects or regions in the extended reality environment. An object or region breakthrough can include changing from replacing an object or region with additional content to displaying a reproduction of the region/object in the extended reality environment. The extended reality system can be configured to allow breakthrough in response to a variety of different factors including changes in the physical environment, changes in parameters of a user, detecting a specific type of event (e.g., emergency vehicle), and so on. The process 3000 can be performed by extended reality systems including the extended reality systems described herein.

At operation 3002, the process 3000 can include entering a focus mode in an extended reality environment. The focus mode can be configured to reduce distractions in the extended reality environment by identifying objects that meet a distraction criteria or determining one or more objects associated with a current activity as described herein.

At operation 3004, the process 3000 can include generating an extended reality environment that replaces a region of the physical environment with additional content. The extended reality environment can be generated to replace one or more objects with virtual content and/or visually modify one or more regions of the physical environment as described herein.

Different focus modes can be configured with different breakthrough criteria, which can be used by the extended reality system to determine when to allow breakthrough of an object and/or region in an extended reality environment. In some cases, the breakthrough criteria can be based on a user's engagement with additional content that is used to replace an object and/or engagement with a region of the extended reality environment that corresponds to the replaced/modified object.

At operation 3006, the process 3000 can include detecting a user engagement with additional content that is replacing an object while in the extended reality environment. In some cases, detecting the user engagement can include monitoring a user's eye movement to determine a direction a user is looking, content within the virtual environment that the user is focusing on, and so on. The extended reality system may also determine an amount of time a user's is focus on a particular region, particular content, and/or a particular object. The focus direction and/or duration (e.g., gaze detection) can be used to determine if a user engagement with additional content meets an interaction criteria. For example, if a user engagement with additional content that is replacing an object meets an interaction criteria, the extended reality system can be configured to allow breakthrough of that object and may display a reproduction of the object or a portion of the object.

For example, an extended reality environment may be generated that replaces dynamic content on a display with virtual content that makes the display appear as turned off within the extended reality system environment. The system may detect that the user is looking at the blank display. If the extended reality system determines that the user's gaze on the display meets or exceeds a time threshold, the system can determine that he user's engagement with the blank display satisfies an interaction criteria.

At operation 3008, the process 3000 can include updating the extended reality environment based on the user engagement with the additional content. In some cases, the if the extended reality system determines that the interaction criteria is satisfied, the extended reality system can switch from replacing the object with additional content to displaying a reproduction of the object or a portion of the object. In the case of the display example, the extended reality system may reproduce the dynamic content on the display in response to the user interaction with the virtually generated blank screen satisfying the interaction criteria.

Figure 31A:
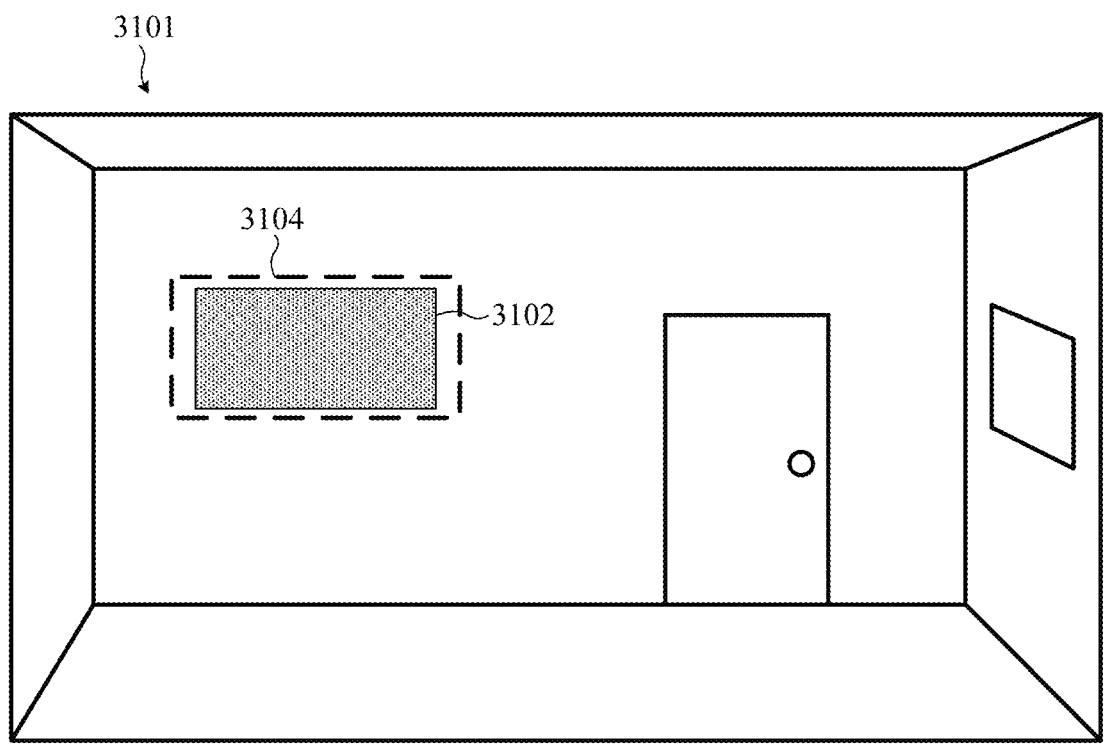
FIGS. 31A and 31B show an example of breakthrough of an object in an extended reality environment operating in a focus mode.
Figure 31B:
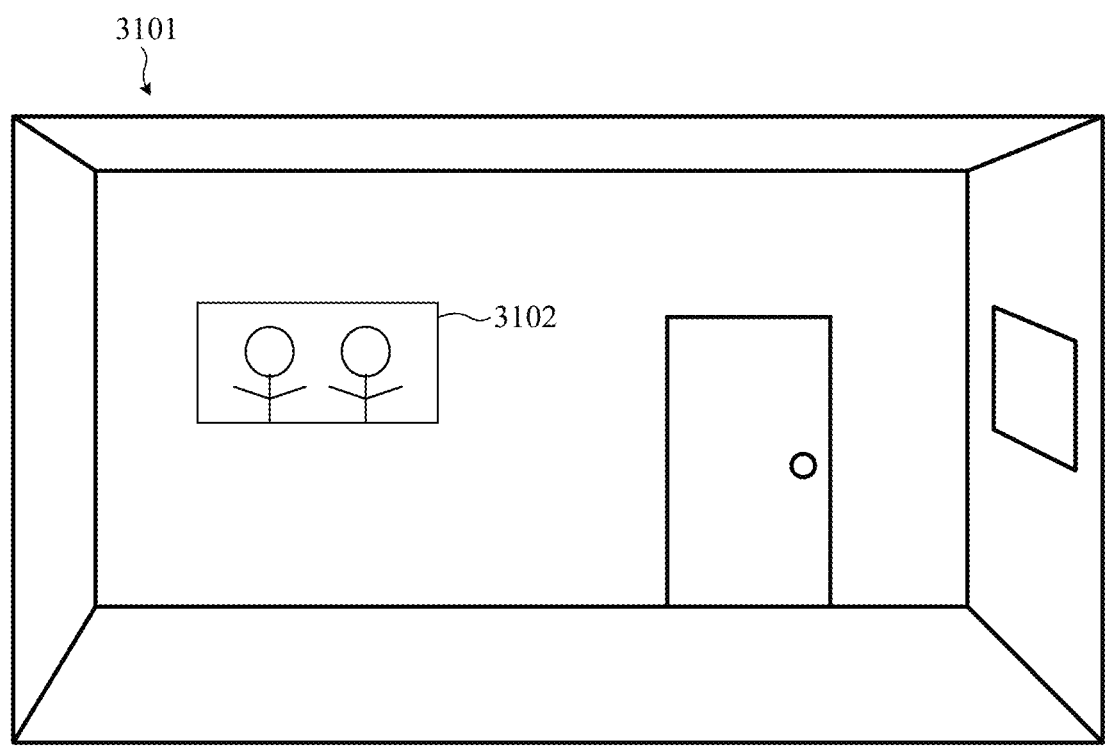

FIGS. 31A and 31B show an example of breakthrough of an object in an extended reality environment 3101 operating in a focus mode. As shown in FIG. 31A, the extended reality environment 3101 can be generated to replace content on a display 3102 with virtually generated content that makes the display appear to be off in the extended reality environment. The extended reality system may detect a user's gaze on region 3101 and determine that the user's gazes satisfies an interaction criteria. For example, the extended reality system may determine that the user has focused on the region 3104 for a defined duration. In response to the interaction criteria being satisfied, the extended reality system may update the extended reality environment. For example, as shown in FIG. 31B, the extended reality environment can be updated to reproduce content that is being displayed by the display 3102.

Additionally or alternatively, determining a user engagement with an object or region of the extended reality environment can include detecting other types of user interaction such as gestures, voice commands, and/or inputs to the extended reality system (e.g., via a user interface). In some cases, the duration of breakthrough may be based on the focus mode and/or the detected user interaction. For example, if in response to displaying the content on the display, the user looks in a different direction, the extended reality system may be configured to continue to replace the object with additional content (e.g., resume showing a blank screen on the display 3102).

Figure 32:
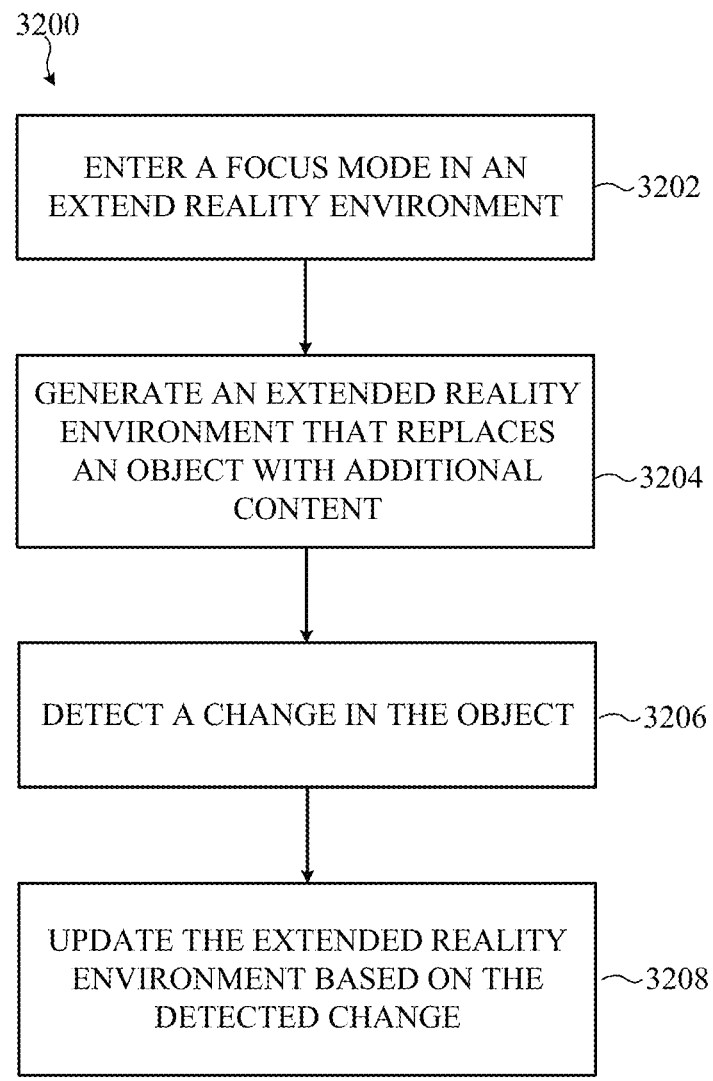
FIG. 32 shows a process flow for determining when to allow breakthrough of an object in an extended reality environment based on one or more parameters of the object.

FIG. 32 shows a process 3200 flow for determining when to allow breakthrough of an object in an extended reality environment based on one or more parameters of the object. The extended reality system can monitor the physical environment, while generating the extended reality environment, and update the extended reality environment based on changes in the physical environment. In some cases, the extended reality environment can be updated based on changes of an object or region that is being replaced/modified with additional content. In other cases, the extended reality environment can be updated based on changes in the environment, such as people entering the physical environment, objects moving toward the user, or other changes. The monitoring of the physical environment allows the extended reality system to updated and adapt the extended reality environment to changing conditions.

At operation 3202, the process 3200 can include entering a focus mode in an extended reality environment. The focus mode can be configured to reduce distractions in the extended reality environment by identifying objects that meet a distraction criteria or determining that one or more objects are associated with a current activity as described herein.

At operation 3204, the process 3200 can include generating an extended reality environment that replaces an object with additional content. The extended reality environment can be generated to replace one or more objects with virtual content and/or visually modify one or more regions of the physical environment as described herein.

At operation 3206, the process 3200 can include detecting a change in the object using one or more sensors of the extended reality system. In some cases, the detected change can be movement of the object. For example, the extended reality system can be configured to determine a direction of movement of an object such as whether the object is approaching a user, moving away from the user, moving parallel and so on. In some cases, the extended reality system can detect a rate or change in movement such as an approach speed and direction. Additionally or alternatively, the extended reality system may detect a change in appearance of an object, change in content displayed by an object (e.g., a display), or changes in other parameters associated with an object.

The detected changes can be used to determine whether an object in the physical environment satisfies an criteria to update the extended reality environment based on a detected change of the object. The extended reality system may be configured to determine of the change in the object meets an update criteria. In the cases of detecting movement of an object, the extended reality system may define the update criteria to include particular types of movement an object. For example movement of an object toward a user may satisfy a movement criteria while movement away or parallel to a user may not satisfy the movement criteria. Accordingly, the extended reality system can be configured to update how objects are reproduced in the extended reality environment based on a type of movement. Different focus modes can include different update criteria. For example some focus modes may require more substantial movement (e.g., the object is going to hit the user) and other focus modes may require less movement and update the extended reality environment based on the movement of any objects within the environment.

At operation 3208, the process 3200 can include updating the extended reality environment based on the detected change. In some cases, this can include switching from replacing an object with additional content to displaying a reproduction of the object within the extended reality environment. In other cases, the extended reality system may show the actual real-world object within the context of the extended reality system and/or stop displaying the extended reality environment so that the user can see the physical environment.

In other cases, the extended reality environment may update the additional content based on the detected change meeting the updated criteria. For example, the extended reality environment may replace an object with virtual content to remove the object in the extended reality environment. If the extended reality system detects a change in the object that meets the update criteria, the extended reality system may replace the object with different virtual content to indicate the change in the object. For example, the object may be a pet of the user of the system. Initially, the extended reality system may replace the pet with virtual content to generate an extended reality environment that does not include the pet. The system may determine that the pet is walking towards the user and determine that this movement meets an update criteria (e.g., movement criteria for the focus mode). The extended realty system may update the extended realty environment to reproduce the pet so that the user can see the pet walking toward them. In other cases, the extended reality system may generate a modified version of the pet to help reduce distractions to the user. For example, the pet can be displayed using a blur effect, style transfer or other modified representation to help reduce distractions in the extended reality environment.

In some cases, different focus modes can be configured with different update criteria for determining whether to update the extended reality environment based on changes in an object. For example, a first focus mode may include a first update criteria for switching from replacing an object with additional content to reproducing the object in the extended reality environment and a second focus mode may include a second update criteria, different from the first for switching from replacing the object with additional content to reproducing the object. The different focus modes may be associated with different attentive states of the user and the update criteria can be based on the attentive state. For example, the first focus mode may be associated with a lower attentive state and the first updated criteria may require a less significant change to reproduce the object in the extended reality environment as compared to the second focus mode. Accordingly, the first focus mode may allow great amounts of breakthrough as compared to the second focus mode. The extended reality system may transition between focus modes based on a detected activity, a user selection of a focus mode, based on changes in the environment and/or in response to other criteria being met as described herein.

Embodiments described herein are also directed to extended reality systems that determines if a user is in an attentive state that meets a focus criteria of an activity. Different activities may be associated with different focus criteria, for example, based on a difficulty of a particular activity. The extended reality system can evaluate whether a user is "ready" to perform a particular activity (e.g., whether the user is likely to be able to sufficiently focus on an activity, is likely to perform the activity with a threshold level of efficiency, or the like). The system may determine that a current attentive state does not satisfy a focus criteria for a particular activity and take one or more actions in response. The system prompts a user to delay the activity or perform one or more actions to prepare the user for the activity in an extended reality environment.

In some cases, the extended reality system is configured to determine that a user is initiating a first activity in an extended reality environment and select a focus criteria for the activity. The focus criteria may be associated with a focus level required for an activity (with activities that require greater mental effort/focus having a greater required focus level and activities that require less mental effort/focus having lower required focus level). The extended reality system may determine an attentive state of a user, which may include measuring physiological parameters of the user such as eye movement, heart rate, respiratory rate, and/or evaluating parameters such as an amount of sleep for a user over a time period, stress levels, and so on. The extended reality system may determine whether the attentive state of the user satisfies the focus criteria for the first activity. In response to determining that the attentive state does not satisfy the focus criteria, the extended reality system may prompt the user to perform a second activity that is configured to increase an attentive state of the user.

The second activity may be selected based on the attentive state of the user, based on the first activity, based on a user selection, and so on. The second activity may be initiated in the extended reality environment and include task that prepare the user for the first activity. In some cases, the tasks may include audio or visual stimulations, breathing, relaxing or other mental exercises or other suitable activities. In some cases, in response to performing the second activity, the extended reality system may initiate the first activity. In other cases, the extended reality system may re-evaluate the focus level of the user to determining if it satisfies the focus criteria. In response to initiating the first activity, the extended reality system may enter a focus mode that reduces distractions in the extended reality environment as described herein.

In some cases, the extended reality system can determine a future activity of a user and enter a focus mode in an extended reality environment that prepares the user for the future activity. For example, the focus mode may be selected to improve a user's ability to focus by removing distractions in the extended reality environment prior to the user engaging in the activity. In some cases, the focus mode can reproduce some of the physical environment in the extended reality environment and add additional content to other portions thereof that is not present in the physical environment. The additional content can replace, remove or otherwise modify an object in the physical environment and/or modify one or more regions of the extended reality environment as described herein. In some cases, the additional content can be selected based on an attentive state of a user. The additional content may include visual, auditory or haptic stimulations that are configured to increase a user's ability to focus. For example, the additional content may replace distracting objects in the physical environment with a soothing or calming virtual effect. For example, a virtual effect may include changing a brightness (e.g., decreasing brightness) of a room, changing a color temperature (e.g., reproducing portions of the physical environment using warmer color temperatures), replacing a distracting object with a different object, as described herein.

The extended reality system can be configured to determine that an attentive state of the user does not meet a focus criteria of a current activity (e.g., a required focus level for the current activity) and suspend the current activity in the extended reality environment. In some cases, a different activity can be initiated in the extended reality environment in response to suspending the first activity. In other cases, the extended reality system may present a list of recommended activities to the user in response to suspending the current activity. The recommended activities may be based on the current attentive state of the user and/or the suspended activity. In some case, the extended reality system may schedule the suspended activity for another time, such as a different day. The suspended activity may be rescheduled based on a user profile that indicates when an attentive state of a suer is likely to meet the focus criteria for the suspended activity. For example, the extended reality system may track user attentive state over time and develop a focus profile that indicates how a user's focus changes over a time period, in response to performing specific activities, and so on. Accordingly, this profile can be used select an alternative activity or to reschedule a suspended activity.

Figure 33:
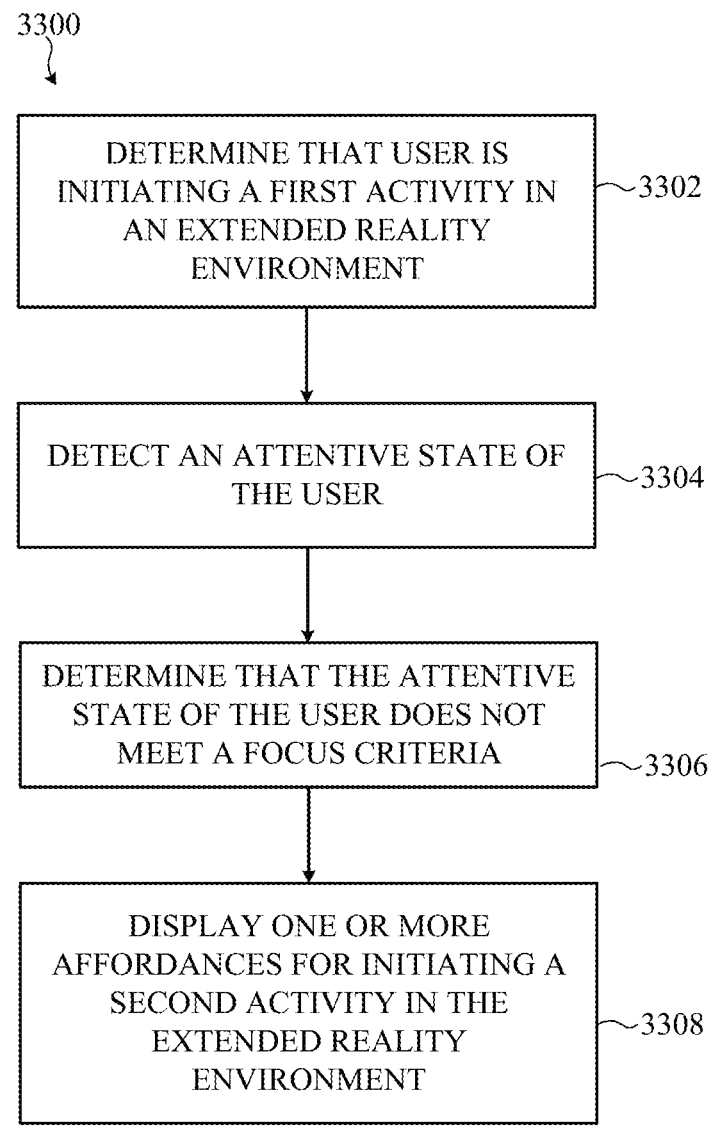
FIG. 33 shows an example process flow for determining whether to initiate an activity in a focus mode based on an attentive state of a user.

FIG. 33 shows an example process 3300 for determining whether to initiate an activity in a focus mode based on an attentive state of a user. The process 3300 can be performed by an extended reality system including the extended reality systems described herein.

At operation 3302, the process 3300 can include determining that a user is initiating a first activity in an extended reality environment, as described herein. For example, the extended reality system may identify the first activity using sensors data (e.g., imaging data), calendar data, in response to a user input indicating the first activity and/or in any other suitable way.

At operation 3304, the process 3300 can include detecting an attentive state of the user, for example, using one or more sensors. The extended reality system may monitor physiological parameters of a user such as eye and/or head movement, heart rate, respiratory rate, and so on. Additionally or alternatively, the extended reality system may obtain other information that can be used to determine an attentive state such as sleep data, other activities the user has performed (e.g., which may be used to determine a mental fatigue or mental state of a user), and so on. In some cases, the extended reality system may generate an extended reality environment that includes a series of tasks and evaluate a user's performance to determine a mental state. For example, the extended reality system may monitor a user's eye movements and/or focus on objects in the extended reality environment and associated with a task, how a user responds to various stimuli and so on. This data can be used to derive an attentive state of a user.

At operation 3306, the process 3300 can include determining that the attentive state of the user does not meet a focus criteria for the first activity. Each activity may include a defined focus level, which indicates how mentally taxing and/or a scale of how much focus is required for a particular task. In some cases, the focus criteria may be based on previously collected user data and generated for a specific user. For example, if the user has performed the same or similar activity, the extended reality system may determine how long it took the user to complete, how often the user was distracted during the activity, types of objects that distracted a user and so on. In some cases, the distraction criteria may be relative to other activities a user has performed and indicate a relative scale.

At operation 3308, the process 3300 can include displaying one or more notifications to the user in the extended reality environment. The notifications can indicate that the user's current estimated attentive state is below a threshold level designated the task. The notifications can suggest that a user delay the task and try again at a later time and/or provide one or more affordances for performing other activities. In some cases, the extended reality system may display an affordance for initiating a second activity that is configured to prepare a user for the first activity. For example, the second activity can be configured to increase a user's ability to focus. In some cases, the second activity can be selected based on the current attentive state of a user and/or the focus criteria associated with the first activity. For example, if the attentive state of the first user is low, the extended reality system may select a second activity that is easier for the user or provides a greater amount of time to help the user refocus before performing the first activity.

In response to selecting the affordance for the second activity, the extended reality system can be configured to initiate an extended reality environment for performing the second activity. The extended reality system may monitor the user during the second activity, including monitoring changes in a user's attentive state or other physiological conditions. In some cases, in response to the user completing the second activity the extended reality system can initiate the first activity. In other cases, after completing the second activity, the extended reality system may determine if the user's attentive state satisfies the focus criteria, and if it does may initiate the first activity. If the extended reality system determines that the user's attentive state does not meet the focus criteria for the first activity after the second activity, the system may exit the focus mode and/or suspend the first activity until a later time.

Figure 34:
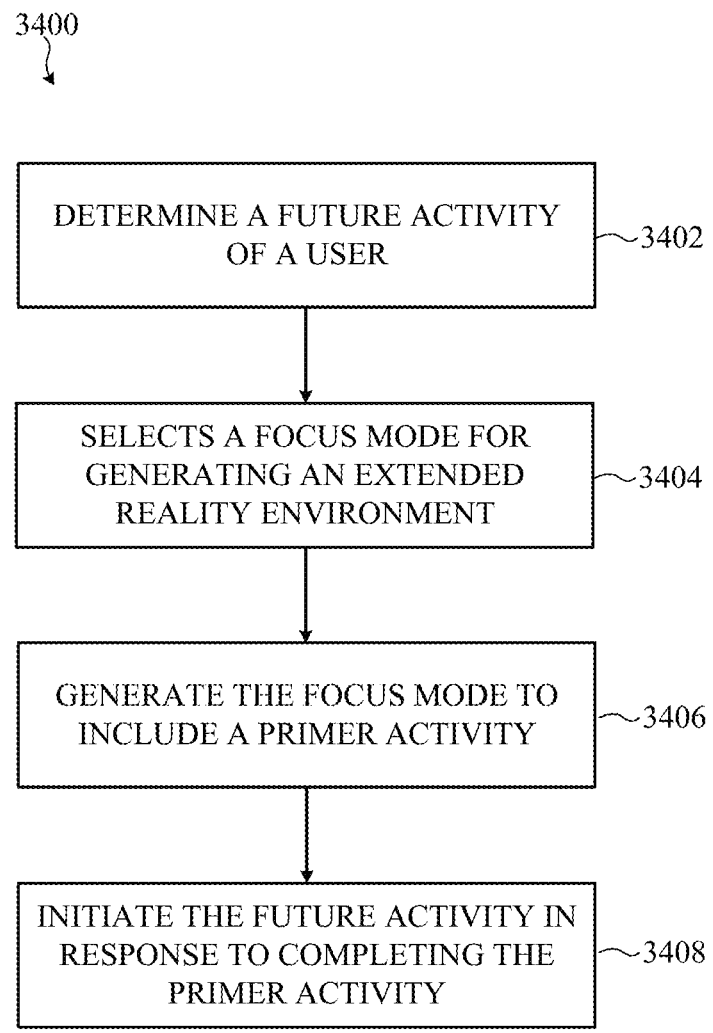
FIG. 34 shows an example process for evaluating a user attentive state an recommending a primer activity prior to engaging in a future activity.

FIG. 34 shows an example process 3400 for evaluating a user attentive state an recommending a primer activity prior to engaging in a future activity. The process 3400 may be performed by an extended reality system including the extended reality systems described herein.

At operation 3402, the process 3400 can include determining a future activity of a user. The extended reality system may determine a feature activity of a user using data from a calendar application, based on tracking a user's schedule/routine over time, from a user input to the system indicating the activity. Additionally or alternatively, the extended reality system may use imaging data to identify a physical environment around a user and/or objects in a physical environment that are associated with the future activity. For example, the extended reality system may determine that the user has scheduled a writing assignment in a calendar application. The extended reality system may use imaging data identify an object such as a notebook or computer in the physical environment and determine that the future activity is the writing assignment and is about to begin.

At operation 3404, the process 3400 can include selecting a focus mode for generating an extended reality environment. In some cases, the extended reality environment can be generated in response to determining that the user is initiating the future activity. For example the focus mode can be initiated at the scheduled time of the future activity, in response to a user engaging with an object associated with the future activity (e.g., opening a notebook), and so on.

The focus mode can be selected based on the future activity. For example, a particular focus mode may be associated with the particular activity and/or activity type as described herein. In other cases, the extended reality system may select a focus mode based on the focus level required for the activity. Additionally or alternatively, the extended reality system may present one or more focus modes to the user for selection as described herein.

The focus mode can include an object based focus mode that identifies one or more object that meet distraction criteria and replace the objects with additional content. Additionally or alternatively, the extended reality system may implement a region based focus mode that identifies one or more regions of the environment and applies a visual modification to the region in the extended reality environment.

At operation 3406, the process 3400 can include generating the focus mode to include a primer activity. In some cases, the primer activity may be configured to help prepare a user for the determined future activity. The extended reality system may generate the primer activity in response to measuring one or more parameters of a user such as an attentive state of the user. In some cases, the primer activity can include selecting additional content to include in the extended reality environment. For example, the additional content can include activities, visual stimulation, audio stimulation and/or other content that removes distractions in the extended reality environment.

At operation 3408, the process can include initiating the future activity in response to completing the primer activity. In some cases, the focus mode can be continued after the activity is initiated. In other cases, the focus mode can be changed based on the activity. In yet other cases, the extended reality system can end the focus mode in response to initiating the activity.

Figure 35:
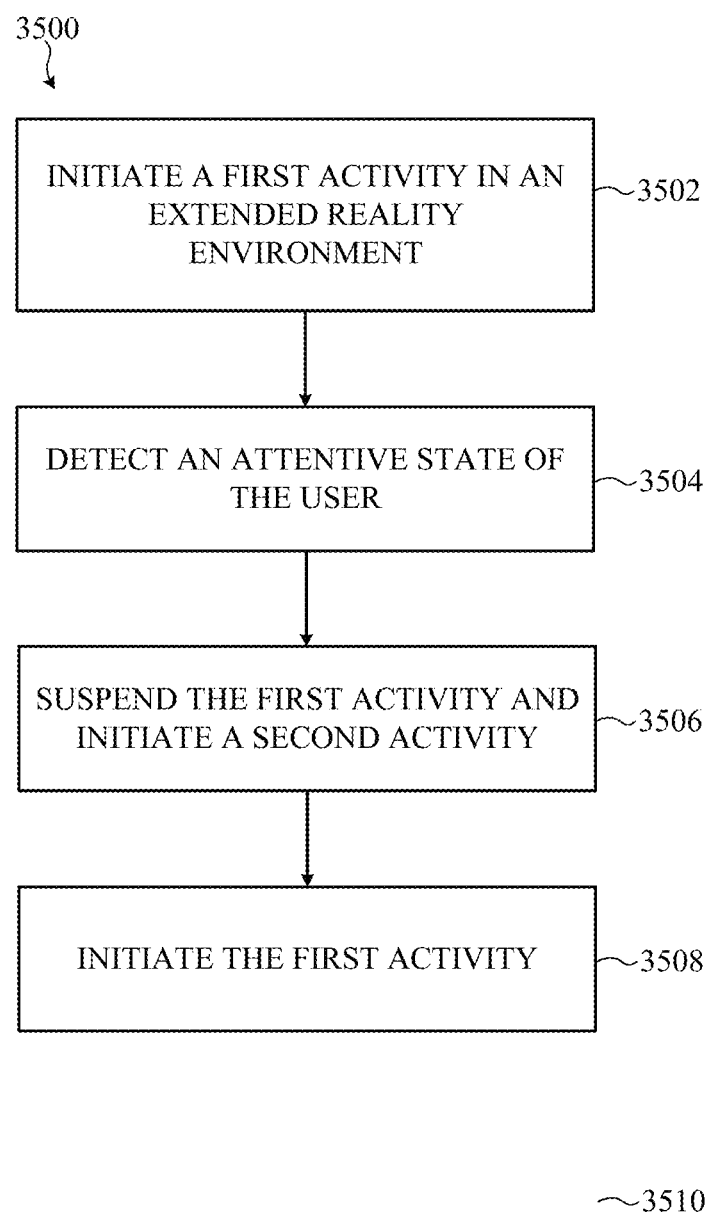
FIG. 35 shows an example process for suspending a current activity based on one or more monitored parameters of a user.

FIG. 35 shows an example process 3500 for suspending a current activity based on one or more monitored parameters of a user. The process 3500 can be performed by an extended reality system including the extended reality system described herein.

At operation 3502, the process 3500 can include initiating a first activity in an extended reality environment. The extended reality system enters a focus mode for the activity, where the focus mode reduces distractions in the extended reality environment as described herein. The focus mode can be selected based on the activity, a focus level associated with the activity, a user selected focus mode, or using other techniques as described herein.

At operation 3504, the process 3500 can include detecting an attentive state of the user during the activity. The extended reality system can receive sensor data from one or more sensors that measure one or more user parameters and use the sensor data to determine an attentive state of a user as described herein.

At operation 3506, the process 3500 can include determining that the attentive state of the user does not meet a focus criteria. In response to determining that the attentive state of the user does not meet the focus criteria, the extended reality system can suspend a first activity and initiate a second activity. For example, the extended reality system may select a second activity that is configured to increase an attentive state of the user, provide a break from the first activity, or otherwise help increase the user's attentive state. In some cases, the extended reality system can generate an extended reality environment for the second activity that include virtual content such as visual stimulation, audio stimulation, one or more tasks for the user to perform.

In some cases, the extended reality system can present a list of candidate activities tot eh user and initiate a selects activity in the extended reality environment. The list of candidate activities can be based on the attentive state of the user, the first activity, an activity type associated with the first activity, and so on.

At operation 3508, the process 3500 can include re-initiating the first activity. In some cases, the first activity can be re-initiated in the extended reality environment based on a successful completion of the second activity. In other case, the first activity can be re-initiated in response to satisfying a time duration, the user's attentive state satisfying a focus criteria associated with the first activity. In other examples, the first activity can be re-initiated by the user.

Figure 36:
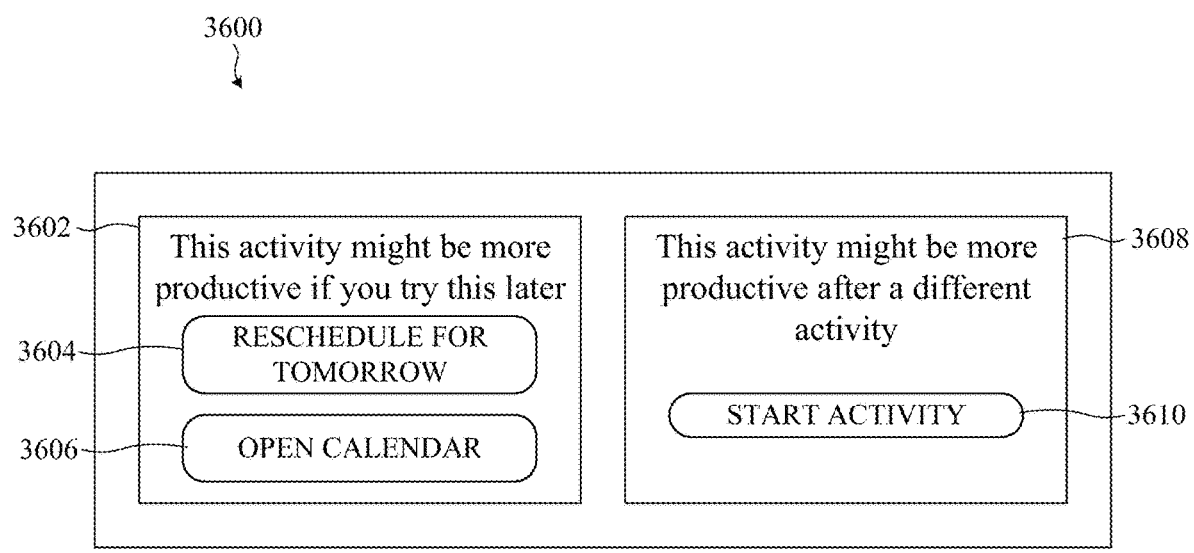
FIG. 36 shows an example user interface for suspending an activity.

FIG. 36 shows an example user interface 3600 for suspending an activity. The user interface 3600 can include one more affordances which can provide a user with different options for suspending or rescheduling an activity. In some cases, the user interface may be displayed in response to determining that an attentive state of the user does not satisfy a focus criteria, which may be determine before initiating an activity or while a user is performing an activity. The user interface can be displayed in the extended reality environment by the extended reality system.

The user interface 3600 can include a first set of affordances 3602 that provide options for delaying and rescheduling an activity. For example, the first set of affordances 3602 may include a first option 3604 for rescheduling an activity for a suggested time. In some cases, the extended reality system may determine a suggested time based on profile data for a user, which may be learned by the system over time. For example, the system may track user attentive levels and determine how a user's attentive state changes based on a day, time, in response to other activities and so on. The extended reality system may use this data to determine a suggested time for rescheduling the activity. The first set of affordances 3602 may also include a second option 3606 for opening a calendar application, which can be used to select a date and time for scheduling the activity.

The user interface 3600 can include a second set of affordances that provide one or more options for initiating a different activity (e.g., primer activity) to help improve a user's ability to focus on completing the current activity. For example, the user interface may include a third option 3610 for performing a primer activity. The primer activity may be suggested by the system based on the user's current attentive state, a focus criteria for the primary activity or using other techniques as described herein.

Figure 37:
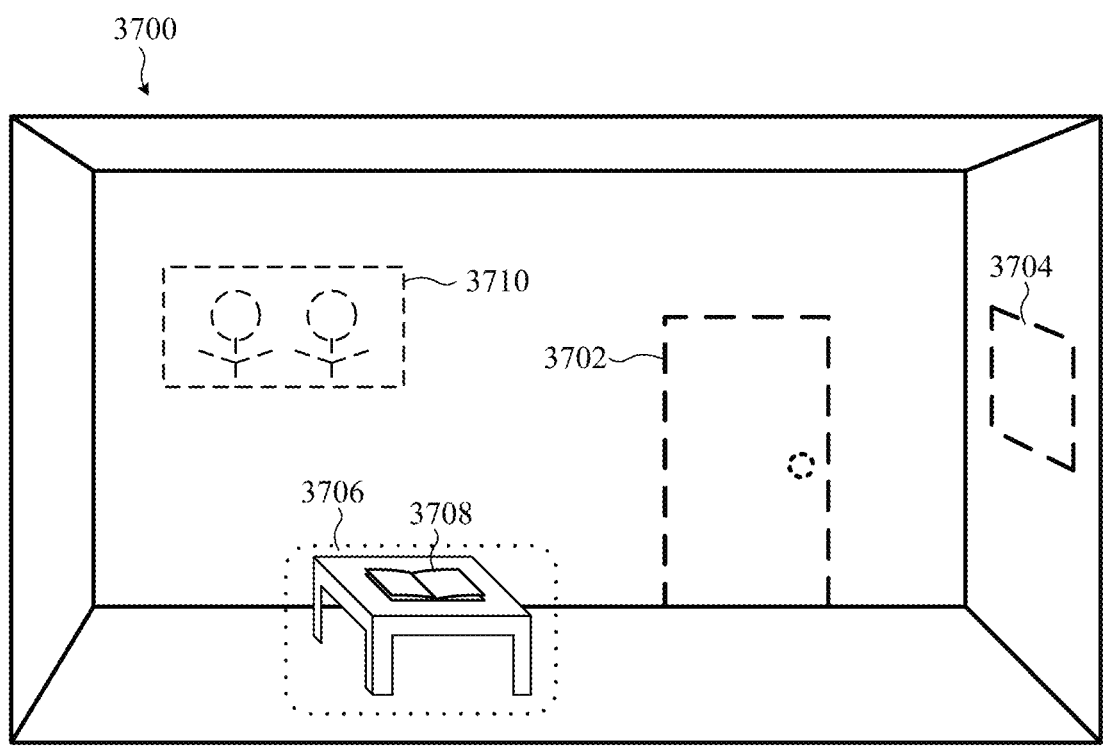
FIG. 37 shows an example extended reality environment showing modifications to a physical environment prior to initiating an activity in a focus mode.

FIG. 37 shows an example extended reality environment 3700 showing modifications to a physical environment prior to initiating an activity in a focus mode. The extended reality environment 3700 can be generated and displayed by an extended reality system as described herein.

The extended reality environment can be based on a room and can show how a particular focus mode will modify the physical environment prior to initiating an activity. For example, the focus mode may cause the extended reality system to identify that the user is engaging in an activity that include a book 3708. The extended reality system may also determine a table 2706 is associated with the book and determine that the book 3708 and the table 2706 should be reproduced in the extended reality environment (e.g., shown by highlight or surrounding the desk 3706 and the book 3708). The extended reality system may identify a door 3702, a window 3704 and a display 3710 as satisfying a distraction criteria and designate that these objects and/or the regions associated with these objects will be replaced with additional content, as described herein. Accordingly, prior to initiating the activity a user of the system may preview the effect of a particular focus mode, can make edits/change to how a focus mode will operate and/or select a different focus mode for the activity.

As described above, one aspect of the present technology is monitoring and managing physiological conditions and or other parameters of a user and/or the user's environment. The present disclosure contemplates that in some instances this gathered data may include personal information data that uniquely identifies or can be used to contact or locate a specific person. Such personal information data can include demographic data, location-based data, telephone numbers, email addresses, Twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining the privacy and security of personal information data. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and revised to adhere to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The following clauses further describe various embodiments that may include various features as described above and/or illustrated in the figures:

Clause 1. A wearable system, comprising:
    a head-mounted display;
    a set of sensors; and
    a processor configured to:
        determine whether an activation criteria has been met;

in response to the activation criteria being met, enter a focus mode that reduces distraction in an extended reality environment; and while in the focus mode:
receive imaging data of a physical environment using the set of sensors;
identify, using the imaging data, an object that is positioned within a first region of the physical environment and that meets a distraction criteria;
select additional content based on the identified object;
generate the extended reality environment that includes a reproduction of the first region of the physical environment, wherein the reproduction includes a subregion in which the imaging data associated with the identified object is replaced with the additional content; and
display the extended reality environment using the head-mounted display.

Clause 2. The wearable system of clause 1, wherein the processor is configured to:
determine a current activity of the user;
determine a focus level associated with the current activity; and
select the distraction criteria based on the determined focus level.

Clause 3. The wearable system of clause 2, wherein the processor is configured to:
determine whether the activation criteria has been met based on the current activity.

Clause 4. The wearable system of clause 1, wherein:
the additional content comprises a virtual environment that represents the physical environment with the identified object removed.

Clause 5. The wearable system of clause 1, wherein:
the additional content comprises a virtual object.

Clause 6. The wearable system of clause 5, wherein:
the virtual object is generated using the imaging data of the physical environment associated with the object.

Clause 7. The wearable system of clause 1, wherein:
determining whether the activation criteria has been met comprises:
detecting an attentive state of the user; and
determining whether the attentive state meets an attention threshold.

Clause 8. The wearable system of clause 1, wherein the processor is configured to:
determine an attentive state of the user; and
select the distraction criteria based on the determined attentive state.

Clause 9. The wearable system of clause 1, wherein selecting the additional content based on the identified object comprises:
determining an object type of the identified object; and
selecting the additional content using a stored user preference for the determined object type.

Clause 10. A head-mounted device to be worn by a user, comprising:
a display;
a first set of sensors configured to detect a physical environment around the user;
a second set of sensors configured to measure one or more physiological parameters of the user; and
a processor configured to:
generate an extended reality environment that includes a first reproduction of a first portion of the physical environment;
display the extended reality environment using the display;
detect, using the second set of sensors, user engagement with a candidate object in the first reproduction;
in response to the detected user engagement meeting a selection criteria, assigning a distraction type to the candidate object;
in response to an activation criteria being met, enter a focus mode that reduces distraction in the extended reality environment; and
while in the focus mode:
receive imaging data of the physical environment around the user using the first set of sensors;
identify, using the imaging data, a target object that is associated with the selected distraction type and is positioned within a second region of the physical environment; and
generate the extended reality environment that includes a second reproduction of the second region of the physical environment with the target object replaced with additional content.

Clause 11. The head-mounted device of clause 10, wherein:
detecting the user engagement with the candidate object comprises determining an amount of time that a gaze position of the user corresponds to the candidate object; and
the selection criteria is a time threshold.

Clause 12. The head-mounted device of clause 10, wherein the processor is configured to:
detect the user engagement with the candidate object while in the focus mode.

Clause 13. The head-mounted device of clause 12, wherein:
the target object is the candidate object.

Clause 14. The head-mounted device of clause 10, wherein the additional content is selected based on the distraction type.

Clause 15. The head-mounted device of clause 10, wherein the processor is configured to, during the focus mode:
determine a current activity of the user;
determine whether the target object is associated with the current activity; and
generate the extended reality environment that includes the second reproduction in response to determining that the target object is not associated with the current activity.

Clause 16. The head-mounted device of clause 10, wherein the processor is configured to:
prompt the user to confirm the selected distraction type.

Clause 17. A method for operating a head-mounted device during a focus mode that reduces distraction in an extended reality environment, the method comprising:
receiving imaging data of a physical environment around a user using a set of sensors;
identifying, using the imaging data, a candidate object in a portion of the physical environment;
selecting a first distraction criteria;
determining that the candidate object does not meet the first distraction criteria;

generating the extended reality environment that includes a first reproduction of the portion of the physical environment with the candidate object;
displaying the extended reality environment using a display;
selecting a second distraction criteria;
determining that the candidate object meets the second distraction criteria;
updating the extended reality environment to include a second reproduction of the portion of the physical environment that replaces the candidate object with additional content; and
displaying the updated extended reality environment with the display.

Clause 18. The method of clause 17, comprising:
determining that a current activity of the user is a first activity; and
determining that the current activity has changed from the first activity to a second activity, wherein:
the first distraction criteria is selected using the first activity; and
the second distraction criteria is selected using the second activity.

Clause 19. The method of clause 18, wherein:
the additional content is selected using the second activity.

Clause 20. The method of clause 17, comprising:
determining that an attentive state of the user is a first state; and
determining that the attentive state has changed from the first state to a second state, wherein:
the first distraction criteria is selected using the first state; and
the second distraction criteria is selected using the second state.

Clause 21. A wearable system, comprising:
a head-mounted display;
a set of sensors; and
a processor configured to:
determine whether an activation criteria has been met;
determining a current activity of a user;
in response to the activation criteria being met, enter a focus mode that reduces distraction in an extended reality environment; and
while in the focus mode:
receive imaging data of a physical environment around the user using the set of sensors;
select a primary region and a peripheral region of the extended reality environment, wherein the primary region corresponds to a first region of the physical environment and the peripheral region corresponds to a second region of the physical environment;
generate the extended reality environment with the primary region and the peripheral region, wherein the primary region includes content associated with the current activity and the peripheral region includes a modified representation of the second region of the physical environment; and
cause the head-mounted display to display the extended reality environment, wherein:
the modified representation is generated by applying a modification to imaging data associated with the second region of the physical environment.

Clause 22. The wearable system of clause 21, wherein the processor is configured to:
select the primary region and the peripheral region based on the current activity.

Clause 23. The wearable system of clause 22, wherein:
selecting the primary region and the peripheral region based on the current activity comprises:
determining that the first region of the physical environment is associated with the current activity; and
determining that the second region of the physical environment is not associated with the current activity.

Clause 24. The wearable system of clause 21, the processor is configured to:
determine whether the activation criteria has been met based on the current activity.

Clause 25. The wearable system of clause 21, wherein the processor is configured to:
select the modification based on the current activity.

Clause 26. The wearable system of clause 25, wherein:
selecting the modification based on the current activity comprises:
determine a focus level associated with the current activity; and
select the modification based on the determined focus level.

Clause 27. The wearable system of clause 21, wherein:
the content associated with the current activity includes a reproduction of a portion of the first region of the physical environment.

Clause 28. The wearable system of clause 27, wherein the processor is configured to, while in the focus mode:
identify, using the imaging data, an object that is positioned within the first region of the physical environment and that meets a distraction criteria, wherein:
the reproduction comprises a subregion in which imaging data associated with the identified object is replaced with additional content.

Clause 29. The wearable system of clause 21, wherein the modification is a synthetic blur effect.

Clause 30. A wearable system, comprising:
a head-mounted display;
a set of sensors; and
a processor configured to:
receive imaging data of a physical environment around a user using the set of sensors;
and enter a focus mode that reduces distraction in an extended reality environment;
while in the focus mode:
select a region of the physical environment;
apply a modification to imaging data associated with the region to generate a modified representation of the region;
select a candidate object in the physical environment that meets a selection criteria; and
generate the extended reality environment that includes the modified representation of the region and a reproduction of the candidate object.

Clause 31. The wearable system of clause 30, wherein the processor is configured to
determine a current activity of the user, wherein:
selecting the candidate object comprises determining that that the candidate object is associated with the current activity.

Clause 32. The wearable system of clause 31, wherein:
selecting the region comprises determining that the region is not associated with the current activity.

Clause 33. The wearable system of clause 31, wherein the processor is configured to:
select the modification based on the current activity.

Clause 34. The wearable system of clause 30, wherein:
the processor is configured to detect user engagement with the candidate object; and
selecting the candidate object comprises determining that the user engagement meets an engagement criteria.

Clause 35. The wearable system of clause 34, wherein the processor is configured to:
determine, following selection of the candidate object, that the user engagement no longer meets the engagement criteria;
update the region to include an additional region associated with the candidate object;
apply the modification to imaging data associated with the updated region to generate a modified representation of the updated region; and
update the extended reality environment to include the modified representation of the updated region.

Clause 36. The wearable system of clause 30, wherein the processor is configured to, in response to entering the focus mode:
prompt the user to select the modification from a set of candidate modifications.

Clause 37. A wearable system, comprising:
a head-mounted display;
a set of sensors; and
a processor configured to:
receive imaging data of a physical environment around a user using the set of sensors;
and enter a focus mode that reduces distraction in an extended reality environment;
when in the focus mode:
determine a current activity of the user;
determine that a first region of the physical environment is associated with the current activity;
determine that a second region of the physical environment is not associated with the current activity; and
select a modification;
generate a modified representation of the second region of the physical environment using the modification; and
generate the extended reality environment that includes a reproduction of the first region of the physical environment and the modified representation of the second region of the physical environment; and
cause the head-mounted display to display the extended reality environment.

Clause 38. The wearable system of clause 37, wherein the processor is configured to:
determine an attentive state of the user; and
select the modification based on the determined attentive state.

Clause 39. The wearable system of clause 37, wherein the processor is configured to:
identify one or more objects within the first region; wherein:
the reproduction of the first region of the physical environment includes a subregion in which imaging data associated with the identified object is replaced with the additional content.

Clause 40. The wearable system of clause 37, wherein the modification is a style transfer effect.

Clause 41. A wearable system, comprising:
a head-mounted display;
a set of sensors; and
a processor configured to:
in response to determining that a first activation criteria has been met, enter a first focus mode that reduces distraction in an extended reality environment; and
while in the first focus mode:
receive imaging data of a physical environment around a user using the set of sensors; and
cause the head-mounted display to display the extended reality environment that includes a reproduction of a first portion of the physical environment in which a distracting object in the first portion of the physical environment is replaced with additional content;
in response to determining that a second activation criteria has been met, entering a second focus mode that reduces distraction in the extended reality environment; and
while in the second focus mode:
receive imaging data of the physical environment around the user using the set of sensors; and
cause the head-mounted display to display the extended reality environment that includes a modified representation of a second portion of the physical environment.

Clause 42. The wearable system of clause 41, wherein the processor is configured to:
determine a current activity of the user;
determine a focus level associated with the current activity;
in response to the focus level exceeding a first threshold, determine that the first activation criteria has been met;
in response to the focus level exceeding a second threshold, determine that the second activation criteria has been met.

Clause 43. The wearable system of clause 42, wherein:
the first threshold is less than the second threshold.

Clause 44. The wearable system of clause 41, wherein the processor is configured to:
determine that a candidate object in the first portion of the physical environment meets a distraction criteria; and
select the candidate object as the distracting object.

Clause 45. The wearable system of clause 44, wherein the processor is configured to:
determine a current activity of the user; and
select the distraction criteria based on the determined current activity.

Clause 46. The wearable system of clause 41, wherein the processor is configured to:
determine a current activity of the user;
determine that the second portion of the physical environment is not associated with the current activity; and
determine that a third portion of the physical environment is associated with the current activity, wherein:
causing the head-mounted display to display the extended reality environment that includes a modified representation of the second portion of the physical environment comprises causing the head-mounted display to display the extended reality environment that includes a reproduction of the third portion of the physical environment.

Clause 47. The wearable system of clause 41, wherein the processor is configured to:
determine a current activity of the user;
select a modification based on the determined current activity; and
apply the modification to imaging data associated with the second portion of the physical environment to generate the modified representation of the second portion of the physical environment.

Clause 48. The wearable system of clause 47, wherein the processor is configured to:
determine a focus level associated with the determined current activity, wherein
selecting the modification based on the current activity comprises selecting the modification based on the determined focus level.

Clause 49. The wearable system of clause 41, wherein the processor is configured to:
receive an activation input from the user; and
determine that the first activation criteria has been met in response to the received activation input being associated with the first focus mode.

Clause 50. The wearable system of clause 49, wherein the processor is configured:
prompt the user to select a target focus mode from a set of candidate focus modes.

Clause 51. A wearable system comprising:
a head-mounted display;
a set of sensors; and
a processor configured to:
receive imaging data of a physical environment around a user using the set of sensors;
identify that the user is initiating an activity:
in response to identifying that the user is initiating the activity:
cause the head-mounted display to display a plurality of selectable options, each of which is associated with a corresponding focus mode that reduces distraction in an extended reality environment;
detect an input selecting one of the plurality of selectable options that corresponds to a selected focus mode;
enter the selected focus mode; and
while in the selected focus mode:
select a portion of the physical environment based on the selected focus mode; and
cause the head-mounted display to present the extended reality environment in which imaging data associated with the portion of the physical environment is replaced with additional content.

Clause 52. The wearable system of clause 51, wherein the processor is configured to:
select the plurality of selectable options based on the activity.

Clause 53. The wearable system of clause 52, wherein the processor is configured to:
determine a focus level associated with the activity, wherein:
selecting the plurality of selectable options based on the activity comprises selecting the plurality of selectable options based on the determined focus level.

Clause 54. The wearable system of clause 51, wherein the additional content is a modified representation of the portion of the physical environment.

Clause 55. The wearable system of clause 51, where the additional content comprises a virtual object.

Clause 56. The wearable system of clause 51, wherein the processor is configured to:
determine that the activity has changed; and
exit the selected focus mode in response to determining that the activity has changed.

Clause 57. A wearable system, comprising:
a head-mounted display;
a set of sensors; and
a processor configured to:
receive imaging data of a physical environment around a user using the set of sensors;
in response to determining that an activation criteria has been met, determine a first attentive state of the user;
select a first focus mode that reduces distraction in an extended reality environment, the first focus mode selected based on the first attentive state;
enter the first focus mode, in which the processor is configured to:
select a first portion of the physical environment based on a first criteria; and
cause the head-mounted display to present the extended reality environment in which imaging data of associated with the first portion of the physical environment is replaced with first additional content;
determine that the first attentive state has changed to a second attentive state;
selecting a second focus mode that reduces distraction in the extended reality environment, the second focus mode selected based on the second attentive state;
changing from the first focus mode to the second focus mode, in which the processor is configured to:
select a second portion of the physical environment based on a second criteria; and
cause the head-mounted display to present the extended reality environment in which imaging data of associated with the second portion of the physical environment is replaced with second additional content.

Clause 58. The wearable system of clause 57, wherein:
the first additional content is a virtual object; and
the second additional content is a modified representation of the second portion of the physical environment.

Clause 59. The wearable system of clause 57, wherein the processor is configured to:
determine a current activity of the user; and
determine whether the activation criteria has been met based on the determined current activity.

Clause 60. The wearable system of clause 57, wherein:
selecting the first portion of the physical environment based on the first criteria comprises determining that the first portion of the physical environment is not associated with the determined current activity.

Clause 61. A wearable system, comprising:
a head-mounted display;
a set of sensors; and
a processor configured to:

cause the wearable system to enter a focus mode that reduces distraction in an extended reality environment; and
in the focus mode:
receive imaging data of a physical environment around a user using the set of sensors;
select a region of the physical environment that includes an object that meets a distraction criteria;
cause the head-mounted display to display the extended reality environment in which imaging data associated with the region of the physical environment is replaced with additional content;
detect user engagement corresponding to the additional content that meets an interaction criteria; and
in response to detecting the user engagement corresponding to the additional content, update the extended reality environment to include a reproduction of a portion of the object.

Clause 62. The wearable system of clause 61, wherein the additional content comprises a virtual object.

Clause 63. The wearable system of clause 62, wherein the processor is configured to:
identify a category associated with the object; and
select the virtual object using the identified category.

Clause 64. The wearable system of clause 62, wherein:
the object is a display screen; and
the virtual object is a display screen with predetermined content displayed thereon.

Clause 65. The wearable system of clause 61, wherein the processor is configured to:
determine a current activity of the user;
determine a focus level associated with the determined current activity; and
select the distraction criteria based on the determined focus level.

Clause 66. The wearable system of clause 61, wherein the additional content comprises a modified representation of the region.

Clause 67. The wearable system of clause 61, wherein the extended reality environment includes a reproduction of an additional region of the physical environment.

Clause 68. The wearable system of clause 61, wherein:
detecting user engagement with the additional content comprises determining an amount of time that a gaze position of the user corresponds to the additional content; and
the interaction criteria is a time threshold.

Clause 69. The wearable system of clause 61, wherein:
detecting user engagement with the additional content comprises detecting a predefined gesture of the user that corresponds to the additional content.

Clause 70. The wearable system of clause 61, wherein:
detecting user engagement with the additional content comprises detecting a voice command that corresponds to the additional content.

Clause 71. A wearable system, comprising:
a head-mounted display;
a set of sensors; and
a processor configured to:
in response to determining that a first activation criteria has been met, entering a focus mode that reduces distraction in an extended reality environment; and
while in the focus mode:
receive imaging data of a physical environment around a user using the set of sensors; and
cause the head-mounted display to display the extended reality environment that includes a reproduction of a portion of the physical environment in which an object in the portion of the physical environment is replaced with additional content;
detect a change in the object using the set of sensors; and
in response to the change in the object meeting an update criteria, update the reproduction of the portion of the physical environment to remove the additional content.

Clause 72. The wearable system of clause 71, wherein:
detecting the change in the object comprises movement of the object; and
the update criteria includes one or more movement criteria.

Clause 73. The wearable system of clause 71, wherein:
detecting the change in the object comprises movement of the object comprises detecting a change in an appearance of the object.

Clause 74. The wearable system of clause 72, wherein:
updating the reproduction of the portion of the physical environment to remove the additional content comprises replacing the additional content with updated additional content.

Clause 75. The wearable system of clause 71, wherein:
wherein the updated additional content comprises a modified representation of the object.

Clause 76. A wearable system comprising:
a head-mounted display;
a set of sensors; and
a processor configured to:
operate in a plurality of focus modes that reduce distraction in an extended reality environment
in each focus mode of the plurality of focus modes:
receiving imaging data of a physical environment around a user using the set of sensors;
identify an object in the physical environment that meets a distraction criteria;
cause the head-mounted display to display the extended reality environment comprising a first region that reproduces the physical environment and a second region that replaces the object in the physical environment with additional content; and
determine user engagement corresponding to the second region;
in a first focus mode of the plurality of focus modes:
in response to the determined user engagement meeting a first criteria, update the second region of the extended reality environment to reproduce the object; and
in a second focus mode of the plurality of focus modes:
in response to the determined user engagement meeting a second criteria, different from the first criteria, update the second region of the extended reality environment to reproduce the object.

Clause 77. The wearable system of clause 76, wherein the processor is configured to:
detect an attentive state of the user; and in response to determining that the detected attentive state meets an attention threshold, enter the second focus mode.

Clause 78. The wearable system of clause 76, wherein the processor is configured to:
detect a current activity of the user;
in response to determining that the detected current activity is a first activity, enter the first focus mode; and
in response to determining that the detected current activity is a second activity, enter the second focus mode.

Clause 79. The wearable system of clause 76, wherein:
detecting user engagement corresponding to the second region comprises determining an amount of time that a gaze position of the user corresponds to the second region; and
the first criteria is a first time threshold; and
the second criteria is a second time threshold.

Clause 80. The wearable system of clause 76, wherein the processor is configured to:
switch from the first focus mode to the second focus mode in response to a switchover criteria being met; and
in response to switching from the first focus mode to the second focus mode, updating the additional content.

Clause 81. A wearable system, comprising:
a head-mounted display;
a set of sensors; and
a processor configured to:
determine that a user is initiating a first activity in an extended reality environment;
in response to determining that the user is initiating the first activity:
select a focus criteria associated with the first activity;
detect an attentive state of the user using the set of sensors;
determine whether the detected attentive state meets the focus criteria; and
in response to detected attentive state failing to meet the focus criteria, causing the head-mounted display to display a notification in the extended reality environment.

Clause 82. The wearable system of clause 81, wherein:
the notification comprises a first affordance; and
the processor is configured to initiate a second activity in the extended reality environment in response to user selection of the first affordance.

Clause 83. The wearable system of clause 82, wherein:
the second activity is selected based on the detected attentive state.

Clause 84. The wearable system of clause 82, wherein:
the processor is configured to resume the first activity after termination of the second activity.

Clause 85. The wearable system of clause 82, wherein:
the notification comprises a second affordance; and
the processor is configured to resume the first activity in response to the user selection of the second affordance.

Clause 86. The wearable system of clause 81, wherein:
the notification comprises a first affordance; and
the processor is configured to initiate a focus mode that reduces distraction in the extended reality environment in response to user selection of the first affordance.

Clause 87. The wearable system of clause 86, wherein:
the focus mode is selected from a set of candidate focus modes based on the detected attentive state.

Clause 88. The wearable system of clause 81, wherein selecting the focus criteria associated with the first activity comprises selecting the focus criteria using calibration information for the user.

Clause 89. A wearable system, comprising:
a head-mounted display;
a set of sensors; and
a processor configured to:
receive imaging data of a physical environment around a user using the set of sensors;
determine an estimated future activity of the user;
select, based on estimated future activity, a focus mode from a set of candidate focus modes that reduce distraction in an extended reality environment; and
enter the selected focus mode, during which the processor:
causes the head-mounted display to display the extended reality environment comprising first region that includes a reproduction of a first portion of the physical environment and a second region that includes additional content.

Clause 90. The wearable system of clause 89, wherein the processor is configured to:
detect an attentive state of the user; and
selecting the additional content based on the detected attentive state.

Clause 91. The wearable system of clause 89, wherein:
selecting the focus mode from the set of candidate focus mode comprises selecting the focus mode based on the imaging data of the physical environment around the user.

Clause 92. The wearable system of clause 89, wherein the processor is configured to:
determine that the user has initiated a current activity different from the estimated future activity; and
exit the selected focus mode in response to determining the user has initiated the current activity.

Clause 93. The wearable system of clause 89, wherein the processor is configured to:
determine the estimated future activity using the imaging data of the physical environment around the user.

Clause 94. The wearable system of clause 93, wherein:
determining the estimated future activity comprises identifying a target object in the imaging data of the physical environment around the user.

Clause 95. The wearable system of clause 89, wherein the processor is configured to:
determine the estimated future activity based on a scheduled event.

Clause 96. A wearable system comprising:
a head-mounted display;
a set of sensors; and
a processor configured to:
determine that a user is performing a first activity in an extended reality environment;
while the user is performing the first activity:
detect an attentive state of the user using the set of sensors;
determine whether the detected attentive state meets a focus criteria associated with the first activity; and
in response to the detected attentive state failing to meet the focus criteria:

suspend the first activity; and
initiate a second activity in the extended reality environment.

Clause 97. The wearable system of clause 96, wherein initiating the second activity comprises generating a virtual environment in the extended reality environment.

Clause 98. The wearable system of clause 96, wherein the processor is configured to, in response to the detected attentive state failing to meet the focus criteria:
present a list of candidate activities using the head-mounted display;
receive a user selection corresponding to the second activity; and
initiate the second activity in response to receiving the user selection.

Clause 99. The wearable system of clause 98, wherein:
the list of candidate activities is selected based on the detected attentive state.

Clause 100. The wearable system of clause 96, wherein the focus criteria changes with a duration of the first activity.

The methods, devices and systems described herein may be implemented in software, hardware, or a combination thereof, in different embodiments. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable system, comprising:
a head-mounted display;
a set of sensors; and
a processor configured to:
determine a current activity of the user;
determine a focus level associated with the current activity;
in response to the focus level exceeding a first threshold, determine that a first activation criteria has been met;
in response to determining that the first activation criteria has been met, enter a first focus mode that reduces distraction in an extended reality environment; and
while in the first focus mode:
receive imaging data of a physical environment around a user using the set of sensors; and
cause the head-mounted display to display the extended reality environment that includes a reproduction of a first portion of the physical environment in which a distracting object in the first portion of the physical environment is replaced with additional content;
in response to the focus level exceeding a second threshold, determine that a second activation criteria has been met;
in response to determining that the second activation criteria has been met, entering a second focus mode that reduces distraction in the extended reality environment; and
while in the second focus mode:
receive imaging data of the physical environment around the user using the set of sensors; and
cause the head-mounted display to display the extended reality environment that includes a modified representation of a second portion of the physical environment.

2. The wearable system of claim 1, wherein:
the first threshold is less than the second threshold.

3. The wearable system of claim 1, wherein the processor is configured to:
determine that a candidate object in the first portion of the physical environment meets a distraction criteria; and
select the candidate object as the distracting object.

4. The wearable system of claim 3, wherein the processor is configured to select the distraction criteria based on the determined current activity.

5. The wearable system of claim 1, wherein the processor is configured to:
determine that the second portion of the physical environment is not associated with the current activity; and
determine that a third portion of the physical environment is associated with the current activity, wherein:
causing the head-mounted display to display the extended reality environment that includes a modified representation of the second portion of the physical environment comprises causing the head-mounted display to display the extended reality environment that includes a reproduction of the third portion of the physical environment.

6. The wearable system of claim 1, wherein the processor is configured to:
select a modification based on the determined current activity; and
apply the modification to imaging data associated with the second portion of the physical environment to generate the modified representation of the second portion of the physical environment.

7. The wearable system of claim 6, wherein the processor is configured to:
determine a focus level associated with the determined current activity, wherein selecting the modification based on the current activity comprises selecting the modification based on the determined focus level.

8. The wearable system of claim 1, wherein the processor is configured to:
receive an activation input from the user; and
determine that the first activation criteria has been met in response to the received activation input being associated with the first focus mode.

9. The wearable system of claim 8, wherein the processor is configured:
prompt the user to select a target focus mode from a set of candidate focus modes.

10. A wearable system, comprising:
a head-mounted display;
a set of sensors; and
a processor configured to:
determine a current activity of the user using the set of sensors;
in response to determining that a first activation criteria has been met, enter a first focus mode that reduces distraction in an extended reality environment; and while in the first focus mode:
receive imaging data of a physical environment around a user using the set of sensors; and
cause the head-mounted display to display the extended reality environment that includes a reproduction of a first portion of the physical environment and a modified representation of an object in the reproduction of the first portion;
in response to determining that a second activation criteria has been met, entering a second focus mode that reduces distraction in the extended reality environment; and
while in the second focus mode:
receive imaging data of the physical environment around the user using the set of sensors; and
cause the head-mounted display to display the extended reality environment that includes a modified representation of a second portion of the physical environment;
generate the modified representation of the second portion of the physical environment based on the determined activity;
determine a focus level associated with the determined current activity; and
select the modification based on the determined focus level.

11. The wearable system of claim 10, wherein the modified representation of the object comprises replacing the object in the first portion of the physical environment with additional content.

12. The wearable system of claim 10, wherein the processor is configured to determine whether the first activation criteria has been met or the second activation criteria has been met based on the determined current activity of the user.

13. The wearable system of claim 12, wherein the processor is configured to:
determine a focus level associated with the current activity;
in response to determining that the focus level exceeds a first threshold, determine that the first activation criteria has been met; and
in response to determining that the focus level exceeds a second threshold, determine that the second activation criteria has been met.

14. The wearable system of claim 10, wherein the processor is configured to:
determine that a candidate object in the first portion of the physical environment meets a distraction criteria; and
select the candidate object as the object.

15. The wearable system of claim 14, wherein the processor is configured to determine that the candidate objects meets the distraction criteria based on the determined current activity.

16. The wearable system of claim 10, wherein the processor is configured to:
receive an activation input from the user; and
determine that the first activation criteria has been met in response to determining that the received activation input is associated with the first focus mode.

17. The wearable system of claim 10, wherein the processor is configured prompt the user to select a focus mode from a set of candidate focus modes.

18. A wearable system, comprising:
a head-mounted display;
a set of sensors; and
a processor configured to:
determine a current activity of the user;
in response to determining that a first activation criteria has been met, enter a first focus mode that reduces distraction in an extended reality environment; and
while in the first focus mode:
receive imaging data of a physical environment around a user using the set of sensors; and
cause the head-mounted display to display the extended reality environment that includes a reproduction of a first portion of the physical environment in which a distracting object in the first portion of the physical environment is replaced with additional content;
in response to determining that a second activation criteria has been met, entering a second focus mode that reduces distraction in the extended reality environment; and
while in the second focus mode:
receive imaging data of the physical environment around the user using the set of sensors;
determine that a second portion of the physical environment is not associated with the current activity; and
determine that a third portion of the physical environment is associated with the current activity; and
cause the head-mounted display to display the extended reality environment that includes a modified representation of a second portion of the physical environment and a reproduction of the third portion of the physical environment.

19. A wearable system, comprising:
a head-mounted display;
a set of sensors; and
a processor configured to:
receive an activation input from the user;
determine that a first activation criteria has been met in response to the received activation input being associated with the first focus mode;
in response to determining that the first activation criteria has been met:
prompt the user to select a target focus mode from a set of candidate focus modes; and
enter a first focus mode that reduces distraction in an extended reality environment; and
while in the first focus mode:
receive imaging data of a physical environment around a user using the set of sensors; and
cause the head-mounted display to display the extended reality environment that includes a reproduction of a first portion of the physical environment in which a distracting object in the first portion of the physical environment is replaced with additional content;
in response to determining that a second activation criteria has been met, entering a second focus mode that reduces distraction in the extended reality environment; and
while in the second focus mode:
receive imaging data of the physical environment around the user using the set of sensors; and
cause the head-mounted display to display the extended reality environment that includes a modified representation of a second portion of the physical environment.

* * * * *